(12) United States Patent　　(10) Patent No.: US 8,045,582 B1
Petrus et al.　　(45) Date of Patent: Oct. 25, 2011

(54) VARIABLE BANDWIDTH COMMUNICATION SYSTEM

(75) Inventors: James R. Petrus, Sunnyvale, CA (US); Liane S. Jensen, Mountain View, CA (US); Linda Elaine Eaton Hayes, Reno, NV (US)

(73) Assignee: Lockheed Martin Corporation, Bethesda, MD (US)

( * ) Notice: Subject to any disclaimer, the term of this patent is extended or adjusted under 35 U.S.C. 154(b) by 240 days.

(21) Appl. No.: 12/473,204

(22) Filed: May 27, 2009

(51) Int. Cl.
　　*H04J 3/16*　　(2006.01)
(52) U.S. Cl. ............................ 370/468; 370/538
(58) Field of Classification Search .................. None
　　See application file for complete search history.

(56) References Cited

U.S. PATENT DOCUMENTS

| | | | |
|---|---|---|---|
| 5,835,493 A * | 11/1998 | Magee et al. ............ 370/395.62 |
| 6,172,988 B1 * | 1/2001 | Tiernan et al. ................. 370/473 |
| 6,643,298 B1 * | 11/2003 | Brunheroto et al. ........... 370/537 |
| 6,826,185 B1 * | 11/2004 | Montanaro et al. ......... 370/395.1 |
| 6,901,078 B2 * | 5/2005 | Morris ........................... 370/466 |
| 6,996,101 B2 * | 2/2006 | Coupe et al. .................. 370/389 |
| 7,289,497 B2 * | 10/2007 | Pelletier et al. ............... 370/389 |
| 7,295,574 B1 * | 11/2007 | Parruck et al. ................ 370/474 |
| 7,324,563 B2 * | 1/2008 | Loeffler et al. ............... 370/535 |
| 7,334,132 B1 * | 2/2008 | Kumar et al. ................. 713/189 |
| 7,424,038 B2 * | 9/2008 | Yang ............................. 370/474 |
| 7,646,768 B2 * | 1/2010 | Coupe et al. .................. 370/389 |
| 2004/0057457 A1 * | 3/2004 | Ahn et al. ...................... 370/466 |
| 2005/0108763 A1 * | 5/2005 | Baran et al. ....................... 725/87 |
| 2006/0088052 A1 * | 4/2006 | Sauser et al. .................. 370/466 |
| 2007/0211718 A1 * | 9/2007 | Kang et al. .................... 370/389 |
| 2008/0019402 A1 * | 1/2008 | Park et al. ..................... 370/535 |
| 2010/0279628 A1 * | 11/2010 | Love et al. ...................... 455/70 |

\* cited by examiner

*Primary Examiner* — Gregory Sefcheck
(74) *Attorney, Agent, or Firm* — McDermott Will & Emery LLP

(57) ABSTRACT

A communication system is provided, which comprises a data conversion module and a framer. The data conversion module is configured to receive a first plurality of data streams. The data conversion module is also configured to provide a second plurality of data streams. Each of the second plurality of data streams comprises first data units, channel identifiers, and format indicators. Each of the first data units is associated with one of the channel identifiers and one of the format indicators. The format indicators are based on variable bandwidths of data streams. The framer is configured to receive the second plurality of data streams. The framer is also configured to identify channel information of the second plurality of data streams. The framer is also configured to allocate the second plurality of data streams into one or more self-describing superframes.

26 Claims, 30 Drawing Sheets

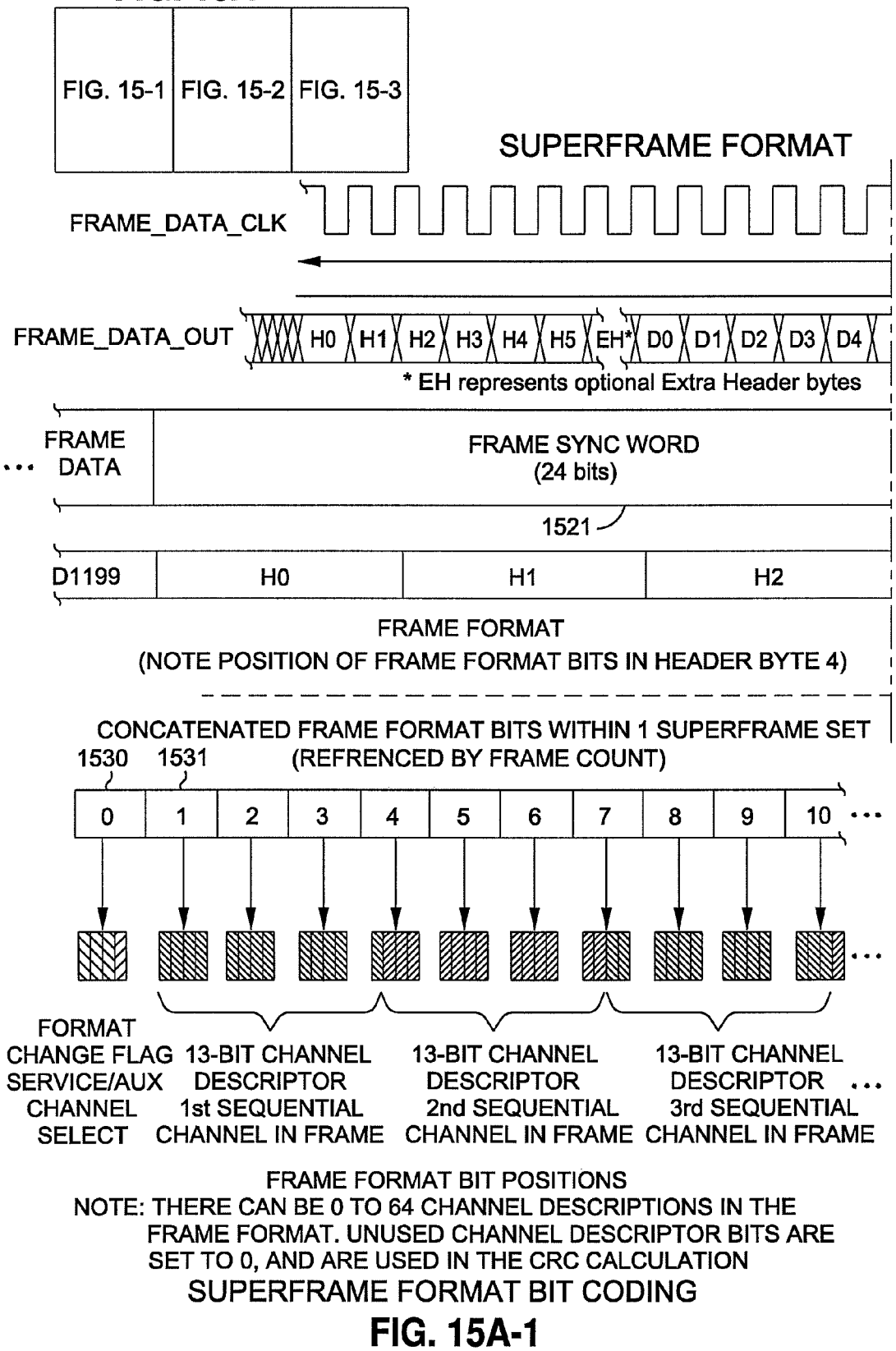

Bandwidth Table

| Format | Samples/Frame | Bytes Reserved Per Channel Per Frame | | | Channel Fill Per Superframe | | |
|---|---|---|---|---|---|---|---|
| | | 4-bit | 6-bit | 8-bit | 4-bit | 6-bit | 8-bit |
| 0 | 2400 | 1200 | N/A | N/A | 0 | N/A | N/A |
| 1 | 1600 | 800 | 1200 | N/A | 0 | 0 | N/A |
| 2 | 1200 | 600 | 900 | 1200 | 0 | 0 | 0 |
| 3 | 600 | 300 | 450 | 600 | 0 | 0 | 0 |
| 4 | 375 | 188 | 282 | 375 | 128 | 192 | 0 |
| 5 | 300 | 150 | 225 | 300 | 0 | 0 | 0 |
| 6 | 225 | 113 | 169 | 225 | 128 | 64 | 0 |
| 7 | 150 | 75 | 113 | 150 | 0 | 128 | 0 |
| 8 | 112.5 | 57 | 85 | 113 | 192 | 160 | 128 |
| 9 | 90 | 45 | 68 | 90 | 0 | 128 | 0 |
| 10 | 75 | 38 | 57 | 75 | 128 | 192 | 0 |
| 11 | 52.5 | 27 | 40 | 53 | 192 | 160 | 128 |
| 12 | 45 | 23 | 34 | 45 | 128 | 64 | 0 |
| 13 | 37.5 | 19 | 29 | 38 | 64 | 224 | 128 |
| 14 | 27 | 14 | 21 | 27 | 128 | 192 | 0 |
| 15 | 22.5 | 12 | 17 | 23 | 192 | 32 | 128 |
| 16 | 19.5 | 10 | 15 | 20 | 64 | 96 | 128 |
| 17 | 18.75 | 10 | 15 | 19 | 160 | 240 | 64 |
| 18 | 13.5 | 7 | 11 | 14 | 64 | 224 | 128 |
| 19 | 12 | 6 | 9 | 12 | 0 | 0 | 0 |
| 20 | 10.5 | 6 | 8 | 11 | 192 | 32 | 128 |
| 21 | 9.375 | 5 | 8 | 10 | 80 | 248 | 160 |
| 22 | 9 | 5 | 7 | 9 | 128 | 64 | 0 |
| 23 | 7.5 | 4 | 6 | 8 | 64 | 96 | 128 |
| 24 | 6 | 3 | 5 | 6 | 0 | 128 | 0 |
| 25 | 5.25 | 3 | 4 | 6 | 96 | 16 | 192 |
| 26 | 4.6875 | 3 | 4 | 5 | 168 | 124 | 80 |
| 27 | 4.5 | 3 | 4 | 5 | 192 | 160 | 128 |
| 28 | 3.75 | 2 | 3 | 4 | 32 | 48 | 64 |
| 29 | 3 | 2 | 3 | 3 | 128 | 192 | 0 |
| 30 | 2.9296875 | 2 | N/A | 3 | 137 | N/A | 18 |
| 31 | 2.9296875 | 2 | N/A | 3 | 137 | N/A | 18 |

FIG. 15C

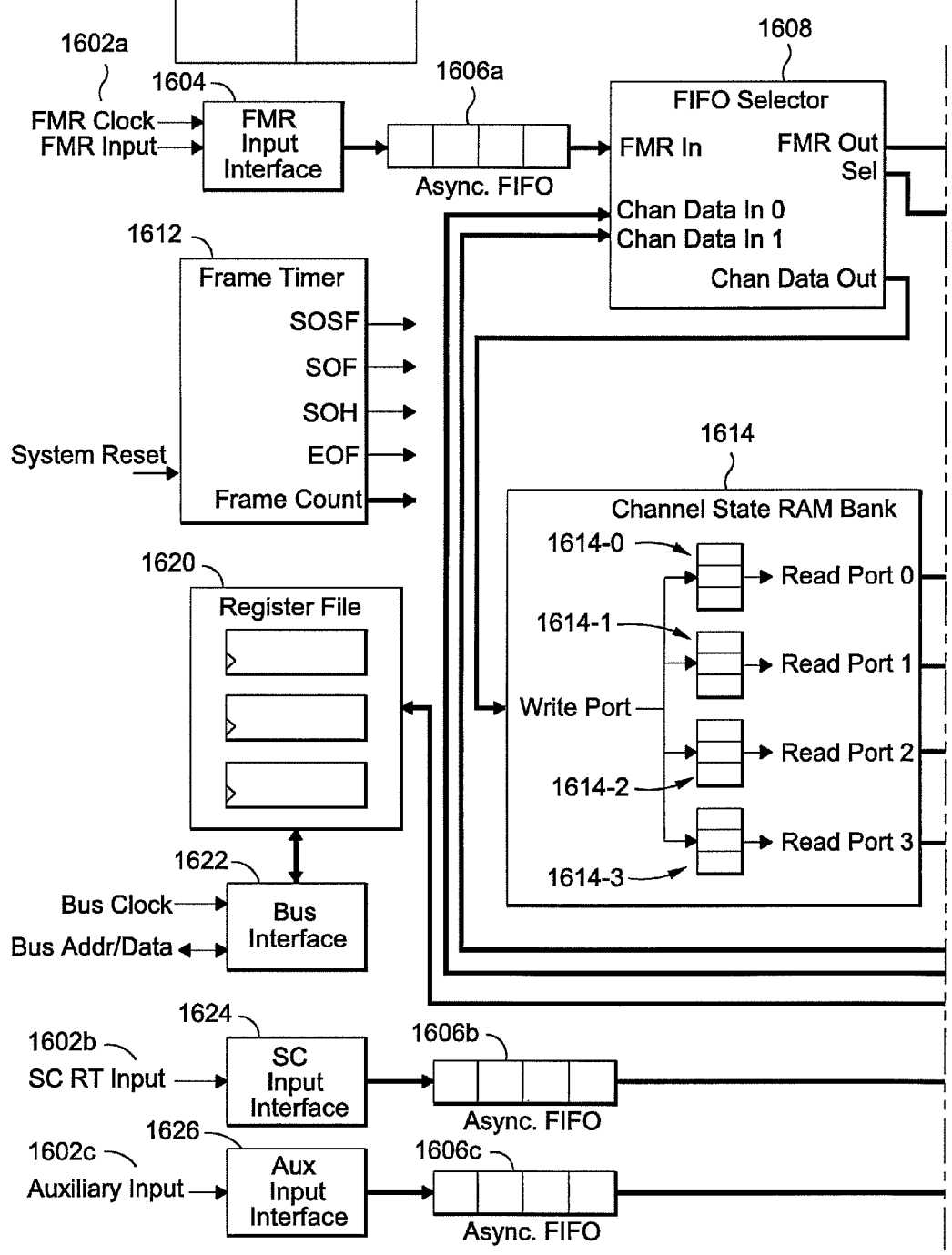

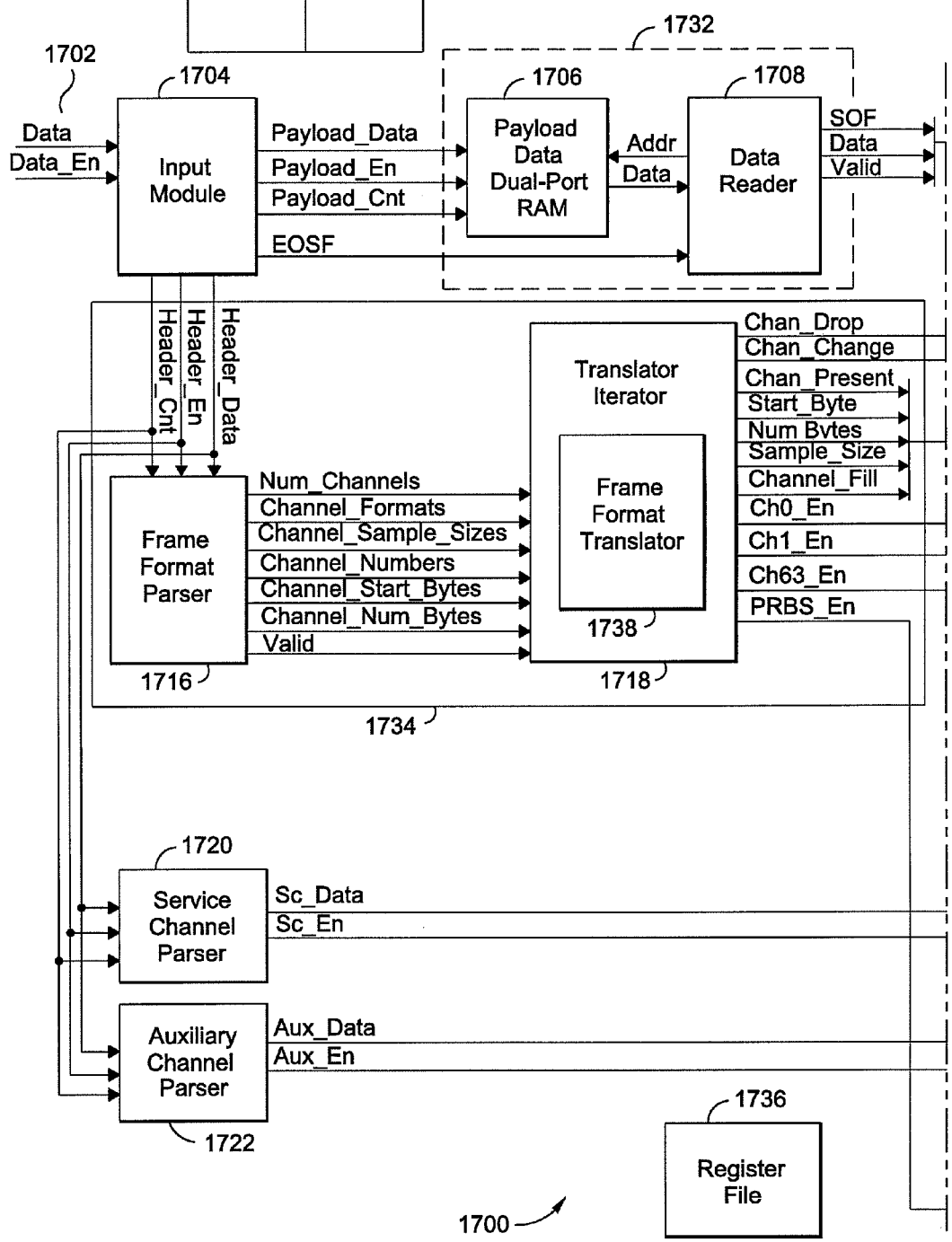

VARIABLE BANDWIDTH COMMUNICATION SYSTEM

STATEMENT AS TO RIGHTS TO INVENTIONS MADE UNDER FEDERALLY SPONSORED RESEARCH OR DEVELOPMENT

Not Applicable.

FIELD

The disclosure generally relates to data processing and communications and, in particular, relates to variable bandwidth communication systems.

BACKGROUND

The communications downlink between a satellite and its ground station often has a maximum data rate limit that is a fraction of what the satellite, is capable of sourcing. Satellite Payload Mission Processors (PMPs) are used on board the satellites to collect, transform, and forward digital data streams from multiple sensors located on board. Each of these data streams can vary in data rate and duration depending on the data source and the mission profile.

The data streams need to be framed to establish a time epoch as well as rate-adapted in a flexible and efficient manner in order to aggregate the maximum efficiency in bandwidth of an active number of data streams onto the downlink. Furthermore, a ground controller may change the bits of significance or data rate of one or more of the digital data streams being collected during a mission. To quickly facilitate such a change, it is desirable to reconfigure only the PMP and have the rest of the data stream processing electronics use information embedded in each data stream to automatically reconfigure and adapt to such a change in the digital data stream's content and data rate with minimal data loss.

SUMMARY

According to one aspect of the disclosure, a communication system is provided. The communication system comprises a data conversion module and a framer. The data conversion module is configured to receive a first plurality of data streams. The data conversion module is also configured to provide a second plurality of data streams. Each of the second plurality of data streams comprises first data units, channel identifiers, and format indicators. Each of the first data units is associated with one of the channel identifiers and one of the format indicators. The format indicators are based on variable bandwidths of data streams. The framer is configured to receive the second plurality of data streams. The framer is also configured to identify channel information of the second plurality of data streams. The framer is also configured to allocate the second plurality of data streams into one or more self-describing superframes.

In another aspect of the disclosure, a data interleaving apparatus for a communication system comprises a first module. The first module comprises a multiplexing module and a transformation module. The multiplexing module is configured to receive a plurality of data streams. The multiplexing module is also configured to combine the plurality of data streams. The multiplexing module is also configured to provide a single data stream.

The transformation module is configured to receive the single data stream. The transformation module is also configured to dynamically perform one or more of the following actions on the single data stream based, only on contents of the single data stream: rounding, truncating, bit-width conversion, and bandwidth limiting.

In yet another aspect of the disclosure, a data interleaving method for a communication system is provided. The data interleaving method comprises receiving a first plurality of data streams variable in the number of bits of significance and variable in bandwidth. The data interleaving method also comprises providing a second plurality of data streams. Each of the second plurality of data streams comprises first data units, channel identifiers, and format indicators. Each of the first data units is associated with one of the channel identifiers and one of the format indicators. The format indicators are based on variable bandwidths of data streams.

The data interleaving method also comprises providing, based on the second plurality of data streams, a single data stream. The single data stream comprises second data units, channel identifiers and format indicators. Each of the second data units is associated with one of the channel identifiers of the single data stream and one of the format indicators of the single data stream.

Additional features and advantages of the invention will be set forth in the description below, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate aspects of the invention and together with the description serve to explain the principles of the invention.

FIG. 15C illustrates an example of a bandwidth table, in accordance with one aspect of the disclosure.

DETAILED DESCRIPTION

In the following detailed description, numerous specific details are set forth to provide a full understanding of the subject technology. It will be obvious, however, to one ordinarily skilled in the art that the subject technology may be practiced without some of these specific details. In other instances, well-known structures and techniques have not been shown in detail so as not to obscure the subject technology.

In accordance with one aspect of the disclosure, a variable bandwidth communication system is provided. A variable bandwidth communication system may be a variable bandwidth receiver system (VBR) comprising a series of data processing functions that manipulate and aggregate multiple data streams into a single data stream. For example, a VBR system can be a payload processor of a satellite that provides a transport mechanism for digital data collected by sensors on the satellite. The data collected from the sensors can be aggregated in a single format to be included in a single satellite downlink transmission to ground station(s). In one aspect, the VBR system comprises arbitrary bandwidth resamplers (ABRs), data stream interleavers, a framer (e.g., a frame formatter), a deframer, and a packetizer. In accordance with another aspect, these units may be integrated circuits comprising various processing elements.

Figure 1:
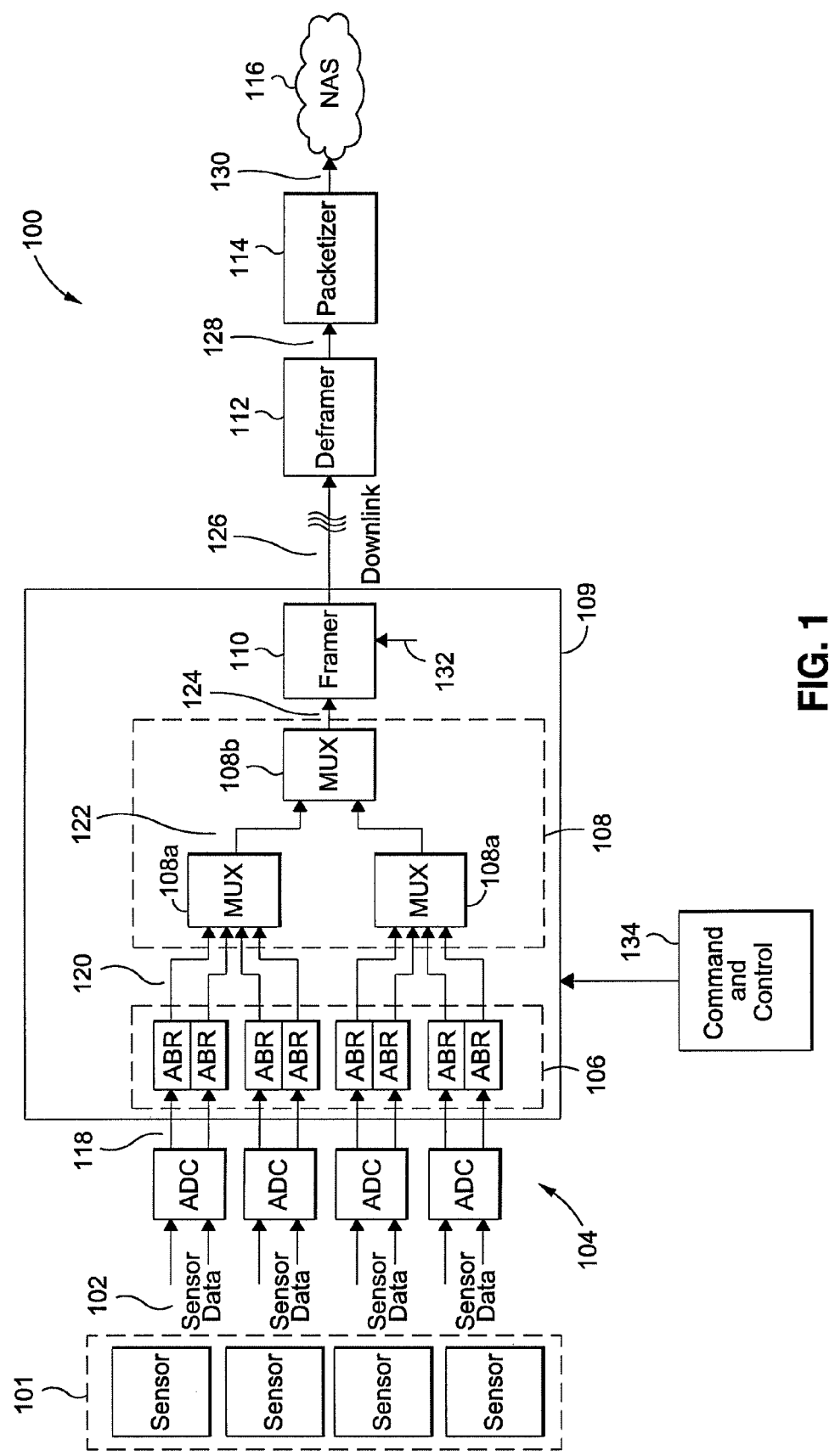
FIG. 1 illustrates an example of a variable bandwidth communication system, in accordance with one aspect of the disclosure.

FIG. 1 illustrates an example of a variable bandwidth communication system, in accordance with one aspect of the disclosure. A variable bandwidth communication (VBC) system shown in FIG. 1 is sometime referred to as a variable bandwidth receiver (VBR) system 100. However, a variable bandwidth communication system is not limited to a receiver system.

As shown in FIG. 1, a number of analog-to-digital converters (ADCs) 104 of VBR system 100 are connected to data conversion module 106 via ADC link 118, or any other suitable communication medium. Data, conversion module 106 may comprise one or more ABRs. Data interleaver module 108 (e.g., multiplexers) is interconnected with data conversion module 106 via ABR link 120, or any other suitable communication medium. Data interleaver module 108 can comprise one or more multiplexers. In one aspect, the multiplexers may be in a cascaded configuration, for example, with first stage multiplexers 108a and second stage multiplexer 108b. In one aspect, a cascaded configuration may include two or more stages, and each stage may include one or more multiplexers.

Data can be transmitted between first stage multiplexers 108a and second stage multiplexer 108b via inter-mux link 122, or any other suitable communication medium. Framer 110 can be interconnected with data interleaver module 108 via framer link 124, or any other suitable communication medium. ADC 104, data conversion module 106, data interleaver module 108, and framer 110 may form a first segment of the VBR system, which receives a constant fixed bandwidth of data and processes data accordingly for transmission on downlink 126. For example, ADC 104, data conversion module 106, data interleaver module 108, and framer 110 may form a space segment of a VBR system for satellite downlink transmission.

Deframer 112 may be configured to receive the data transmission from framer 110 via downlink 126. Packetizer 114 may be interconnected with deframer 112 via deframer link 128, or any other suitable communication medium. Network attached storage (NAS) 116 may be interconnected with packetizer 114 via packetizer link 130, or any other suitable communication medium. Deframer 112, packetizer 114, and NAS 116 may form a second segment of the VBR system, which receives the processed data from the first segment and redistributes the data accordingly. For example, deframer 112, packetizer 114, and NAS 116 may form a ground segment of a VBR system for satellite downlink transmission.

VBR system 100 may receive sensor data 102 from various sensor sources 101, for example sensors located on a satellite. Sensor data 102 may be analog signals and may be a constant fixed bandwidth of data. Sensor data 102 may represent various kinds of signals such as data, voice, image, multimedia, or video signals. In one aspect, sensor data 102, and its characteristics such as the bandwidth (rate), size (sample size), type, or duration, may be unknown to VBR system 100 prior to the time of receipt of the sensor data by VBR system 100. According to one aspect, sensor data 102 do not need to be homogenous data or a known type of data in duration, size, or rate in order for VBR system 100 to receive sensor data 102 and process sensor data 102 for transmission. In another configuration, sensor data 102 may be generated by one sensor rather than multiple sensors. ADC 104 converts analog sensor data 102 into a digital format, which may then be received by data conversion module 106.

Once data conversion module 106 receives this data from ADC 104 via ADC link 118, data conversion module 106 can perform on-board processing and create data channels. This data may make up the data channels, or the primary data streams. In one aspect, each ABR of data conversion module 106 converts sensor data 102 into 8-bit words and scales the data appropriately. Each ABR of data conversion module 106 may down-sample sensor data 102 into smaller bandwidth portions. Part of the bandwidth can also be used to create a service channel (e.g., a service stream where the samples are from a service channel). A service channel may comprise a multiuser type of data, such as additional data to describe the primary data set from the primary data streams. The service stream may run at low bandwidth at a fixed rate.

A larger or smaller number of ABRs than shown in FIG. 1 may be used to receive sensor data 102 from the sensors. In one aspect of the disclosure, the primary data streams are transmitted by data conversion module 106 on ABR link 120 in an ABR interface (e.g., format of the data streams), which allows later processing units to dynamically process the data without user intervention. For example, each ABR of data conversion module 106 may take a conglomerate of sensor data 102, convert it to pairs of 8-bit samples so that the 16-bit pair can be transmitted to data interleaver module 108 via ABR link 120. Similarly, data conversion module 106 may transmit the service streams to data interleaver module 108 on ABR link 120 in an unrounded (UR) service channel interface.

According to another aspect of the disclosure, data interleaver module 108 combines the multiple primary data streams sourced by data conversion module 106 or other multiplexers (in a cascaded configuration) into a single primary data stream (e.g., a framer primary data stream). This single primary data stream may be in a framer interface and transmitted to framer 110 via framer link 124. In another aspect, data interleaver module 108 combines the multiple service streams sourced by data conversion module 106 or other multiplexers (in a cascaded configuration) into a single service stream (e.g., a framer service stream). This single service stream may be in a rounded and truncated (RT) service channel interface and transmitted to framer 110 via framer link 124. For efficient utilization of downlink 126, data interleaver module 108 can perform, rounding and truncation and bit-width conversion on each sample of each primary data stream or service stream in real time. In one aspect, data interleaver module 108 requires zero-configuration from the ground controllers. For example, data interleaver module 108 may use information embedded in the primary data streams or service streams for processing, such as performing rounding, truncation, or bit-width conversion. Data interleaver module 108 can also perform bandwidth enforcement (or bandwidth limiting) to protect downstream electronics from accidental overruns.

In one aspect of the disclosure, framer 110 receives the single primary data stream (e.g., a framer primary data stream) comprising multiple primary data streams from different data channels from data interleaver module 108. In another aspect, framer 110 identifies the individual data channel sources within the single primary data stream, and according to each channel's bandwidth, allocates the data to frames. The frames can be combined into a self-describing superframe format, which is a scheme used to transport channelized data, for example, on downlink 126. The self-describing superframes may also contain either service channel data generated by a data conversion module 106 or auxiliary channel data 132 input directly to framer 110. An auxiliary channel may comprise a multiuser type of data, such as additional data to describe the primary data set from the primary data streams. An auxiliary channel may be sometimes referred to as an auxiliary stream(s) where samples are from the auxiliary channel. The auxiliary stream may also run at low bandwidth at a fixed rate. Framer 110 can also dynamically allocate and deallocate channels or streams. The term "dynamically" may refer to performing actions in real-time, or performing actions in real-time without the intervention by another system, unit, or block (e.g., a ground controller). Dynamic allocation and deallocation may be useful, for example, when the mission changes in a satellite downlink transmission. For example, framer 110 may use information embedded in the framer primary data stream or framer service stream for processing, such as allocating channel data to self-describing superframes.

In accordance with one aspect of the disclosure, deframer 112 extracts the individual data streams from the frames in the superframe format and restores the original format of the data streams. Each single primary data stream is then demultiplexed according to its channel number and sent to packetizer 114 via deframer link 128. Similarly, service streams and auxiliary streams may also be extracted.

According to another aspect of the disclosure, packetizer 114 encapsulates channel data, service channel data, and auxiliary channel data in UDP/IP packets. Packetizer 114 may transmit those packets to workstations for further processing or a NAS 116 array for retrieval at a later time via packetizer link 130.

According to another aspect of the disclosure, the data transmitted on VBR system 100 is used on different data interfaces. For example, a VBR metadata interface may comprise the following fields: data, channel number, format, sample size, valid indicator, and channel reset indicator. For example, the data may be primary data received from the sensors and can vary in data width such as 16-bit or 24-bit. The channel number may be a 6-bit identifier unique to each channel. The format may be a 5-bit value that indicates the amount of bandwidth consumed by this channel's data stream. The sample size may be a 2-bit value that indicates if each data sample in the data field can be rounded and truncated to save downstream bandwidth. The valid indicator may be a single bit to indicate that the sample presented during the current clock cycle is valid. In one aspect of the disclosure, the ABR interface and framer interface are variations of this VBR metadata interface. The VBR metadata interface is one example of an interface that may be used in connection with VBR system 100, but other variations or types of data interfaces may be used in connection with VBR system 100 that may vary in fields, rate, or size. An example of a VBR metadata interface is shown as framer interface 400 in FIG. 4 below.

According to one aspect of the disclosure, service channel data transmitted on VBR system 100 may be in a service channel interface. A service channel interface may comprise data and enable fields. The data may contain special purpose data at a fixed rate and the enable field may be a single bit that indicates whether the data is valid or not. In one aspect, the unrounded (UR) service channel interface and the rounded and truncated (RT) service channel interface are variations of this service channel interface. Other variations of the service channel interface may be used.

Figure 2:
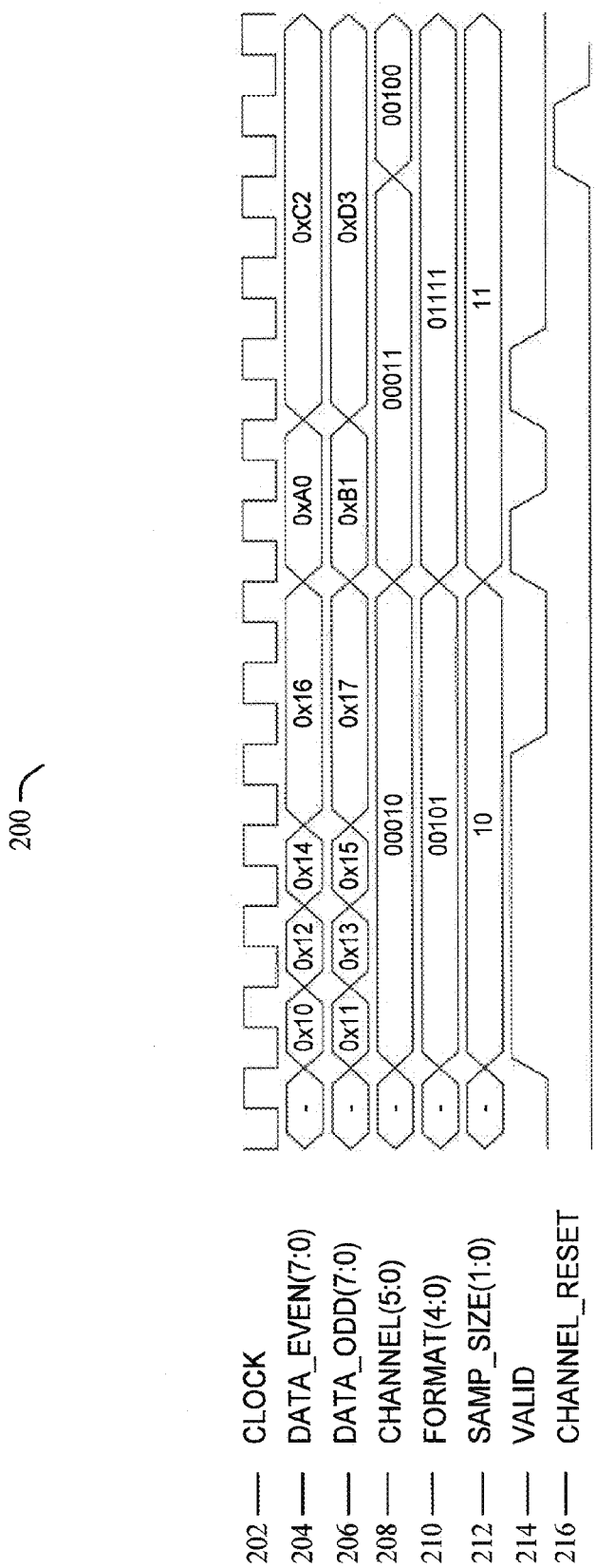
FIG. 2 illustrates an example of a timing diagram of an arbitrary bandwidth resampler (ABR) interface, in accordance with one aspect of the disclosure.

FIG. 2 illustrates an example of a timing diagram of an arbitrary bandwidth resampler (ABR) interface, in accordance with one aspect of the disclosure.

ABR interface 200 can be used throughout VBR system 100 to transmit and receive data, for example in ABR link 120 and inter-mux link 122. Referring to FIGS. 1 and 2, ABR link 120 can transmit a plurality of data streams (e.g., 8 data streams in this case represented by 8 arrows in ABR link 120), and ABR interface 200 may represent each of the plurality of data streams.

In one aspect, ABR interface 200 is always unidirectional; any given ABR interface 200 is comprised of either all inputs or all outputs. According to one aspect of the disclosure, ABR interface 200 comprises CLOCK 202, DATA_EVEN 204, DATA_ODD 206, CHANNEL 208, FORMAT 210, SAMP_SIZE 212, DATA_VALID 214, and CHANNEL_RESET 216. Bit position is shown in FIG. 2 in parentheses. For example, "(7:0)" may indicate 8 bits, with the seventh bit position as the most significant bit and the 0 bit position as the least significant bit.

CLOCK 202 may be a 100 MHz clock input to which all other inputs are synchronous. However, other clock rates may be utilized. ABR interface 200 signals may be clocked in on the rising edge and clocked out on the falling edge. DATA_EVEN 204 may be part of a data sample that is, paired with a corresponding DATA_ODD 206 field. DATA_ODD 206 may be part of a data sample that is paired with a corresponding DATA_EVEN 204 field. DATA_VALID 214 may utilize an active high flag to indicate that the DATA_EVEN 204, DATA_ODD 206, CHANNEL 208, SAMP_SIZE 212, and FORMAT 210 signals are valid. CHANNEL 208 may indicate the channel source identification number of DATA_EVEN 204 and DATA_ODD 206 samples. SAMP_SIZE 212 may be an identifier for the size of DATA_EVEN 204 and DATA_ODD 206 samples. For example, "11" may represent 8-bit, "10" may represent 6-bit, and "01" may represent 4-bit. "00" may indicate a special pseudo random binary sequence (PRBS) insertion case and may be treated as an 8-bit sample. FORMAT 210 may be an identifier that defines the format of DATA_EVEN 204 and DATA_ODD 206. In one aspect, FORMAT 210 may be used by data interleaver module 108 to check for invalid formats. CHANNEL_RESET 216 may utilize an active high input that indicates the channel id specified by CHANNEL 208 is to be invalidated and any associated data, format, or sample size should be flushed or dropped. CHANNEL_RESET 216 and DATA_VALID 214 may not be active during the same clock cycle.

ABR interface 200 may be used for the transport of unrounded data (for example, from a data conversion module 106 on ABR link 120) or rounded and truncated data between different multiplexers in data interleaver module 108, for example inter-mux link 122. Because of this, the data samples can be packed in different ways. According to one aspect of the disclosure, DATA_EVEN 204 and DATA_ODD 206 is a pair of 8-bit samples while in ABR link 120.

In other parts of VBR system 100, for example while in inter-mux link 122, the samples are packed depending on the value of SAMP_SIZE 212. According to one aspect, if the sample size is 4-bit, two samples are packed each in DATA_EVEN 204 and DATA_ODD 206. DATA_EVEN 204 may be comprised of two samples (EVEN_0, EVEN_1), with EVEN_0 occupying the most significant 4 bits and EVEN_1 occupying the least significant 4 bits. DATA_ODD would be packed similarly, (ODD_0, ODD_1). In another aspect, 6-bit samples are transported as a single pair, but the least significant two bits of DATA_EVEN 204 and DATA_ODD 206 are unused and shall carry the value "00" In one aspect, 8-bit samples are transported as a single pair and fully utilized on DATA_EVEN 204 and DATA_ODD 206.

Figure 3:
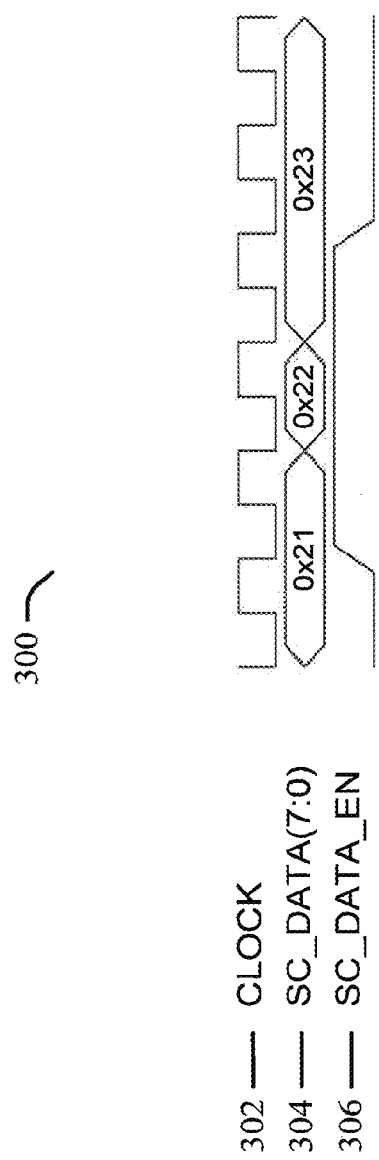
FIG. 3 illustrates an example of a timing diagram of an unrounded service channel interface, in accordance with one aspect of the disclosure.

FIG. 3 illustrates an example of a timing diagram of an unrounded (UR) service channel interface, in accordance with one aspect of the disclosure.

In one aspect of the disclosure, UR service channel interface 300 comprises CLOCK 302, SC_DATA 304, and SC_DATA_EN 306. SC_DATA 304 may comprise the service channel (SC) data stream which is unidirectional. SC_DATA_EN 306 may utilize an active high, signal that indicates SC_DATA 304 is valid. UR service channel interface 300 may be used to pass service channel data from data conversion module 106 to data interleaver module 108, for example on ABR link 120. Other service channel data in VBR system 100 may be passed over an RT service channel interface. In one aspect, UR service channel interface 300 is paired with ABR interface 200; CLOCK 202 from ABR interface 200 may be used to sample SC_DATA 304 and SC_DATA_EN 306.

Figure 4:
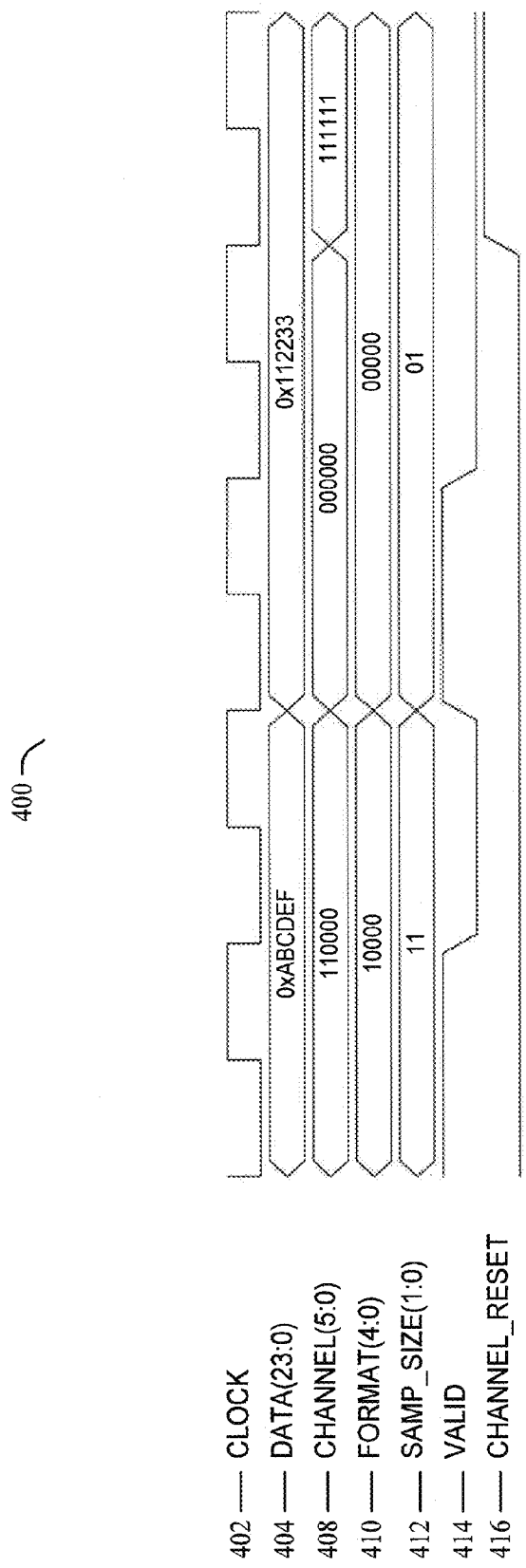
FIG. 4 illustrates an example of a timing diagram of a framer interface, in accordance with one aspect of the disclosure.

FIG. 4 illustrates an example of a timing diagram of a framer interface, in accordance with one aspect of the disclosure.

Framer interface 400 may be used to pass data from data interleaver module 108 to framer 110 via framer link 124. According to one aspect of the disclosure, framer interface 400 comprises CLOCK 402, DATA 404, CHANNEL 408, FORMAT 410, SAMP_SIZE 412, DATA_VALID 414, and CHANNEL_RESET 416.

CLOCK 402 may be 100 MHz clock input to which all other inputs are synchronous. However, other clock rates may be utilized. Framer interface 400 signals may be clocked in on the rising edge and clocked out on the falling edge. DATA 404 may be a packed data word that contains multiple even and odd data samples. The exact number of data samples may be dependent upon the SAMP_SIZE 412 value. DATA_VALID may utilize an active high flag to indicate that the DATA 404, CHANNEL 408, SAMP_SIZE 412, and FORMAT 410 signals are valid. CHANNEL 408 may indicate the channel source identification number of DATA 404. SAMP_SIZE 412 may be an identifier for the size of DATA_EVEN 204 and DATA_ODD 206 samples. For example, "11" may represent 8-bit, "10" may represent 6-bit, and "01" may represent 4-bit. "00" may indicate a special PRBS insertion case and may be treated as an 8-bit sample. FORMAT 410 may be an identifier that defines the format of DATA_EVEN 204 and DATA_ODD 206. In one aspect, FORMAT 410 may be used by data interleaver module 108 to, check for invalid formats. CHANNEL_RESET 416 may utilize an active high input that indicates the channel id specified by CHANNEL 408 is to be invalidated and any associated data, format, or sample size should be flushed or dropped. CHANNEL_RESET 416 and DATA_VALID 414 may not be active during the same clock cycle.

In framer interface 400, samples may be packed differently depending on the sample size. In one aspect, if the sample size is 4-bit, the data is packed (EVEN_0, ODD_0, EVEN_1, ODD_1, EVEN_2, ODD_2), where EVEN_0 is the earliest and is packed in the most significant 4-bits. Similarly, in another aspect, 6-bit samples are packed (EVEN_0, ODD_0, EVEN_1, ODD_1). In another aspect, 8-bit samples have an alternating format of (EVEN_0, ODD_0, EVEN_1) and (ODD_1, EVEN_2, ODD_2). This interface is unidirectional, in accordance with one aspect of the disclosure.

Figure 5:
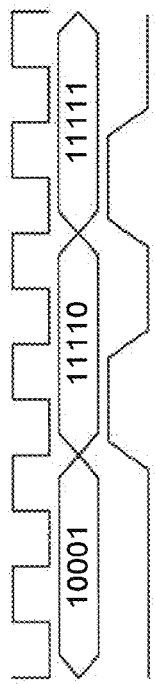
FIG. 5 illustrates an example of a timing diagram of a rounded and truncated service channel interface, in accordance with one aspect of the disclosure.

FIG. 5 illustrates an example of a timing diagram of a rounded and truncated (RT) service channel interface, in accordance with one aspect of the disclosure.

In one aspect of the disclosure, RT service channel interface 500 comprises CLOCK 502, SC_DATA 504, and SC_DATA_EN 506. SC_DATA 504 may comprise rounded and truncated service channel data stream. In one aspect, SC_DATA 504 may be 5-bit samples of special purpose data at a fixed rate. SC_DATA_EN 506 may utilize an active high signal that indicates SC_DATA 504 is valid. In one aspect, data interleaver module 108 may perform rounding and truncation on the service channel data. After the rounding and truncation, RT service channel interface 500 may be used to pass the service channel data, for example on inter-mux link 122 and framer link 124. In one aspect, RT service channel interface 500 is always a one-way; any given RT service channel interface 500 may be comprised of either all inputs or all outputs. This interface may be paired with ABR interface 200 or framer interface 400; CLOCK 202 or CLOCK 402 from either ABR interface 200 or framer interface 400 may be used to sample SC_DATA 504 and SC_DATA_EN 506.

Figure 6:
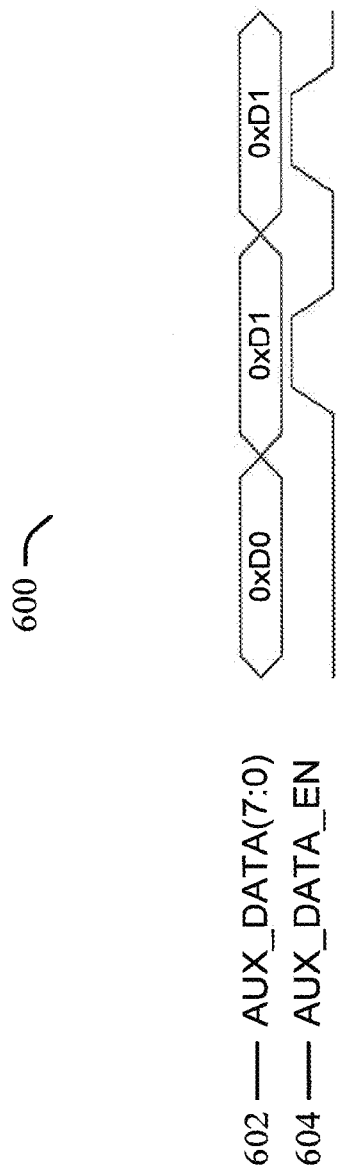
FIG. 6 illustrates an example of a timing diagram of an auxiliary channel interface, in accordance with one aspect of the disclosure.

FIG. 6 illustrates an example of timing diagram of an auxiliary channel interface, in accordance with one aspect of the disclosure.

In one aspect of the disclosure, auxiliary channel interface 600 comprises AUX_DATA 602 and AUX_DATA_EN 604. AUX_DATA 602 may comprise auxiliary channel data. In one aspect, AUX_DATA 602 may be 8-bit samples of special purpose data at a fixed rate. The auxiliary channel data may be generated by a variety, of sources outside of VBR system 100. The auxiliary channel data may be received by framer 110 via framer link 124 in auxiliary channel interface 600. AUX_DATA_EN 604 may utilize an active high signal that indicates AUX_DATA 602 is valid.

Figure 7A:
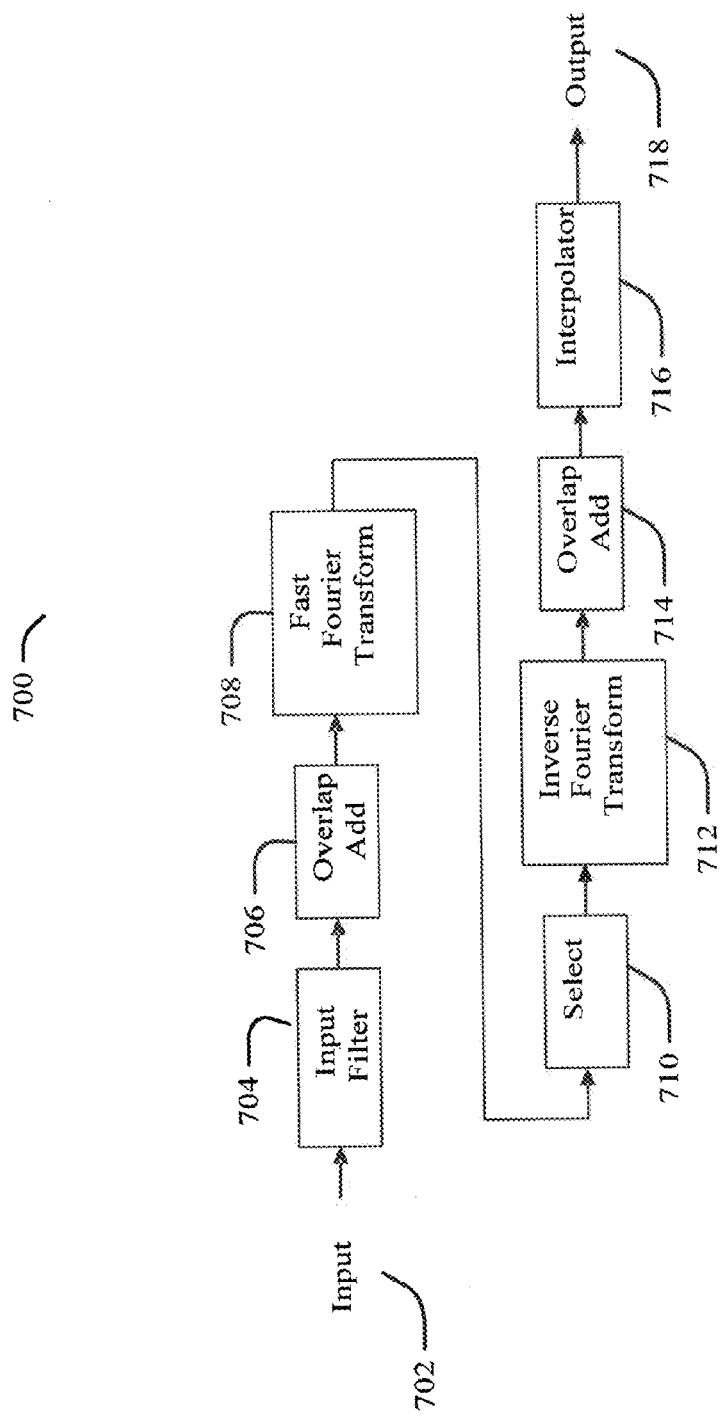
FIG. 7A illustrates an example of an ABR, in accordance with one aspect of the disclosure.

FIG. 7A illustrates an example of an arbitrary bandwidth resampler (ABR), in accordance with one aspect of the disclosure.

ABR 700 may, for example, represent any of the ABRs of data conversion module 106 in FIG. 1. According to one aspect, ABR 700 may comprise input filter 704, overlap add processing module 706, Fast Fourier Transform (FFT) 708, selection processing module 710, inverse Fast Fourier Transform (IFFT) 712, overlap add processing module 714, and interpolator 716.

ABR 700 may receive input 702 which may be sensor data 102 after being converted to a digital form, such as digital wide band signals. ABR 700 may decompose a large bandwidth to select individual signals in the bandwidth and convert the signals in the bandwidth to a serial digital data stream. All of the signals in the bandwidth can be processed at one time, providing for a resource to extract all of the signals at once instead of one at a time.

One technique for distributing a high bandwidth signal containing many narrow band signals is to convert the signal to a digital form, and distribute the digital signal to each of the users. Each user may then extract the signal of interest. An alternative technique is to extract the narrow band signals from the wider bandwidth and send each of the narrow band signals to the user of that signal.

Each narrow band signal may be extracted by applying a tuner to the frequencies of that signal. The tuner may comprise a mixer to shift the frequencies of the selected signal to baseband, followed by a filter to limit the frequency band to the desired signal bandwidth. The output of the filter can be down-sampled to a sample rate that most closely matches the bandwidth of the selected signal. One approach is to apply a sequence of filters that have relatively poor bandpass characteristics followed by a down-sample for each filter. These simple filters are followed by a high performance filter at the lower sample rate to correct the passband shape of the filter and establish the rejection of the filter.

Another form of a high performance filter is based on a FFT. This "polyphase filter" can have very high performance, since the computation rate required for the FFT is much smaller than the equivalent computation rate of the direct filter. With this technique the length of the filter response can be very long, resulting in very narrow band filtering of the signals. This approach may still extract one signal at a time.

For arbitrary bandwidth resampling, by using a FFT technique, all of the signals in a large bandwidth may be extracted and converted to serial digital data streams for distribution. For example, these data streams may be the primary data streams or service streams. Each of the signals extracted may have its own bandwidth. According to one aspect, each of the signals may be resampled to a sample rate that matches the signal bandwidth for efficient transmission. Since the effective filters have very high performance, the portion of the band occupied by an individual signal in the output may be much higher than the usual band occupancy. The usual analog tuner with an ADC on the output may require a signal to occupy not more than 80% of the available bandwidth of the data stream. Higher performance filters may permit more than 90% occupation of the output bandwidth.

Input filter 704 may be used to limit the input bandwidth and shift input 702 down, for example, by the sample rate divided by four to a baseband form of the signal. The baseband form of the signal has both an in-phase and a quadrature component. As a consequence, this form of the signal can represent both positive and negative frequencies. During the input filtering, the sample rate can be reduced, such as by a factor of two. Input filter 704 may not be necessary, if the analog filtering is adequate without the digital filtering. In addition, the input bandwidth may be a bandpass signal and need not necessarily be a baseband signal.

Figure 7B:
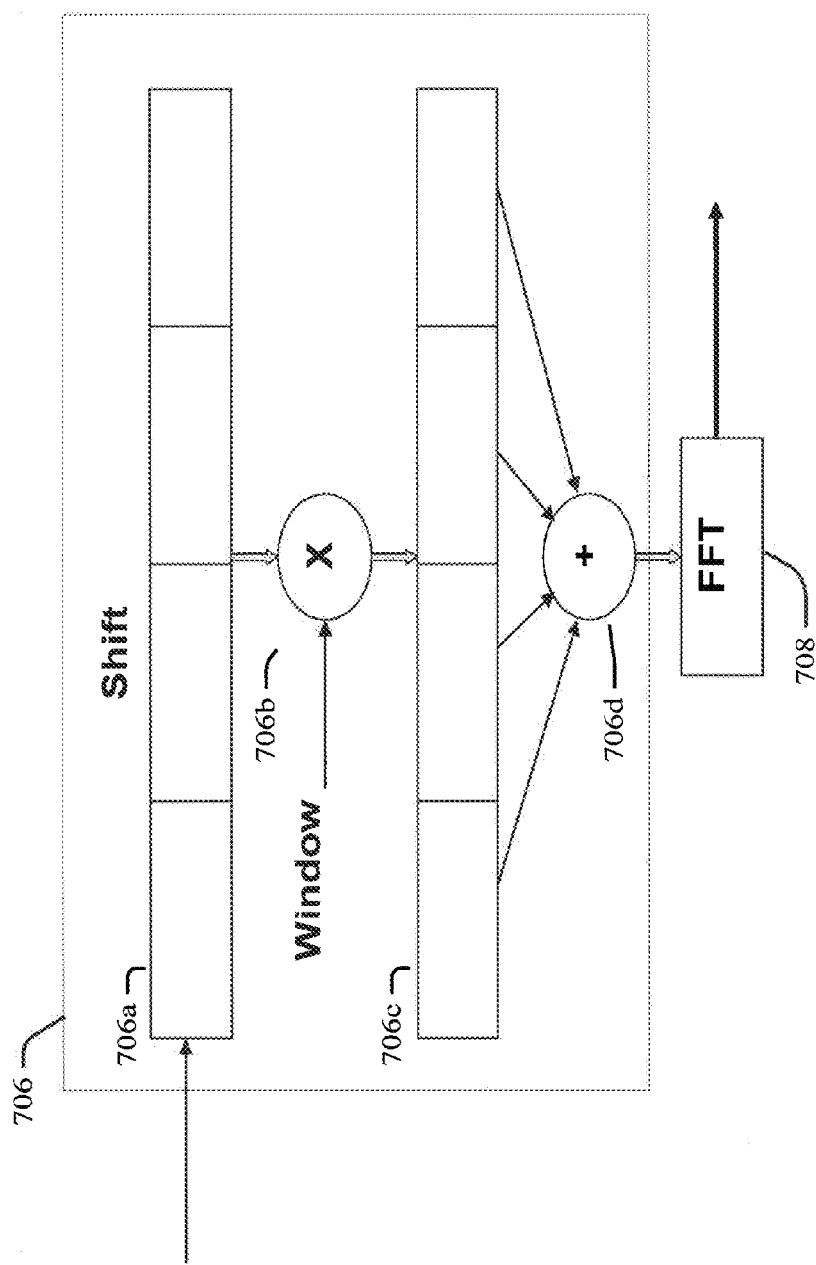
FIG. 7B illustrates an example of overlap-add and fast Fourier Transform (FFT) processing, in accordance with one aspect of the disclosure.

FIG. 7B shows a more detailed view of first overlap add processing module 706. First overlap add processing module 706 may shift the input data stream into an input shift register 706a (e.g., a buffer) that is a multiple of the length of the FFT 708. A windowing function 706b may be applied across the buffered data. The window is a point-by-point multiply of the samples in the buffer times the windowing function 706b that shapes the bandpass of the narrow band filters. Each of the windowed points from the buffer may be added by an adder 706d to the similarly placed windowed sample points from the output shift register 706c (e.g., the adjacent register segment). The result may be processed by the FFT 708.

A next block of samples may be shifted into input register 706a to continue the processing. For example, a block of samples shifted into input shift register 706a can be one half of the size of the FFT 708. As a result, the FFT 708 is calculated at a rate that is twice the fill rate of one of the buffer segments. This computation rate may be changed by changing the number of segments in the buffer. That is, by increasing the length of the buffer to be more than four times the length of the FFT 708, the rate of computation of the FFT 708 may be decreased. In effect, the length of the effective filter of one FFT 708 cell, for example, has been increased, reducing the bandwidth of the FFT 708 cell filter, and permitting a reduction in the sample rate of the FFT 708.

Selection processing module 710 shown in FIG. 7A may receive the results processed by FFT 708. The cells of the FFT 708 output are, for example, a bank of filters. The filters may represent the frequencies from the lowest frequency of the input to the highest frequency. Selecting a set of the filter outputs may select a band of frequencies. The band of frequencies may contain a particular signal. The signals across the band may not be the same, with different bandwidths and data rates for each signal. According to one aspect, if the cells of the FFT 708 are much narrower than the bandwidth of an individual signal, the selection of a set of cells will select the frequencies of that signal and will reject the frequencies of other nearby signals. The FFT 708, with its preprocessing, may form high performance filtering for the signals, in the bandwidth.

Figure 7C:
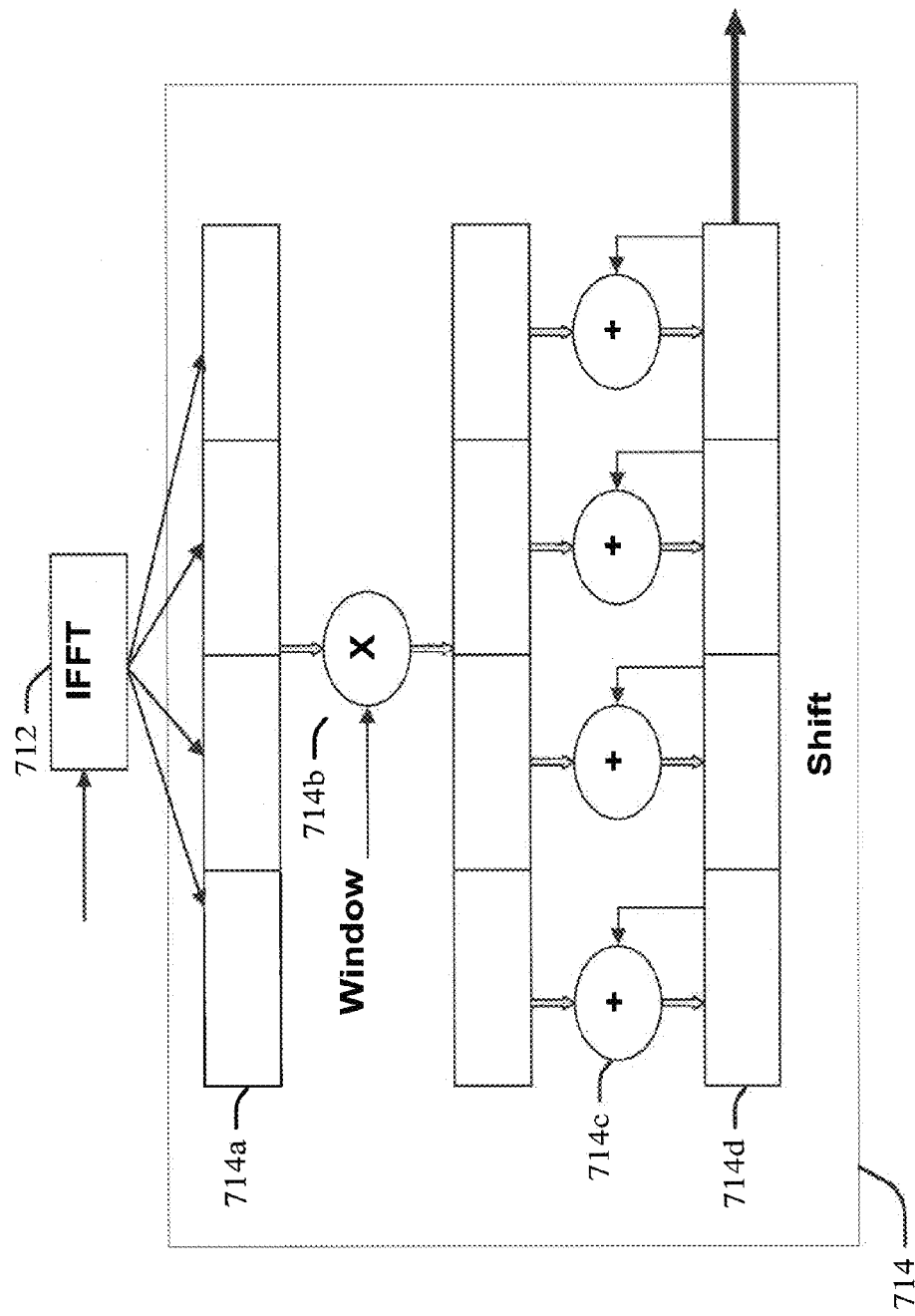
FIG. 7C illustrates an example of inverse FFT (IFFT) and overlap-add processing, in accordance with one aspect of the disclosure.

When there are multiple signals in the bandwidth, each of the signals may be selected by selection processing module 710 and separated from other signals by selecting the frequency cells for each signal independently. When a set of cells for one signal has been selected, it may be processed to reconstruct the signal. FIG. 7C illustrates processing to reconstruct a signal from a set of frequency cells containing the signal.

The selected cells are passed to IFFT 712. The cells may be padded with zeroes to fill out the number of cells of the IFFT 712. Padding the cells symmetrically by adding zeroes to the beginning and end of the IFFT 712 input instead of only at the beginning or the end may center the signal in the output bandwidth. The output of IFFT 712 is transmitted to second overlap add processing module 714, and is replicated into a set of registers 714*a* (e.g., buffers) equal to the number of buffers that were used in the FFT 708 at the input. Note that each register 714*a* may have a length equal to the length of the IFFT 712. This may be quite different from the number of cells of the FFT 708 at the input, being smaller by a factor of 2, 4, or some other power of two depending on the bandwidth of the signals being processed. A window 714*b* is applied to the data in register 714*a*. The result of the windowing 714*b* is added using adder 714*c* to an output register 714*d*. The data in the output register 714*d* is then shifted out to the user. For example, the buffers and windows may be added back to the reconstructed data stream to construct the output signal.

The output of IFFT 712 may be a set of signals that each have a sample rate that is smaller than the input sample rate, for example, by a factor that is a power of two. The desired sample rate for the bandwidth of a particular signal may be smaller than this rate. In one aspect, the desired output of IFFT 712 with the processing of second overlap add processing module 714 are an in-phase and quadrature signal with the desired signal centered in the bandwidth. This centered baseband signal can be easily processed by interpolator 716 of FIG. 7A to form output 718 at the desired sample rate. For example, output 718 may be a digital serial output signal.

Referring back to FIG. 7A, the output sample rate is formed by interpolator 716. The reduction of the sample rate from the output of IFFT 712 by an integer value may be done by simply sub-sampling this output by the required factor. For example, if a factor of three down-sampling from the input rate were required, every third sample of the output of the IFFT 712 processing can be selected. Of course, the number of cells of the IFFT 712 need to be appropriate to limit the bandwidth such that a factor of three down-sampling can be done without aliasing.

Interpolator 716 may permit the adjustment of the output sample rate to match an arbitrary bandwidth. Interpolator 716 may use the in-phase and quadrature components of input 702 in determining output 718. Interpolator 716 may form one set of output sample points from the in-phase component and a second set of output sample points from the quadrature component. Interpolator 716 may be formed by a filter that will eliminate aliasing from a signal that has been up-sampled by a selected factor from the input in-phase and quadrature signals. For example, a possible up-sample rate is 1024. The up-sampled signal may be formed by inserting 1023 zeroes between each sample of the in-phase and quadrature component. The filter may then eliminate the aliased signals. The output can then be down-sampled to the desired sample rate by selecting the samples that are closest to the desired output sample points for the selected output sample rate.

In accordance with one aspect, the output data stream from a selected signal may be buffered by ABR 700 to form a packet of data for that signal. Many different signals may be processed simultaneously, resulting in a packet data stream where each packet has a header that identifies the particular signal with its particular sample rate. For example, this data stream may be the primary data stream that is in the VBR interface.

ABR 700 may comprise various components to process a number of signals in a large bandwidth to construct packets for each signal in the data stream. Each of the signals may be extracted simultaneously from the large bandwidth with processing that filters the signal to select the frequencies of that signal and eliminate the frequencies of possibly interfering signals or noise. Each of the signals may then be processed to reduce the sample rate of that signal to the rate appropriate to the bandwidth of the signal. Very efficient use of the bandwidth of the output sample rate is possible, since the filters are very high performance filters with very steep cutoffs.

In effect, ABR 700, for example, simultaneously performs the actions of a tuner for all of the signals with the bandwidth of the individual tuners tailored to the arbitrary bandwidths of the signals being processed. The output sample rate for each of the signals may be tailored to the bandwidth, of the signal. The processing can be very flexible, since an old signal may be deleted by deselecting the frequency cells of the signal for processing, and a new signal may be added by selecting the frequency cells of the new signal for processing and adding the signal to the input of the IFFT 712 using available segments of unused IFFT 712 input ports. In one aspect, control of the resampler may complete the steps required for adding the signal.

According to one aspect, the aggregate processing of ABR 700 at each step depends, not on the data rate of the individual signals being processed, but on the aggregate data rate of all of the signals. For example, the processing speed does not depend on the bandwidths of the individual signals, but only on the aggregate bandwidth.

Figure 8:
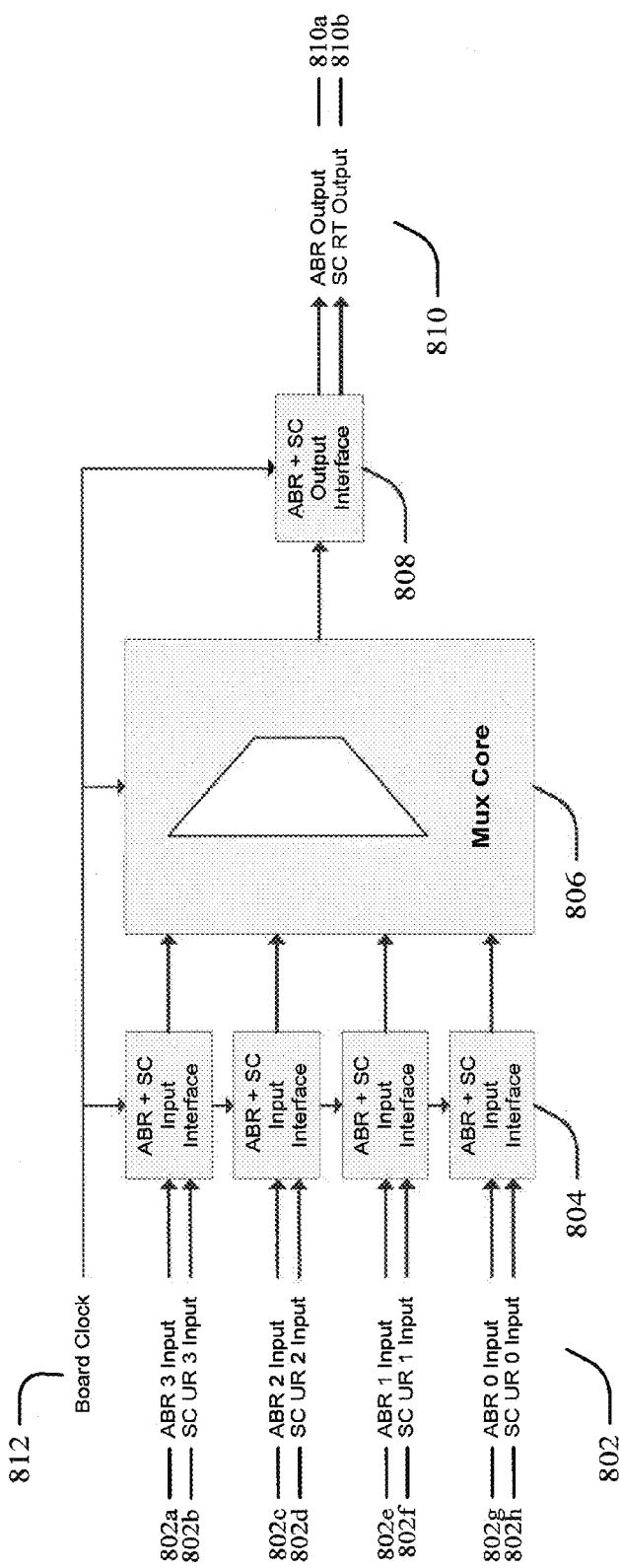
FIG. 8 illustrates an example of a first stage multiplexer, in accordance with one aspect of the disclosure.

FIG. 8 illustrates an example of a first stage multiplexer, in accordance with one aspect of the disclosure.

ABR+service channel (SC) input interface 804 may sample the incoming data 802 from data conversion module 106 of FIG. 1 on the rising edge of its associated interface clock. For example, incoming data 802 may comprise ABR inputs 802*a*, 802*c*, 802*e*, and 802*g* in the ABR interface 200 of FIG. 2. These inputs may be the primary data streams in the ABR interface 200. Incoming data 802 may also comprise SC UR inputs 802*b*, 802*d*, 802*f*, and 802*h* in the UR service channel interface 300. These inputs may be the service streams in the UR service channel interface 300. A larger or smaller number of ABR+SC input interfaces 804 than shown in FIG. 8 may be used depending on the amount of incoming data 802. Incoming data 802 may be synchronized to system clock 812 (e.g., board clock) through the use of a ring buffer.

First stage multiplexer 806 may be any of the first stage multiplexers 108*a* as shown in FIG. 1. In one aspect, first stage multiplexer 806 may have a 16-bit output. However, other configurations of first stage multiplexer 806 with a larger or smaller bit output may be possible. First stage multiplexer 806 may receive incoming data 802 from ABR+SC input interfaces 804 and aggregate incoming data 802 into one stream for ABR inputs (for example, an inter-mux primary data stream on inter-mux link 122) and another stream for SC UR inputs (for example, an inter-mux service stream on inter-mux link 122). According to one aspect of the disclosure, first stage multiplexer 806 may aggregate incoming data 802 even though incoming data 802 may comprise data that is variable in rate and size. For example, first stage multiplexer 806 may aggregate incoming data 802, which may be as slow as a few kilobits per second (kbps) to as fast as 800 megabits per second (Mbps). First stage multiplexer 806 may also round and truncate incoming data 802. For example, first stage multiplexer 806 may round and truncate incoming data 802 samples from 8-bit to 6-bit or 4-bit as required by the rate and size associated with the data, in accordance with one aspect of the disclosure.

In one aspect of the disclosure, the clock of the first stage multiplexer 806 runs at the maximum or highest switching rate. For example, if the maximum or highest switching rate of incoming data 802 is 100 megahertz (MHz), then the clock of first stage multiplexer 806 is also running at 100 MHz. This allows first stage multiplexer 806 to receive data varying in rate by processing the data at a rate no slower than the maximum rate that the data can be inputted. The same may be true for the other components of VBR system 100.

ABR+SC output interface 808 may transmit outgoing data 810 out of first stage multiplexer 806 and transitions on the falling edge of the board clock. For example, outgoing data 810 may comprise ABR output 810a in the ABR interface 200. This output may be the inter-mux primary data stream in the ABR interface 200. Outgoing data 810 may also comprise SC RT output 810b in the RT service channel interface 500. This output may be the inter-mux service stream in the RT service channel interface 500.

Figure 9:
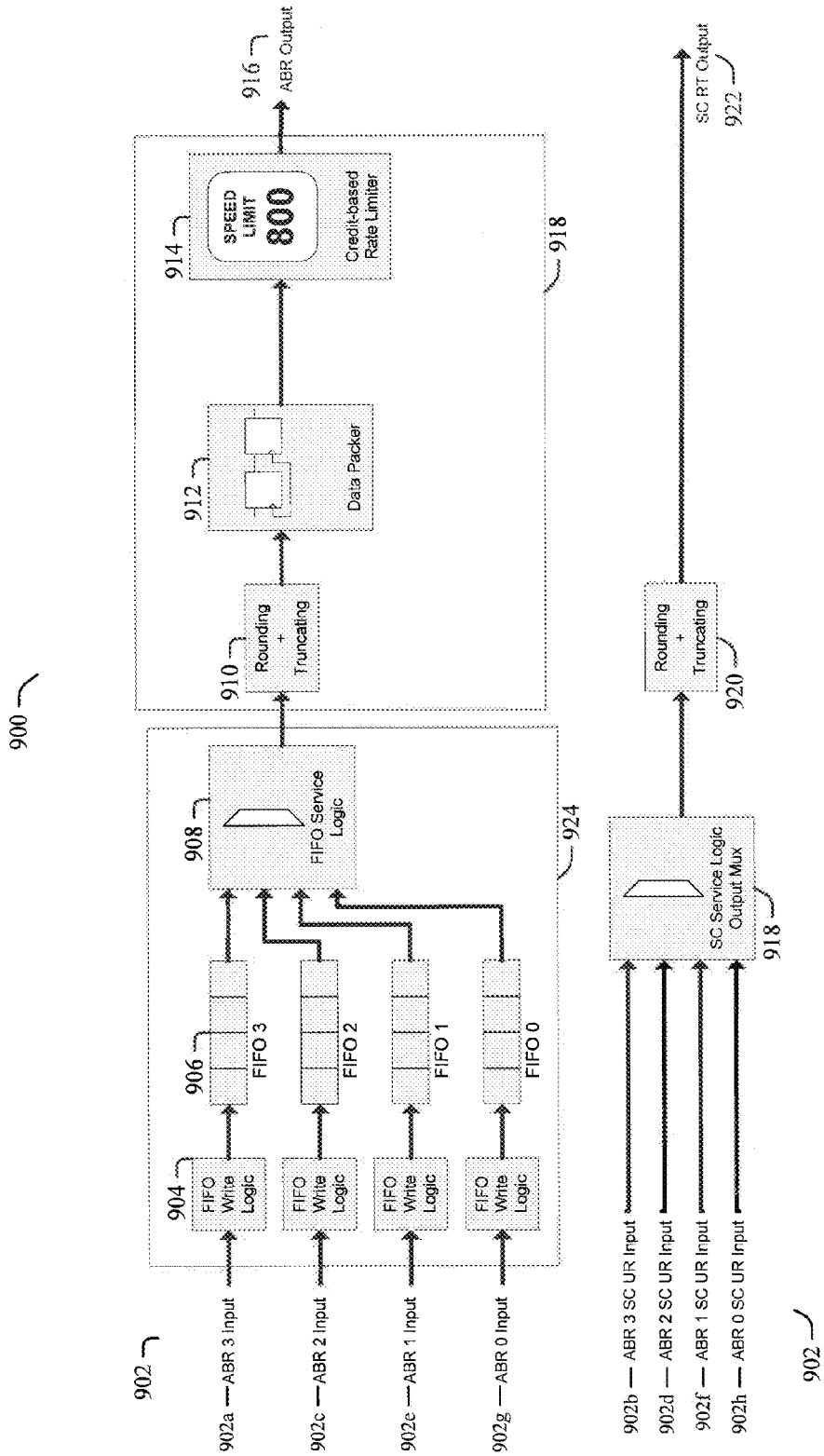
FIG. 9 illustrates an example of a core of a first stage multiplexer, in accordance with one aspect of the disclosure.

FIG. 9 illustrates an example of the core of a first stage multiplexer, in accordance with one aspect of the disclosure.

An example of first stage multiplexer 806 shown in FIG. 8 is shown in more detail in FIG. 9. First stage multiplexer 900 may comprise multiplexing module 924 and transformation module 918.

In this example, incoming data 902 corresponds to the ABR inputs of incoming data 802. For example, incoming data 902 may comprise ABR inputs 902a, 902c, 902e, and 902g in the ABR interface 200 of FIG. 2. These inputs may be the primary data streams in the ABR interface 200. First stage multiplexer 900 can receive more or less ABR inputs than shown.

Multiplexing module 924 may receive incoming data 902 (e.g., the primary data streams) and combine the incoming data 902 into a single stream (e.g., inter-mux primary data stream). Specifically, multiplexing module 924 may comprise first-in-first-out (FIFO) write logic 904, FIFO set 906, and FIFO service logic 908. FIFO write logic 904 may receive incoming data 902, specifically the ABR inputs 902a, 902c, 902e, and 902g. With respect to the ABR interface 200, FIFO write logic 904 may write incoming data 902 to a FIFO set 906 if DATA_VALID is '1' or if CHANNEL_RESET is '1'. FIFO write logic 904 may also maintain a count of how many samples were successfully written to FIFO set 906 and how many were dropped due to FIFO set 906 being full.

Because first stage multiplexer 900 may be a data interleaver, buffering can be implemented to ensure that data samples which arrive during the same clock cycle are not dropped. For example, FIFO set 906 may store incoming data 902 for buffering. In one aspect, since data conversion module 106 can actively transmit data for up, to a 256-cycle payload frame time, the minimum depth of FIFO set 906 is 256 entries. Upon each write, 8-bits of single-error-correction/double-error-detection (SEC-DED) can be concatenated to the ABR input samples to protect from single event upsets. Upon each read, the error detection and correction (EDAC) information may be used to detect or correct errors in the ABR input samples.

Multiplexing may occur at FIFO service logic 908, which may receive data samples from FIFO set 906. The data samples from FIFO set 906 may be output by FIFO service logic 908 according to a classic round-robin scheme. For example, one entry (an ABR input sample) can be read from each non-empty FIFO set 906 in numerical order. Empty FIFOs of FIFO set 906 may be ignored and do not impose a processing penalty.

Rounding and truncation module 910 of transformation module 918 may receive ABR input samples from FIFO service logic 908. The ABR input samples may often have more precision than is required for a particular channel. Symmetric Round-Half-Up (away from zero) for two's complement numbers may be performed by rounding and truncation module 910. For the even and odd data samples, for example DATA_EVEN and DATA_ODD, this may be determined by examining the SAMP_SIZE input that arrived with that particular sample. For example, a SAMP_SIZE of "10" may indicate that each sample of the pair is rounded to 6-bit. A SAMP_SIZE of "01" may indicate rounding to 4-bit. If SAMP_SIZE is "11" or "00", the even and odd data samples may remain unchanged.

In one example, if a data sample (or data unit) is 8-bit wide, and SAMP_SIZE is "10," then one or more bits (e.g., 1) may be added to or subtracted from the data sample to round up or round down the data sample, and the rounded data sample is truncated from 8-bits to 6 bits.

A data packer module such as data packer 912 of transformation module 918 may receive the rounded and truncated data samples from rounding and truncating module 910. Data packer 912, which may be a 4- to 8-bit data packer, may pack the data samples more efficiently. In one aspect, if the SAMP_SIZE of a sample is "01", this indicates that the DATA_EVEN and DATA_ODD vectors each only contain 4 bits of significant data in their upper nibbles. For example DATA_EVEN(7:4) and DATA_ODD(7:4) contain valid data but the contents of DATA_EVEN(3:0) and DATA_ODD(3:0) may be considered as zero. A bank of shift registers (one per channel) may be implemented so that two samples are packed in each DATA_EVEN and DATA_ODD. DATA_EVEN would be comprised of the samples (EVEN_0, EVEN_1), with EVEN_0 occupying the most significant 4 bits. DATA_ODD would be packed similarly, (ODD_0, ODD_1).

Figure 10:
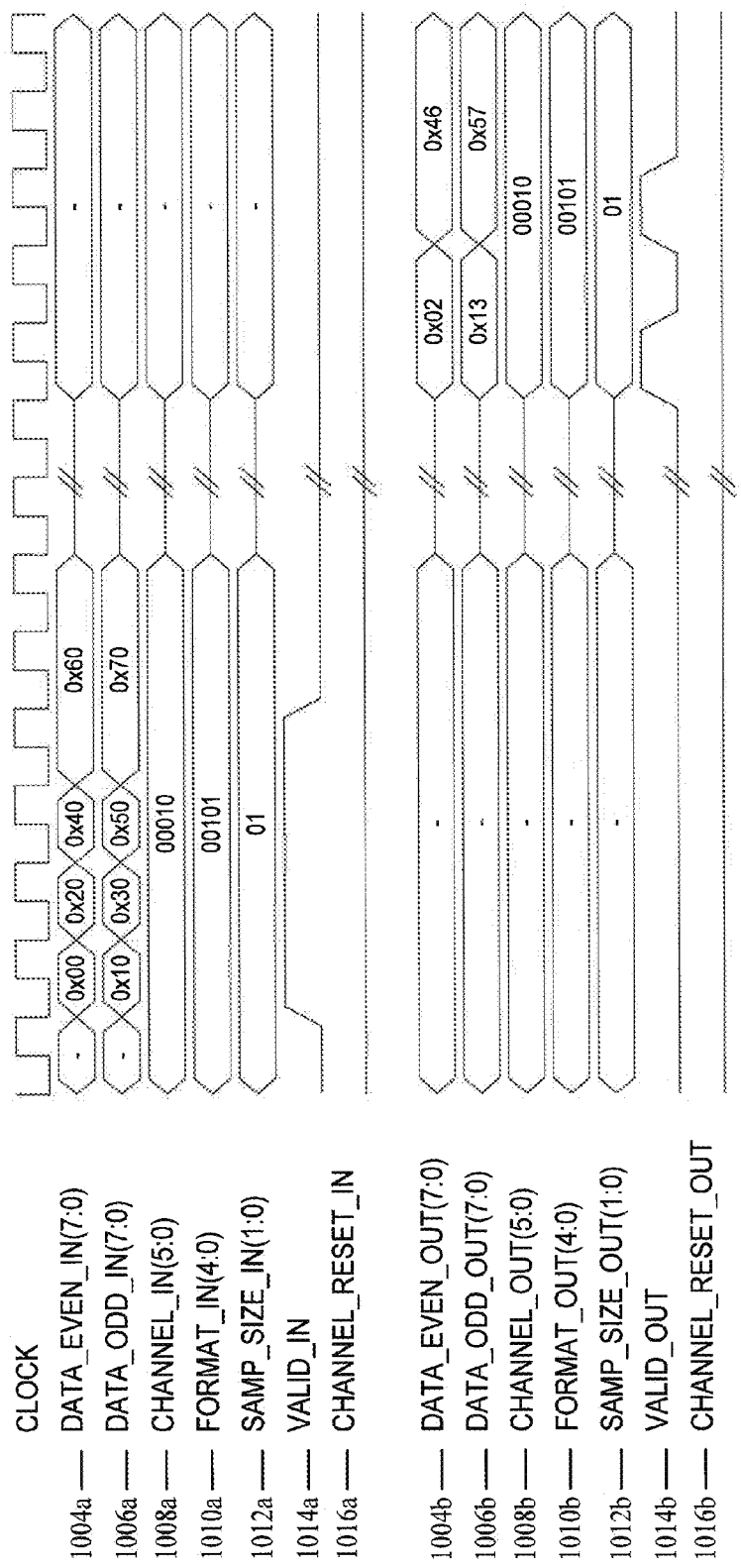
FIG. 10 illustrates an example of a timing diagram of data packing, in accordance with one aspect of the disclosure.

FIG. 10 illustrates an example of a timing diagram of data being packed by data packer 912. In this example, 4-bit samples are packed into 8-bit samples. The data may be in the ABR interface 200 of FIG. 2. The data being input into data packer 912 of FIG. 9 is represented by DATA_EVEN_IN 1004a, DATA_ODD_IN 1006a, CHANNEL_IN 1008a, FORMAT_IN 1010a, SAMP_SIZE_IN 1012a, DATA_VALID_IN 1014a, and CHANNEL_RESET_IN 1016a. The data being output by data packer 912 after having been packed is represented by DATA_EVEN_OUT 1004b, DATA_ODD_OUT 1006b, CHANNEL_OUT 1008b, FORMAT_OUT 1010b, SAMP_SIZE_OUT 1012b, DATA_VALID_OUT 1014b, and CHANNEL_RESET_OUT 1016b.

In this example, SAMP_SIZE_IN 1012a is '01' indicating that only the four most significant bits (7:4) of DATA_EVEN_IN 1004a and DATA_ODD_IN 1006a are maintained. Thus, as shown in FIG. 10, the hexadecimal values 0x0, 0x2, 0x4, and 0x6 of DATA_EVEN_IN 1004a are the four most significant bits of 0x00, 0x20, 0x40, and 0x60, which occupies the EVEN_0 position, for each DATA_EVEN_IN 1004a sample. Similarly, the hexadecimal values 0x1, 0x3, 0x5, and 0x7 of DATA_ODD_IN 1006a are the four most significant bits of 0x10, 0x30, 0x50, and 0x70, which occupies the ODD_0 position for each DATA_ODD_IN 1006a sample. DATA_EVEN_OUT 1004b comprises the four most significant bits of DATA_EVEN_IN 1004a packed together. Thus, DATA_EVEN_OUT 1004b has the hexadecimal values 0x0 and 0x2 packed together as one data word (0x02), and the hexadecimal values 0x4 and 0x6 packed together as another data word (0x46). Similarly, DATA_ODD_OUT 1006b comprises the four most significant bits of DATA_ODD_IN 1006a. Thus, DATA_ODD_OUT 1006b has the hexadecimal values 0x1 and 0x3 packed together as one data word (0x13), and the hexadecimal values 0x5 and 0x7 packed together as another data word (0x57).

In this example, a bit-width conversion process may be performed by producing a second single data stream (e.g., 1004b, 1006b, 1008b, 1010b, 1012b, 1014b and 1016b in FIG. 10), based on a first single data stream (e.g., 1004a, 1006a, 1008a, 1010a, 1012a, 1014a and 1016a in FIG. 10) according to one aspect of the disclosure. A second single data stream may comprise data units (e.g., 8-bit data units output on 1004b and/or 1006b in FIG. 10), channel identifiers (e.g., 6-bit identifiers output on 1008b in FIG. 10), format indicators (e.g., 5-bit indicators output on 1010b in FIG. 10), sample size indicators (e.g., 2-bit indicators output on 1012b in FIG. 10), and valid data indicators (e.g., 1-bit indicators output on 1014b in FIG. 10). A second single data stream may be produced by packing two or more data units (e.g., hexadecimal values 0x0 and 0x2 of DATA_EVEN_IN 1004a in FIG. 10) associated with one of the channel identifiers into one of the third data units (e.g., DATA_EVEN_OUT 1004b in FIG. 10). Similarly, two or more data units (e.g., hexadecimal values 0x1 and 0x3 of DATA_ODD_IN 1006a) may be packed into another one of the third data units (e.g., DATA_ODD_OUT 1006b). The significant bit width (e.g., 8 bits) of the one, of the third data units may be greater than the significant bit width (e.g., 4 bits) of each of the two or more second data units.

Turning back to FIG. 9, a rate limiter such as credit-based rate limiter 914 of transformation module 918 may receive the data from data packer 912 to limit the rate of the data. The ABR interface 200 may operate at 1,600 Mbps, however the downstream framer 110 generally cannot handle more than 800 Mbps. For this reason, the output of first stage multiplexer 900 may have a rate limiter instantiated that will receive 8192 bits (1024 bytes) of credit every four payload frame (1024) cycles. Each time a data sample is written to the output bus, an appropriate number of bits may be decremented from the credit counter based on the current SAMP_SIZE. Once the credit counter reaches 0, no more data can be written to the output bus until the next credit of 8192 bits. Otherwise, the data may be discarded.

In this example, ABR output 916 corresponds to ABR output 810a illustrated in FIG. 8. For example, ABR output 916 may be the inter-mux primary data stream in the ABR interface 200 of FIG. 2.

With respect to the service streams, incoming data 902 may also correspond to the SC UR inputs of incoming data 802. For example, incoming data 902 may comprise SC UR inputs 902b, 902d, 902f, and 902h in the UR service channel interface 300. These inputs may be the service streams in the UR service channel interface 300. First stage multiplexer 900 can receive more or fewer SC UR inputs than shown.

SC service logic output mux 918 may receive incoming data 902, specifically the SC UR inputs 902b, 902d, 902f, and 902h. The service channel data path may be very low rate (exactly 1 Mbps after rounding) and may have the requirement that only one service channel may be active during any given clock cycle. In accordance with one aspect of the disclosure, when exactly one SC_DATA_EN input is '1', its corresponding SC_DATA will be output by SC service logic output mux 918. If none of the SC_DATA_EN signals are '1' or more than one is '1' no data will be output.

Rounding and truncation module 920 may receive the output of SC service logic output mux 918 to perform rounding and truncation on the service channel data. In one aspect, the service channel data is always rounded and truncated to 5-bit and then outputted. In this example, SC RT output 922 corresponds to SC RT output 810b illustrated in FIG. 8. For example, SC RT output 922 may be the inter-mux service stream in the RT service channel interface 500.

Figure 11:
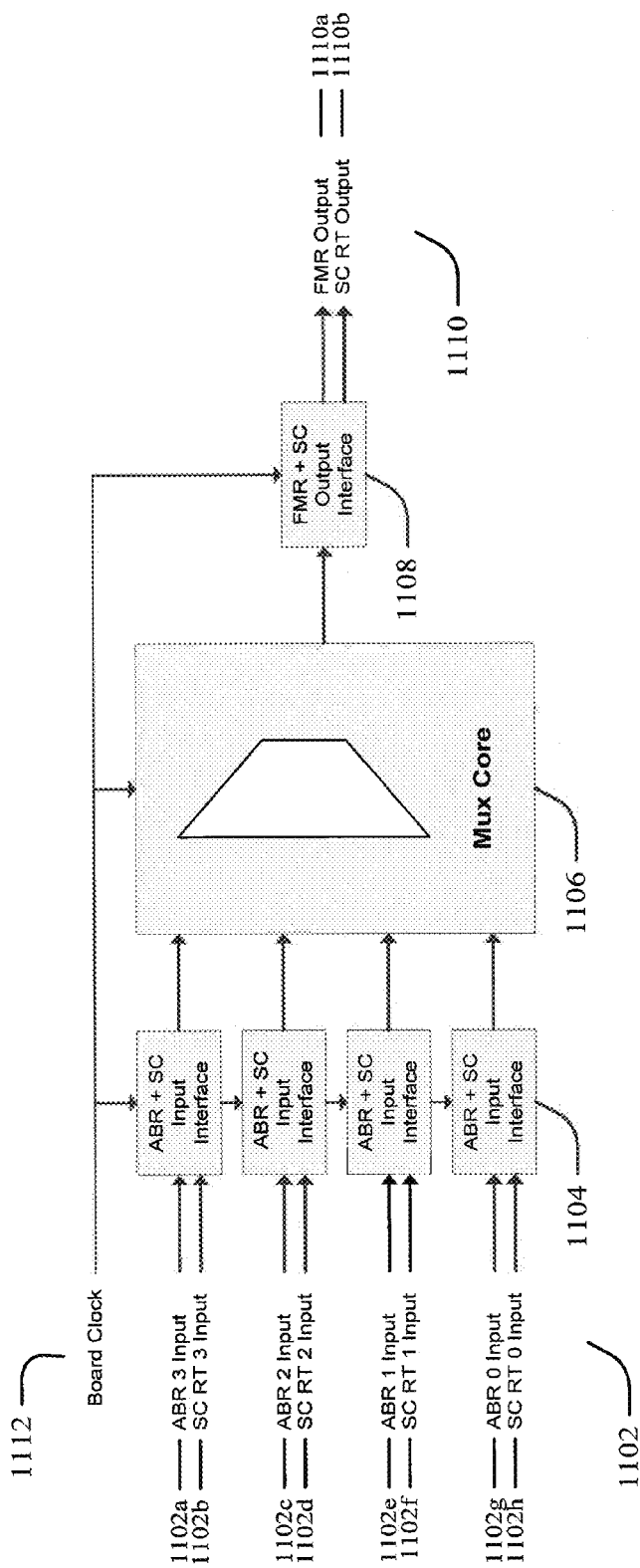
FIG. 11 illustrates an example of a second stage multiplexer, in accordance with one aspect of the disclosure.

FIG. 11 illustrates an example of a second stage multiplexer, in accordance with one aspect of the disclosure.

ABR+SC input interface 1104 may sample the incoming data 1102 from first stage multiplexers 806 on the rising edge of its associated interface clock. For example, incoming data 1102 may correspond to ABR output 916 and may comprise ABR inputs 1102a, 1102c, 1102e, and 1102g in the ABR interface 200. These inputs may be the inter-mux primary data streams in the ABR interface 200. Incoming data 1102 may also correspond to SC RT output 922 and may comprise SC RT inputs 1102b, 1102d, 1102f, and 1102h in the RT service channel interface 500. These inputs may be the inter-mux service stream in the RT service channel interface 500. A larger or smaller number of ABR+SC input interfaces 1104 than shown in FIG. 11 may be used depending on the number of incoming data ports used. Incoming data 1102 may be synchronized to system clock 1112 (e.g., board clock) through the use of a ring buffer.

Second stage multiplexer 1106 may correspond to the second stage multiplexer 108b as shown in FIG. 1. In one aspect, second stage multiplexer 1106 may have a 24-bit output. However, other configurations of second stage multiplexer 1106 can have outputs with a different number of bits (e.g., greater than 24 bits or less than 24 bits). Second stage multiplexer 1106 may receive incoming data 1102 from ABR+SC input interfaces 1104 and aggregate incoming data 1102 into one stream for ABR inputs, for example a framer primary data stream on framer link 124, and another stream for SC RT inputs, for example a framer service stream on framer link 124. According to one aspect of the disclosure, second stage multiplexer 1106 may aggregate incoming data 1102 even though incoming data 1102 may comprise data that is variable in rate and size. For example, second stage multiplexer 1106 may aggregate incoming data 1102, which may be as slow as a few kbps to as fast as 800 Mbps.

In one aspect of the disclosure, the clock of second stage multiplexer 1106 runs at the maximum or highest data rate. For example, if the maximum or highest data rate of incoming data 1102 is 100 megahertz (MHz), then the clock of second stage multiplexer 1106 is also running at 100 MHz. This allows second stage multiplexer 1106 to receive data varying in rate by processing the data at a rate no slower than the maximum switching rate.

Framer (FMR)+SC output interface 1108 may transmit outgoing data 1110 out of second stage multiplexer 1106 and transitions on the falling edge of the board clock. For example, outgoing data 1110 may comprise FMR output 1110a in the framer interface 400. This output may be the framer primary data stream in the framer interface 400. Outgoing data 1110 may also comprise SC RT output 1110b in the RT service channel interface 500. This output may be the framer service stream in the RT service channel interface 500.

Figure 12:
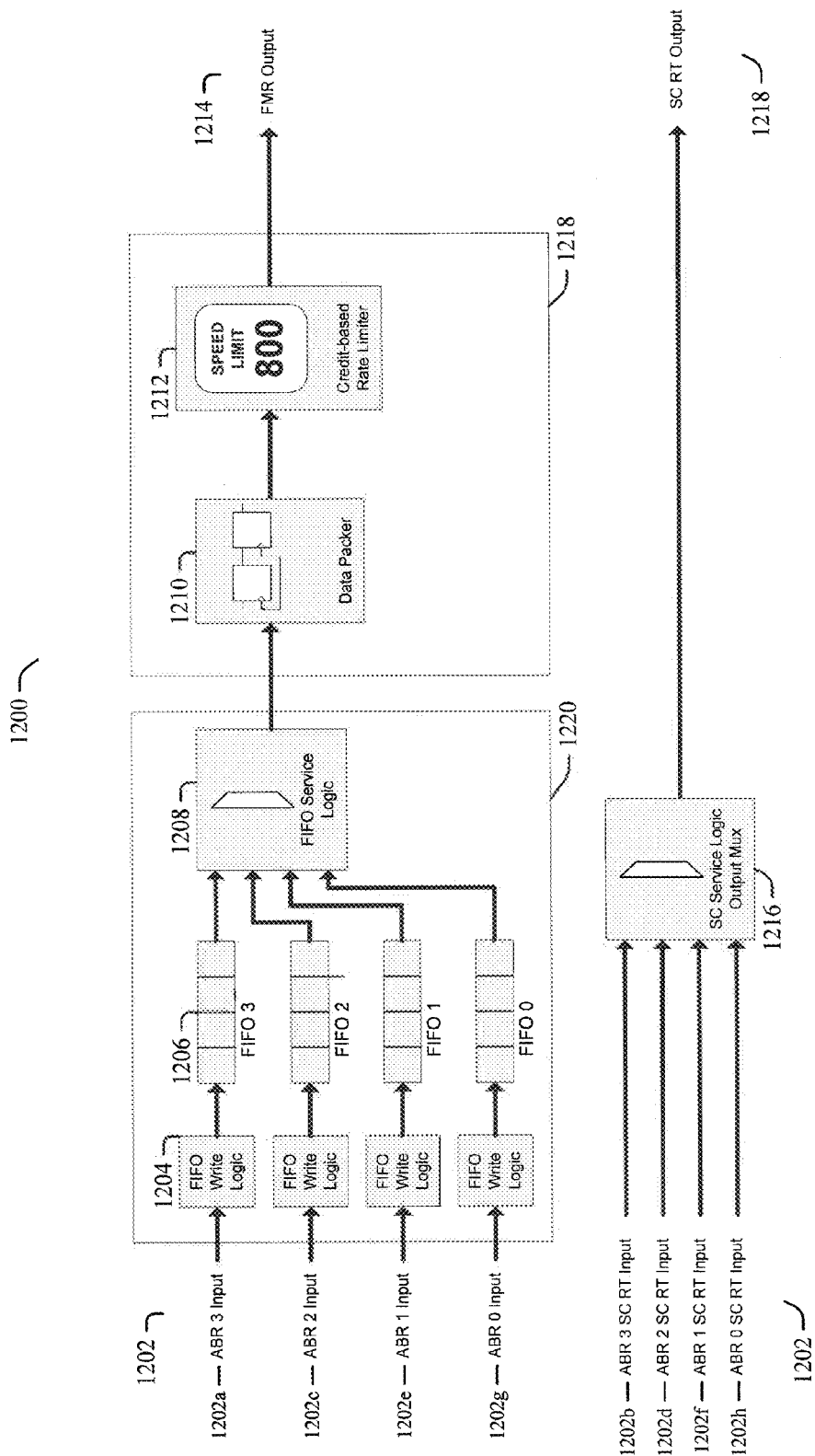
FIG. 12 illustrates an example of a core of a second stage multiplexer, in accordance with one aspect of the disclosure.

FIG. 12 illustrates an example of the core of a second stage multiplexer, in accordance with one aspect of the disclosure.

An example of the second stage multiplexer 1106 shown in FIG. 11 is shown in more detail in FIG. 12. Second stage multiplexer 1200 may comprise multiplexing module 1220 and transformation module 1218.

In this example, incoming data 1202 corresponds to the ABR inputs of incoming data 1102. For example, incoming data 1202 may comprise ABR inputs 1202*a*, 1202*c*, 1202*e*, and 1202*g* in the ABR interface 200. These inputs may be the inter-mux primary data streams in the ABR interface 200. Second stage multiplexer 1200 can receive more or fewer ABR inputs than shown.

Multiplexing module 1220 may receive incoming data 1202 (e.g., the inter-mux primary data streams) and combine the incoming data 1202 into a single stream (e.g., framer primary data stream). Specifically, multiplexing module 1220 may comprise FIFO write logic 1204, FIFO set 1206, and FIFO service logic 1208. FIFO write logic 1204 may receive incoming data 1202, specifically the ABR inputs 1202*a*, 1202*c*, 1202*e*, and 1202*g*. With respect to the ABR interface 200, FIFO write logic 1204 may write incoming data 1202 to a FIFO set 1206 if DATA_VALID is '1' or if CHANNEL_ RESET is '1'. FIFO write logic 1204 may also maintain a count of how many samples were successfully written to FIFO set 1206 and how many were dropped due to FIFO set 1206 being full.

Because second stage multiplexer 1200 may be a data interleaver, buffering can be implemented to ensure that data samples which arrive during the same clock cycle from different sources are not dropped. For example, FIFO set 1206 may store incoming data 1202 for buffering. Upon each write, 8-bits of SEC-DED can be concatenated to the ABR input samples to protect from single event upsets. Upon each read, the EDAC information may be used to detect or correct errors in the ABR input samples.

Multiplexing may occur at FIFO service logic 1208, which may receive data samples from FIFO set 1206. The data samples from FIFO set 1206 may be output by FIFO service logic 1208 according to a classic round-robin scheme. For example, one entry (an ABR input sample) can be read from each non-empty FIFO set 1206 in numerical order. Empty FIFOs in FIFO set 1206 may be ignored and do not impose a processing penalty.

A data packer module such as data packer 1210 of transformation module 1218 may receive the data samples from FIFO service logic 1208. Data packer 1210, which may be a 24-bit data packer, may pack the data samples more efficiently. According to one aspect of the disclosure, if second stage multiplexer 1200 is configured to output data to a framer chip (i.e., framer 110), the outgoing data may be packed into a 24-bit wide word on a per channel basis. In one aspect, 24 bits is the chosen data width because it is evenly divisible by sample sizes 4, 6, or 8. A bank of shift registers (one per channel) may be implemented to provide the necessary temporary storage and data packing. 4-bit samples (SAMP_ SIZE="01") may be packed with 3 even and 3 odd samples per 24-bit data word. 6-bit samples are packed 2 even and 2 odd per word. 8-bit or PRBS (SAMP_SIZE="00" or SAMP_ SIZE="11") samples are packed in an alternating pattern of even, odd, even for the first word followed by odd, even, odd for the second word.

Figure 13:
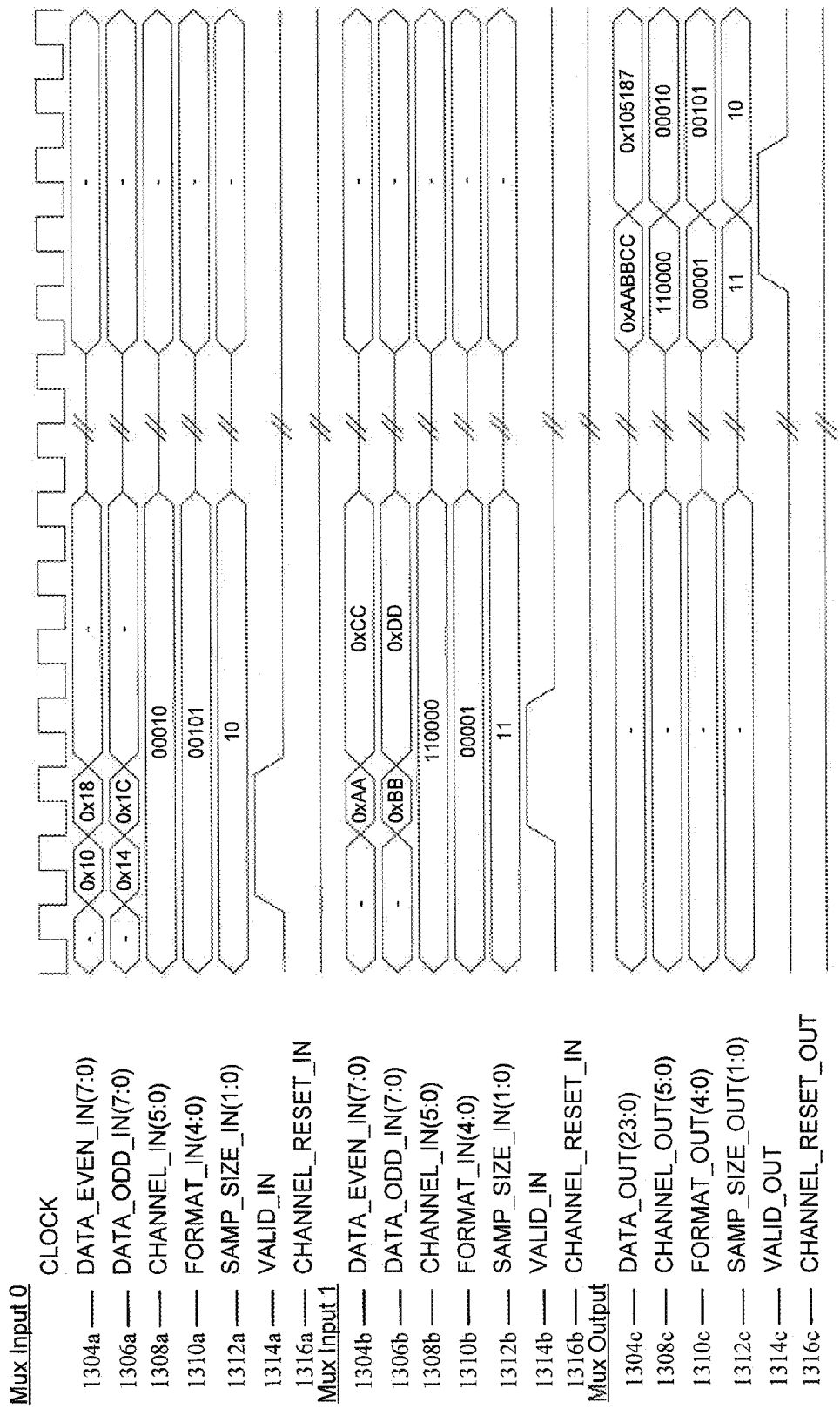
FIG. 13 illustrates an example of a timing diagram of data packing, in accordance with one aspect of the disclosure.

FIG. 13 illustrates an example of a timing diagram of data being packed by data packer 1210. In this example, 6-bit to 24-bit packing and 8-bit to 24-bit packing is shown. Mux Input 0 illustrates the 6-bit data in the ABR interface 200 and is represented by DATA_EVEN_IN 1304*a*, DATA_ODD_IN 1306*a*, CHANNEL_IN 1308*a*, FORMAT_IN 1310*a*, SAMP_ SIZE_IN 1312*a*, DATA_VALID_IN 1314*a*, and CHANNEL_RESET_IN 1316*a*. Mux Input 1 illustrates the 8-bit data in the ABR interface 200 and is represented by DATA_EVEN_IN 1304*b*, DATA_ODD_IN 1306*b*, CHANNEL_IN 1308*b*, FORMAT_IN 1310*b*, SAMP_SIZE_IN 1312*b*, DATA_VALID_IN 1314*b*, and CHANNEL_RESET_IN 1316*b*. The data being output by data packer 1210 after having been packed is in the framer interface 400 and is represented by DATA_OUT 1304*c*, CHANNEL_OUT 1308*c*, FORMAT_OUT 1310*c*, SAMP_SIZE_OUT 1312*c*, DATA_VALID_OUT 1314*c*, and CHANNEL_RESET_OUT 1316*c*.

In one aspect, if the sample size is 4-bit, the data is packed (EVEN_0, ODD_0, EVEN_1, ODD_1, EVEN_2, ODD_2), where EVEN_0 is the oldest and is packed in the most significant 4-bits. Similarly, in another aspect, 6-bit samples are packed (EVEN_0, ODD_0, EVEN_1, ODD_1). In another aspect, 8-bit samples have an alternating format of (EVEN_0, ODD_0, EVEN_1) and (ODD_1, EVEN_2, ODD_2). In this example, SAMP_SIZE_IN 1312*a* is set as '10', indicating that Mux Input 0 is a pair of 6-bit data of channel '00010', as indicated by CHANNEL_IN 1308*a*. Consequently, the data is packed in such a way that the six most significant bits of 0x10 (e.g., EVEN_0) is used to form the (23:18) bits of DATA_OUT 1304*c*, the six most significant bits of 0x14 (e.g., ODD_0) is used to form the (17:12) bits of DATA_OUT 1304*c*, the six most significant bits of 0x18 is (e.g., EVEN_1) used to form the (11:6) bits of DATA_OUT 1304*c*, and the six most significant bits of 0x1C (e.g., ODD_1) is used to form the (5:0) bits of DATA_OUT 1304*c*. DATA_OUT 1304*c* is shown in FIG. 13 as a 24-bit word of 0x105187 under the same channel '00010'.

Similarly, SAMP_SIZE_IN 1312*b* is set as '11', indicating that Mux Input 1 is a pair of 8-bit data of channel '110000', as indicated by CHANNEL_IN 1308*b*. Consequently, the data is packed in such a way that the 8 bits of 0xAA (e.g., EVEN_0) is used to form the (23:16) bits of DATA_OUT 1304*c*, the 8 bits of 0xBB (e.g., ODD_0) is used to form the (15:8) bits of DATA_OUT 1304*c*, and the 8 bits of 0xCC (e.g., EVEN_1) is used to form the (7:0) bits of DATA_OUT 1304*c*. DATA_OUT 1304*c* is shown in FIG. 13 as a 24-bit word of 0xAABBCC under the same channel '110000'. Thus, FIG. 13 shows that the multiple inputs do not interfere with one another due to the independent control per channel.

In this example, a bit-width conversion process may be performed by producing a second single data stream (e.g., 1304*c*, 1308*c*, 1310*c*, 1312*c*, 1314*c* and 1316*c* in FIG. 13), based on a first single data stream (e.g., 1304*b*, 1306*b*, 1308*b*, 1310*b*, 1312*b*, 1314*b* and 1316*b* in FIG. 13) according to one aspect of the disclosure. A second single data stream may comprise data units (e.g., 24-bit data units output on 1304*c* in FIG. 13), channel identifiers (e.g., 6-bit identifiers output on 1308*c* in FIG. 13), format indicators (e.g., 5-bit indicators output on 1310*c* in FIG. 13), sample size indicators (e.g., 2-bit indicators output on 1312*c* in FIG. 13), and valid data indicators (e.g., 1-bit indicators output on 1314*c* in FIG. 13). A second single data stream may be produced by packing two or more data units (e.g., 8 bits of 0xAA, 8 bits of 0xBB and 8 bits of 0xCC on 1304*b* and 1306*b* in FIG. 13) associated with one of the channel identifiers (e.g., 110000) into one of the third data units (e.g., 24-bits of DATA_OUT 1304*c* in FIG. 13). The significant bit width (e.g., 24 bits) of the one of the third data units is greater than the significant bit width (e.g., 8 bits) of each of the two or more second data units.

Turning back to FIG. 12, a rate limiter such as credit-based rate limiter 1212 of transformation module 1218 may receive the data from data packer 1210 to limit the rate of the data. The ABR interface 200 may operate at 1,600 Mbps, however the downstream framer 110 generally cannot handle more than 800 Mbps. For this reason, the output of second stage multiplexer 1200 may have a rate limiter instantiated that will receive 8192 bits (1024 bytes) of credit every four payload frame (1024) cycles. Each time a data sample is written to the output bus, an appropriate number of bits may be decremented from the credit counter based on the current SAMP_SIZE. Once the credit counter reaches 0, no more data can be written to the output bus until the next credit of 8192 bits. Otherwise the data may be discarded.

In this example, FMR output 1214 corresponds to FMR output 1110a illustrated in FIG. 11. For example, FMR output 1214 may be the framer primary data stream in the framer interface 400.

With respect to the service streams, incoming data 1202 may also correspond to the SC RT inputs of incoming data 1102. For example, incoming data 1202 may comprise SC RT inputs 1202b, 1202d, 1202f, and 1202h in the RT service channel interface 500. These inputs may be the inter-mux service stream in the RT service channel interface 500. Second stage multiplexer 1200 can receive more or less SC RT inputs than shown.

SC service logic output mux 1216 may receive incoming data 1202, specifically the SC RT inputs 1202b, 1202d, 1202f, and 1202h. The service channel data path may be very low rate (e.g., exactly 1 Mbps after rounding) and may have the requirement that only one service channel may be active at any given moment. In accordance with one aspect of the disclosure, when exactly one SC_DATA_EN input is '1', its corresponding SC_DATA will be output by SC service logic output mux 1216. If none of the SC_DATA_EN signals are '1' or more than one is '1' no data will be output.

In this example, SC RT output 1218 corresponds to SC RT output 1110b illustrated in FIG. 11. For example, SC RT output 1218 may be the framer service stream in the RT service channel interface 500.

Figure 14:
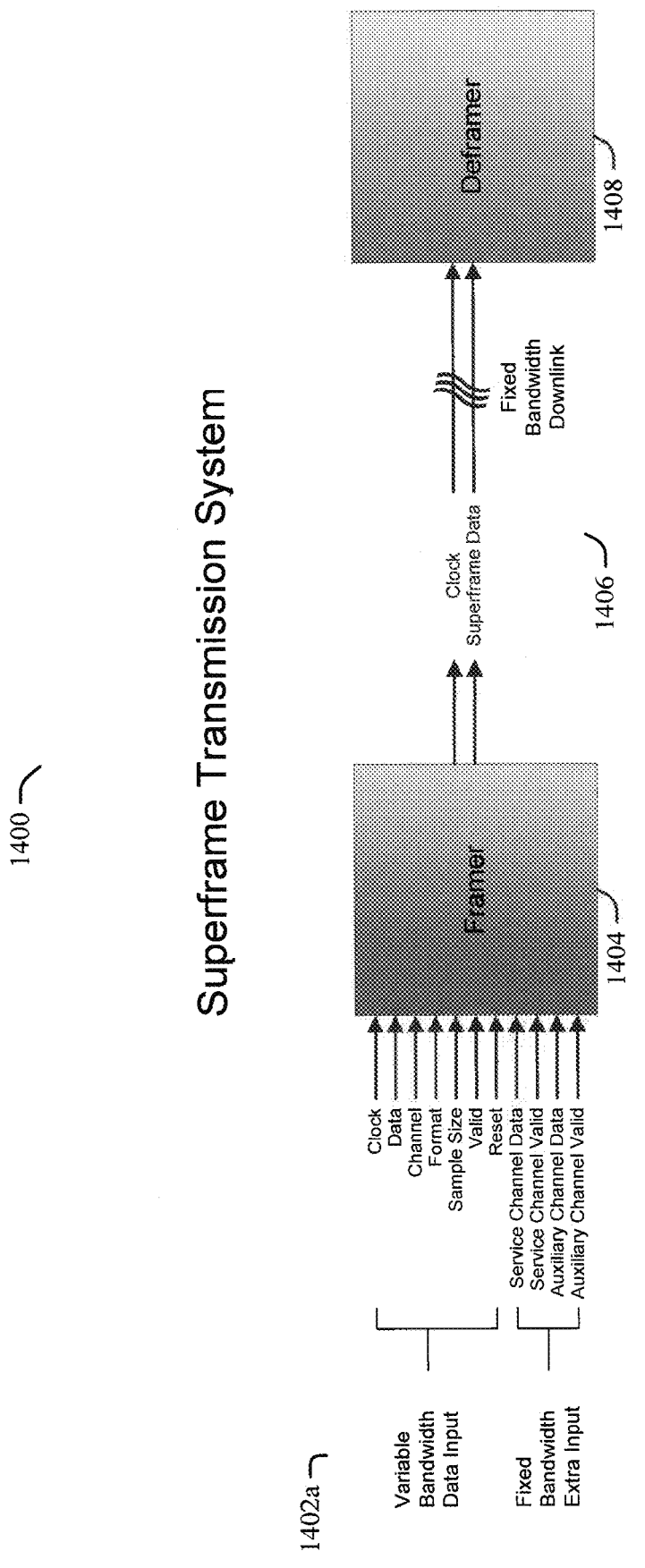
FIG. 14 illustrates an example of a superframe transmission system, in accordance with one aspect of the disclosure.

FIG. 14 illustrates an example of a superframe transmission system, in accordance with one aspect of the disclosure.

Superframe transmission system 1400 may support a framing scheme used to transport channelized data, for example from framer 1404 to deframer 1408 via downlink 1406. Framer primary input 1402a may be a variable bandwidth data input and may correspond to FMR output 1214 illustrated in FIG. 12. For example, primary framer input 1402a may be the framer primary data stream in the framer interface 400 of FIG. 4. Extra input 1402b may be a fixed bandwidth extra input and may correspond in part to SC RT output 1218 illustrated in FIG. 12. For example, extra input 1402b may comprise the framer service stream in the RT service channel interface 500 of FIG. 5. Additionally, extra input 1402b may comprise an auxiliary stream in the auxiliary channel interface 600 of FIG. 6.

Framer 1404 receives framer primary input 1402a and extra input 1402b and may identify the individual data channel sources within the streams and allocate the channel data to frames according, to each channel's bandwidth. By using such a framing scheme, framer 1404 is able to transport the channelized data on a downlink 1406. Downlink 1406 may be a satellite downlink for transporting data from a satellite in space to ground stations. Deframer 1408 may extract individual data streams in the superframe format and restore the streams to the original formats. In accordance with one aspect of the disclosure, framer 1404 may be framer 110 of FIG. 1, and deframer 1408 may be deframer 112 of FIG. 1.

Figures 2, 15A:
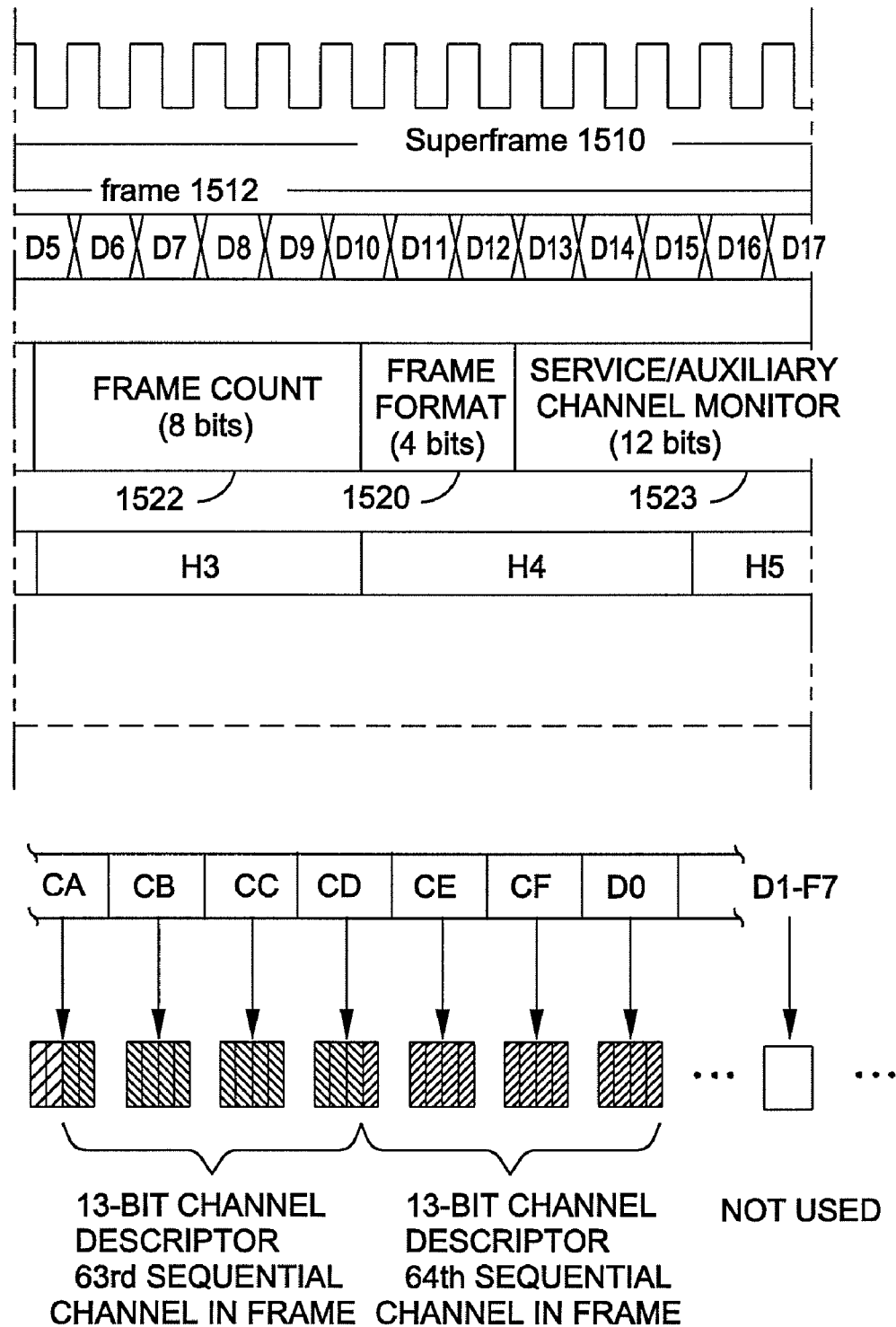
FIG. 15A illustrates an example of a superframe format, in accordance with one aspect of the disclosure.
Figures 3, 15A:
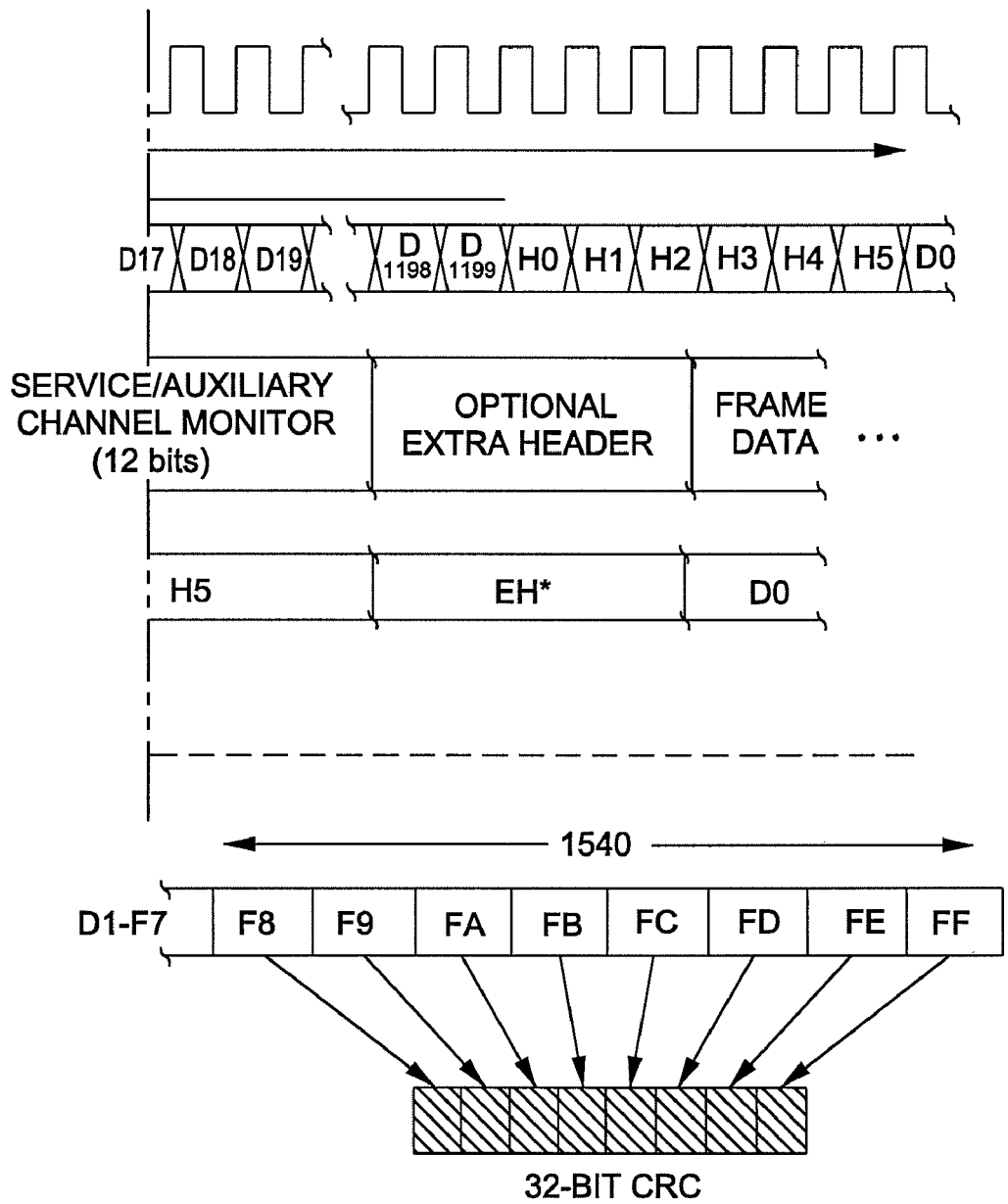

FIG. 15A illustrates an example of a superframe format, in accordance with one aspect of the disclosure.

In accordance with one aspect of the disclosure, a sensor system, such as a satellite payload, acquires and processes data streams from multiple sources (channels) that vary in bits of significance (sample size) and data rate (bits per second). According to one aspect, to be transmitted on a fixed data rate downlink, this data of varying rate (or length) needs to be presented in a fixed-rate format. This disclosure describes a novel method for the transmission of channelized data using self-describing superframes.

According to one aspect of the disclosure, a superframe such as a variable bandwidth receiver (VBR) superframe 1510 is a framing scheme used to transport channelized data. In one example, each superframe 1510 is a set of 256 frames. One frame is shown as frame 1512, in this example. In one example, a frame may contain anywhere between 0 and 64 data channels, and each frame in a superframe has the same set of channels. In one example, each channel may have one of a predefined set of bandwidths and a sample size that is either 4-, 6-, or 8-bit.

In one example, the number of channels in a superframe as well as each channel identifier (channel number), sample size indicator (sample size), and format indicator (format or bandwidth) are described by frame headers' Format fields. One of these frame header Format fields is shown as a frame format 1520 in header 4 (H4) of frame 1512. In one aspect, these Format fields need to be collected across an entire superframe to determine the configuration. In one aspect, the contents of a frame cannot, be determined without an entire superframe. In one aspect, the channel configurations can change only on the superframe boundary. At that point channels may be reordered, added or dropped.

In addition to the data, channels, according to one aspect of the disclosure, a superframe 1510 also has an extra data channel that fills, for example, 12 bits of every 48-bit frame header. This extra channel is either auxiliary channel data or service channel data. The format bits across the frames in a superframe determine whether the auxiliary or the service channel is present. The formats of these two channels is described below.

In one aspect, the length of a frame is nominally 1206 bytes. The first six bytes are header and the remaining 1200 are payload data.

An example of a frame header is shown as fields including H0, H1, H2, H3, H4, and H5 in FIG. 15A.

Figure 15B:
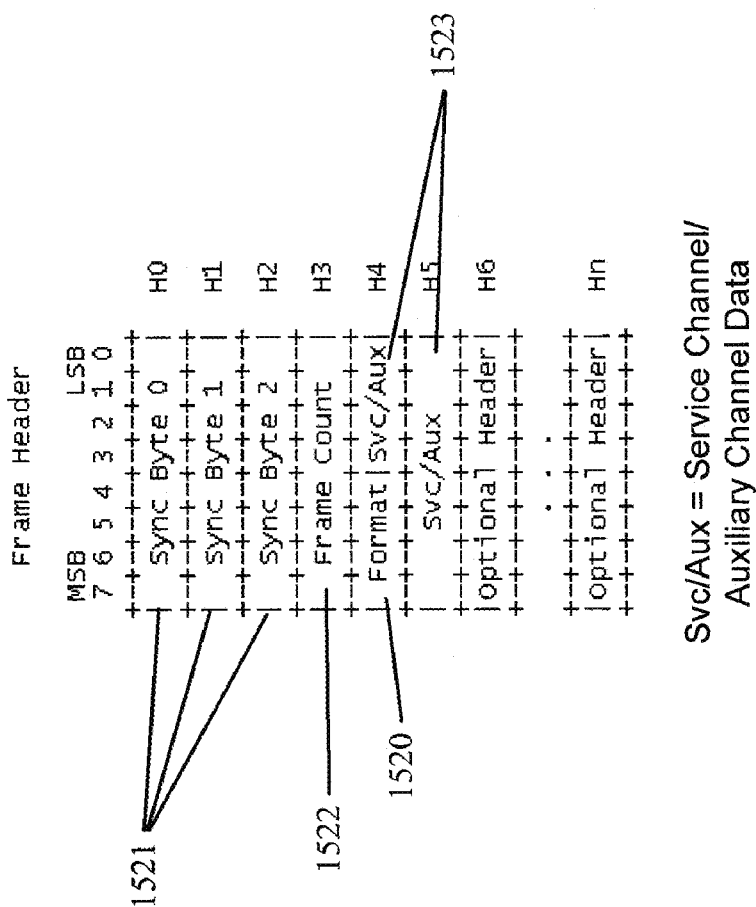
FIG. 15B illustrates an example of a frame header, in accordance with one aspect of the disclosure.

An example of a frame header is also shown in FIG. 15B according to one aspect of the disclosure. In FIG. 15B, each tick mark represents one bit position.

Referring to FIGS. 15A and 15B, a sync pattern 1521 has 24 bits, and the sync pattern field marks the start of a frame. It is designated to be 0xB3E275. A frame count 1522 has 8 bits. The frame count is the number of this frame within the 256-frame superframe. Each superframe begins at frame count 0x00 and ends with 0xFF. A frame format (e.g., 1520) has 4 bits. The combined frame format bits in all 256 frames of a superframe describe the number of channels in a superframe as well as each channel's number, bandwidth, and sample size. In one aspect, the contents of a frame cannot be determined without an entire superframe. For instance, if each frame has allocated 4 bits for a frame format, then 1024 bits in a superframe are needed to determine the configuration. This is calculated as follows: 4 bits×256 frames=1024 bits per superframe.

In one aspect, the first 3 bits (frame count 0x00 (e.g., 1530), upper format bits) is used to flag a change in format beginning with this superframe. If this value is "111", there is a format change; if "000", there is no format change. The fourth bit (frame count 0x00, lowest format bit) indicates whether the service channel or auxiliary channel, is present in the service/auxiliary field: "0" indicates service channel, "1" indicates auxiliary channel. Frame count 0x01 through 0xD0 contain a stream of 13-bit channel descriptors. An example of the format of a channel descriptor is provided below according to one aspect of the disclosure.

| Bits 12:7 | Channel Identifier | 0x00 to 0x3F |
|---|---|---|
| Bits 6:5 | Sample Size Indicator | 1 4-bit |
| | | 2 6-bit |
| | | 3 8-bit |
| | | 0 PRBS (8-bit sample size) |
| Bits 4:0 | Format Indicator | 0x00 to 0x1F (see FIG. 15C) |

Referring to FIG. 15A, in one aspect of the disclosure, the first format received, beginning with count 0x01 (e.g., 1531), begins the most significant 4 bits of the first channel descriptor in the payload. The format fields of frame counts 2 and 3 each contain the next 4 bits of the channel descriptor. Finally, frame count 4 contains the least significant bit of the first channel descriptor and starts the next channel descriptor, if present. In one aspect, all descriptors for present channels need to be contiguous beginning with frame count 0x01 and ending only when all descriptors have been included. In one aspect, when all channel descriptors have been included, remaining frame format fields in the superframe sequence up to and including frame 0xF7 need to be set to 0. The first channel descriptor with value of all 0's marks that there are no more channels in the payload. If the very first channel descriptor is all 0's, the superframe contains no channel data.

Still referring to FIG. 15A, frame count 0xF8 through 0xFF (e.g., 1540) contain a 32-bit cyclic redundancy check (CRC) calculated on the frame format field in frames 0x01 through 0xD0. The CRC's most significant bit (MSB) is in frame 0xF8 and the least significant bit (LSB) is in frame 0xFF.

Referring to FIGS. 15A and 15B, a service/auxiliary channel monitor field 1523 has 12 bits. This extra data channel is either service channel data or auxiliary channel data. The format field indicates which of the two is present.

According to one aspect of the disclosure, an auxiliary channel format field has 12-bits, and this field contains 8-bit samples. Frame 0x00 places an 8-bit sample in the most significant 8 bits of the field and the most significant 4 bits of the next sample in the least significant 4 bits of the field. Frame 0x01 completes the sample started in frame 0x00 in the most significant 4 bits of the field and places the next sample in the least significant 8 bits of the field. This pattern continues to the end of the superframe. In one example, each superframe has 12/8 samples×256 frames=384 samples per superframe.

Figure 15D:
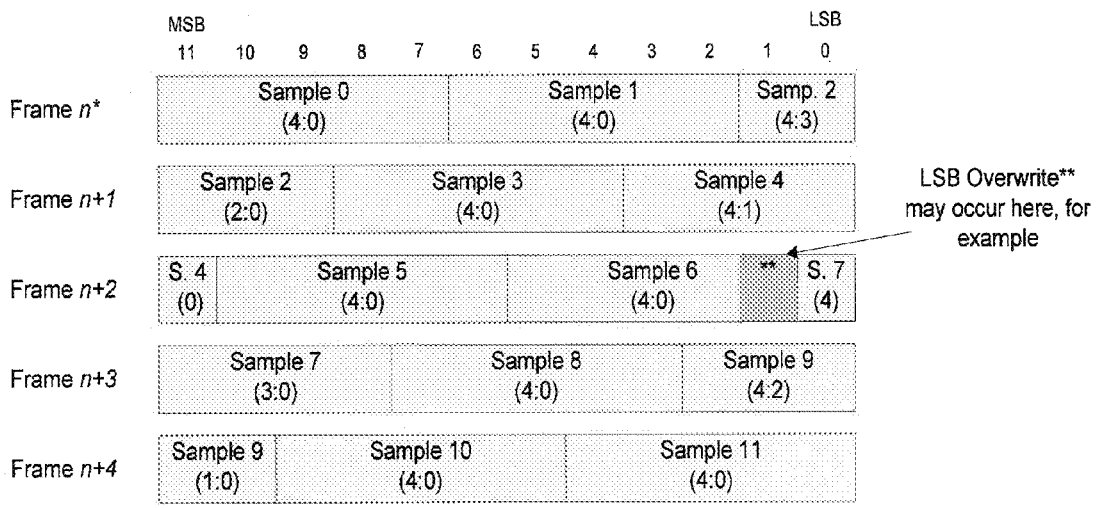
FIG. 15D illustrates an example of a service channel field, in accordance with one aspect of the disclosure.

According to one aspect of the disclosure, a service channel format field has 12-bits, and this field contains 5-bit samples in a repeating pattern according to FIG. 15D. The alignment of the samples is not determined by the frame number. Instead, a synchronization pattern is embedded in the data, in accordance with one aspect of the disclosure. A detector searches for the pattern to determine the alignment of the samples. In one example, each superframe has 12/5 samples×256 frames=614.4 samples.

Referring to FIG. 15B, optional data header words contain 0 or more bytes. These optional data header words may be inserted depending on the implementation.

According to one aspect of the disclosure, the 1200 bytes of payload (see, e.g., D0 through D1199 in FIG. 15A) contains the channel data. If 1 to 64 channels are present, channels are packed into the payload with one channel directly following another.

FIG. 15C illustrates an example of a bandwidth table according to one aspect of the disclosure. In this example, the table shows formats, the number of samples per frame, the number of bytes reserved for each channel per frame, and the frame number in which a channel fill is inserted in each superframe. For each format, the number of bytes reserved per channel per frame is determined based on the number of samples per frame (e.g., configuration/sample size combination). Any remaining payload bytes after the channels are invalid. If no channels are present, none of the payload is valid. Each channel will start at the same byte in the frame payload for every frame in the superframe.

According to one aspect, for each channel, some of the payload bytes reserved for a channel may be fill bytes. Many of the formats specify a non-integer value for the number of bytes per channel in each frame as shown in FIG. 15C. However, the same number of bytes is allotted for the channel data in each frame. Thus, the data for each channel in the frame may be followed by 0 or 1 fill byte. In a superframe set the frames with fill bytes precede the frames with no fill bytes, so the last frame in the set, frame number 255, contains no fill byte. The number of channel fill bytes determined for a given channel is shown in the channel fill per superframe column. If the table shown in FIG. 15C has a value of M for a channel, then the first M frames of the superframe will have a channel fill byte in the last byte reserved for that channel instead of valid data Thus, the first M frames will have N−1 valid channel bytes, and the last 256-M frames will have N valid channel bytes. In one aspect, the channel fill is determined completely independently for each channel. In one aspect, each channel will start at the same byte in the frame payload for every frame in the superframe regardless of other channels' fill bytes.

In one example, a sample within each channel may be 4-, 6-, or 8-bit wide. If the sample size is 8-bit, each channel data byte (ignoring channel fill bytes) is a sample. If the sample size is 4-bit, the top 4-bits of each channel data byte is one sample and the bottom 4-bits of each channel data byte is the following sample. If the sample size is 6-bit, the packing of samples starts at the channel bits in frame 0x00. The top 6-bits of the first channel byte in frame 0x00 is one sample, the bottom 2-bits of that byte are the most significant bits of the next sample, and so on. Like auxiliary channel sample packing, a sample may start in one frame and be finished in the next.

In this example of a bandwidth table shown in FIG. 15C, invalid combinations of format (configuration) and sample size are marked "N/A". For PRBS, the 8-bit columns in the chart are used.

According to one aspect of the disclosure, the subject technology allows not only the number of channels to vary but also each channel can vary in bandwidth and sample size. Stated in another way, the number of channels is not fixed, the bandwidth of each channel is not fixed, and the sample size (or data width) is not fixed. In one aspect, any one or all of these (the number of channels in a superframe, channels' bandwidths, and sample sizes) may vary at the superframe boundary.

An example is illustrated below according to one aspect of the disclosure. A first superframe may have a first number of channels (e.g., 32), a first one of the channels of the first superframe may have a first bandwidth, a second one of the channels of the first superframe may a second bandwidth, a third one of the channels of the first superframe may have a third bandwidth. The sample size of the first one of the channels may have a first sample size (e.g., 4-bit), the sample size of the second one of the channels may have a second sample size (e.g., 6-bit), and the sample size of the third one of the channels may have a third sample size (e.g., 8-bit).

A second superframe may have a second number of channels. A first one of the channels of the second superframe may have a fourth bandwidth, a second one of the channels of the second superframe may have a fifth bandwidth. The sample size of the first one of the channels of the second superframe may have a fourth sample size, and the sample size of the second one of the channels of the second superframe may have a fifth sample size.

In one aspect of the disclosure, any combination of channels is permissible as long as the absolute maximum bandwidth of the downlink is not exceeded.

An example of a channel fill per superframe calculation is described below in accordance with one aspect of the disclosure.

Given
1) Format 30 consists of 750 samples per Superframe.
2) Sample Size "01" indicates 4-bits per sample.
3) A Superframe consists of 256 Frames.

Determine
1) Bytes Per Superframe (BPSF) for Format 30 Sample Size "01".
2) Bytes Per Frame (BPF).
3) Bytes Reserved Per Frame (R).
4) Channel Fill Per Superframe (F).

Solution

1)
$$BPSF = \frac{750 \text{ samples}}{Superframe} \times \frac{4 \text{ bits}}{\text{samples}} \times \frac{1 \text{ byte}}{8 \text{ bits}}$$
$$BPSF = 375 \frac{\text{bytes}}{Superframe}$$

2)
$$BPF = BPSF \times \frac{1 \text{ } Superframe}{256 \text{ Frames}}$$
$$BPF = \frac{375 \text{ bytes}}{Superframe} \times \frac{1 \text{ } Superframe}{256 \text{ Frames}}$$
$$BPF = 1.46484375 \frac{\text{bytes}}{\text{Frame}}$$

3)
$$R = \text{Round}_{UP(BPF)}$$
$$R = \text{Round}_{UP\left(\frac{1.46484375 bytes}{Frame}\right)}$$
$$R = \frac{2 \text{ bytes}}{\text{Frame}}$$

4) Note that % indicates modulo arithmetic, also known as the remainder of long division.

$$F = \frac{256 \text{ Frames}}{Superframe} - \left(BPSF\% \frac{256 \text{ Frames}}{Superframe}\right)$$
$$F = \frac{256 \text{ Frames}}{Superframe} - \left(\frac{375 \text{ bytes}}{Superframe} \% \frac{256 \text{ Frames}}{Superframe}\right)$$
$$F = \frac{137 \text{ Frames}}{Superframe}$$

Thus, 137 frames of the superframe will have a fill byte. This matches the table entry in FIG. 15C for format 30, 4-bit. Therefore, frames 0-136 of every superframe will have two bytes reserved for the channel but only the first byte valid. The remaining frames 137-255 will have two bytes reserved for the channel and both valid.

Figure 15E:
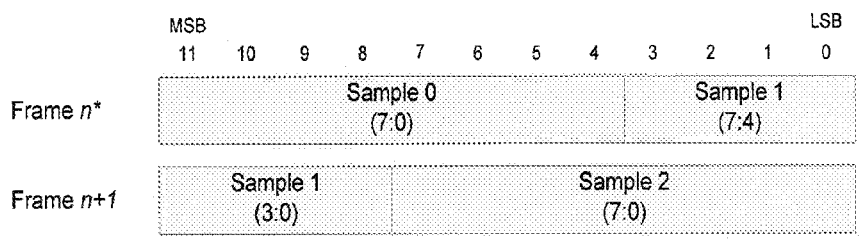
FIG. 15E illustrates an example of an auxiliary channel field, in accordance with one aspect of the disclosure.

FIG. 15D and FIG. 15E illustrate an example of a service/auxiliary channel field, in accordance with one aspect of the disclosure.

The 12-bit service/auxiliary channel field, for example service/auxiliary channel monitor field 1523, in the frame header of every frame of a superframe can be one of the two formats shown in FIG. 15D or 15E, in accordance with one aspect of the disclosure. A bit in the Format field of frame 0 may indicate which of the two is present. Whether the field is a service channel field or an auxiliary channel field may change from superframe to superframe, but it may not change mid-superframe, according to one aspect of the disclosure. The service/auxiliary channel field in every frame within one superframe can have the same one of the two formats.

FIG. 15D illustrates an example of a service channel field, in accordance with one aspect of the disclosure. The 5-bit (rounded and truncated) service channel input to the framer, which may for example be SC RT output 1218 in the RT service channel interface 500, can be packed in the frame header's 12-bit service channel field in the pattern as shown in FIG. 15D, which repeats every 5 frames, in accordance with one aspect of the disclosure.

Frame n, as shown in FIG. 15D, could be any frame in the superframe, in accordance with one aspect of the disclosure. Because the number of frames in a superframe, 256, is not divisible by the number of frames it takes to repeat the pattern shown in FIG. 15D, 5, the alignment of this pattern within the superframe changes from superframe to superframe, in accordance with one aspect of the disclosure.

The downstream system may determine the alignment of samples in the service channel field by searching for a known pattern that overwrites the least significant bit (LSB) of every 40th sample. Once the downstream system synchronizes to the pattern, it has determined the alignment of service channel samples in the service channel field, in accordance with one aspect of the disclosure.

FIG. 15E illustrates an example of an auxiliary channel field, in accordance with one aspect of the disclosure. The 8-bit auxiliary channel input to the framer, which may for example be auxiliary channel data 132, can be packed in the frame header's 12-bit auxiliary channel field in the pattern as shown in FIG. 15E, which repeats every 2 frames, in accordance with one aspect of the disclosure.

Frame n, as shown in FIG. 15E, is an even frame in the superframe, such as 0, 2, . . . , 252, 254, in accordance with one aspect of the disclosure. Because the number of frames in a superframe, 256, is divisible by the number of frames it takes to repeat the above pattern, 2, the alignment of this pattern within the superframe stays constant from superframe to superframe, in accordance with one aspect of the disclosure. No additional information may be needed to indicate the alignment of samples.

Figure 16B:
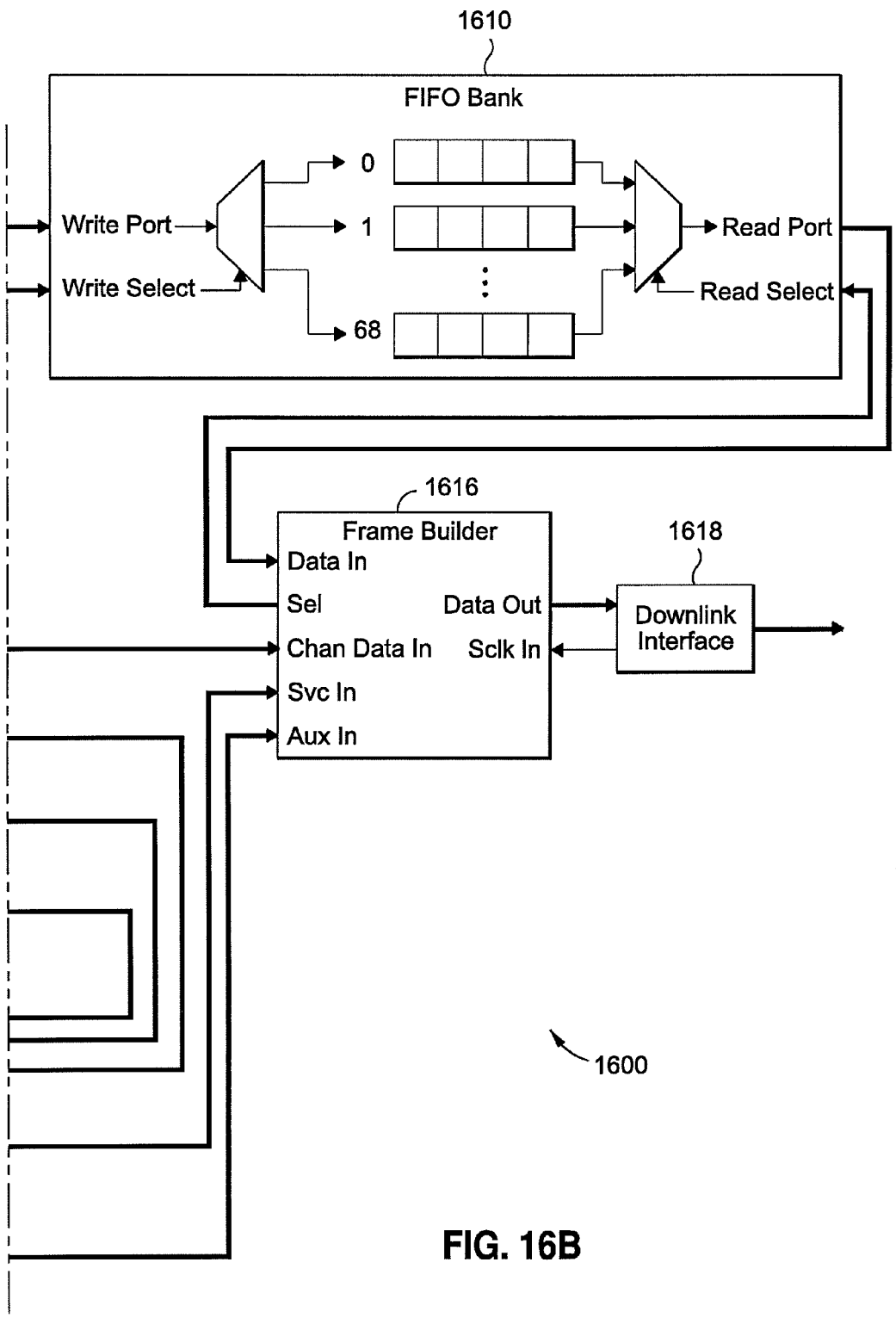
FIG. 16 illustrates an example of a framer, in accordance with one aspect of the disclosure.

FIG. 16 illustrates an example of a framer, in accordance with one aspect of the disclosure.

In one aspect, framer 1600 shown in FIG. 16 may be framer 110 of FIG. 1 or framer 1404 of FIG. 14. Frame timer 1612 may implement, for example, a number of timers to generate and provide frame state information to other components of framer 1600 (e.g., FIFO selector 1608, FIFO bank 1610, and frame builder 1616). The frame state information may include one or more of the following: the start of a superframe (SOSF), the start of a frame header (SOH), the start of frame data (SOF), the end of a frame (EOF), and the frame count. In one aspect, the frame count may provide the current frame number between 0 and 255 inclusive; each frame may have a duration of, for example, exactly 1206 100.5 MHz clock cycles.

In one example, assuming a superframe has 256 frames and a frame has 1206 bytes, after frame timer 1612 receives a system reset signal (e.g., a communication system or a framer has reset), frame timer 1612 starts to count (e.g., starting at 0 and counting up to 1205 for the number of bytes in a frame). After counting for all of the bytes in a frame (e.g., counting up to 1205), frame timer 1612 issues an end of a frame (EOF) signal. After repeating this for all of the frames in a superframe (e.g., 256 times since a superframe has 256 frames in this example), frame timer 1612 issues a start of a superframe (SOSF). Frame timer 1612 provides the frame state information (e.g., EOF, SOSF and others) to FIFO selector 1608, FIFO bank 1610, and frame builder 1616.

It should be noted that framer timer 1612 may be implemented in many different ways (e.g., hardware, software, or a combination) and is not limited to timers. In addition, the frame state information is not limited to those described above. Frame state information may include other types of information.

Register file 1620 may provide the access to various framer counter and frame state information. Register file 1620 may also allow a user to choose either service channel or auxiliary channel data to be inserted into the frame header. Bus interface 1622 may be a generic address and data bridge that can be used to interface the framer 1600 with almost any standard bus, e.g., PCI.

Framer (FMR) input interface 1604 may receive framer primary input 1602a, which may, for example, be the framer primary data stream in the framer interface 400 of FIG. 4 from data interleaver module 108 of FIG. 1. The framer primary input 1602a may include the clock from data interleaver module 108, which may be, for example, at 100 MHz. Asynchronous FIFO 1606a may be used to synchronize data from one clock domain to a second clock domain. For example, asynchronous FIFO 1606a may receive framer primary input 1602a from FMR input interface 1604 and synchronize the data from the 100 MHz data interleaver module 108 clock domain to the 100.5 MHz downlink clock domain. One reason for doing this, in accordance with one aspect, is to allow more data to be written, such as extra header information.

In accordance with one aspect, framer 1600 may be configured to handle up to 64 incoming data streams at a time, each stream identified by the 6-bit CHANNEL field. Each data stream is buffered in a FIFO that has enough capacity to store at least one frame worth of data. Since the data streams vary in bandwidth, each may have a different FIFO capacity requirement; this requirement can be determined by examining the FORMAT and SAMPLE SIZE fields of the data stream. It would not be resource efficient to implement 64 FIFOs each capable of handling the maximum bandwidth since the aggregate bandwidth of all 64 added together is less than or equal to that same maximum. Instead, a minimum number of "big" capacity FIFOs and a large number of "regular" capacity FIFOs may be implemented to handle all possible data stream bandwidth combinations.

In accordance with one aspect, it has been determined that the optimal number of FIFOs in FIFO bank 1610 may be 69 FIFOs, which include 64 regular and 5 big FIFOs. Each regular FIFO may have a capacity of 128 entries and may be suitable for channel bandwidths that are less than or equal to 150 Mbps, while each big FIFO may have a capacity of 512 entries which may be suitable for channel bandwidths greater than 150 Mbps. Regular FIFOs are numbered 0-63 and big FIFOs are numbered 64-68.

In accordance with one aspect, each superframe may comprise 256 frames numbered 0-255, and, each frame may have a duration of 1206 clock cycles. Before the start of each superframe, FIFO selector 1608 needs to map every data stream to a FIFO of the correct capacity. It also needs to unmap data streams that are no longer present. All the data stream channel-to-FIFO mappings need to go into effect at the superframe boundary.

To solve this problem, the following solution may be performed by FIFO selector 1608 according to one aspect of the disclosure. For frame count 0-251, data streams that are active are determined by monitoring the incoming streams' VALID field and incrementing a counter that corresponds to the data stream's CHANNEL. For frame count 252, inactive data streams may be those that were mapped in prior superframes but during the previous step (frame count 0-251) did not have the corresponding activity counters incremented. For each inactive stream, the status of the FIFO to which it was mapped may be changed from "mapped" to "about to be unmapped." The data stream's channel status may also be changed to "inactive."

For frame count 253-254, each data stream that did have its activity counter incremented may have its channel marked as "active." Next, for every new stream, the data stream's FORMAT and SAMPLE SIZE fields may be examined to determine if a regular or big FIFO is needed. If a regular FIFO is needed, the channel may be directly mapped to the FIFO, e.g., if the data stream's CHANNEL is 7, then FIFO number 7 would be marked as "about to be mapped". If a big FIFO is needed, a search may be made to find a big FIFO that is unmapped, which can then be changed to "about to be mapped" to the data streams' CHANNEL, e.g., a data stream with a CHANNEL of 12 could be mapped to FIFO number 65. For frame count 255, a data stream that is "active" and assigned a FIFO with status "mapped" or "about to be mapped" may be written to the mapped FIFO. At the last clock cycle of this frame, a new superframe may be put into effect by changing all the "about to be mapped" FIFOs to "mapped" status and the "about to be unmapped" FIFOs to "unmapped."

Thus, FIFO selector 1608 may receive framer primary input 1602a from asynchronous FIFO 1606a. In, one aspect, a selector such as FIFO selector 1608 may manage the allocation, deallocation, and writing of FMR data channels (e.g., the framer primary data streams) to FIFOs in a data block such as FIFO bank 1610. In one aspect, FIFO selector 1608 identifies the channels in a data stream for allocation into a superframe and deallocation from the superframe.

In accordance with one aspect of the disclosure, FIFO selector 1608 allocates a channel to the next superframe if its VALID signal was observed as '1' a minimum of three times during the current superframe period. In one aspect, FIFO selector 1608 checks for a VALID signal for multiple times (in this example, three times) to ascertain that it does not represent noise or erroneous signals. Once marked for allocation, the channel may then be mapped to an appropriately sized FIFO in FIFO bank 1610. Finally, the channel state information (valid flag, mapped FIFO number, FORMAT, SAMP_SIZE) may be written to a channel state block such as channel state RAM bank 1614.

In accordance with one aspect of the disclosure, a channel may be flagged by FIFO selector 1608 or FIFO bank 1610 for deallocation in two ways. One way is if the CHANNEL_RESET signal was observed by FIFO selector 1608 to be '1' a minimum of three times during a superframe period. Another way is if the FIFO bank 1610 marks it as "stale." A channel is stale if the FIFO to which it is mapped enters an underflow state, which is caused by the cessation of input data for a specific channel while frame builder 1616 is still attempting to fill downlink frames with data from that channel's assigned but empty FIFO in FIFO bank 1610. Once flagged for deallocation, FIFO selector 1608 directs channel state RAM bank 1614 so that the information in channel state RAM bank 1614 is set to zero and the FIFO in FIFO bank 1610 becomes eligible for mapping to a new channel.

For each data channel received by FIFO selector 1608, the channel state RAM bank 1614 may be queried to determine the channel's state. If the channel is determined to be allocated to the superframe and mapped to a FIFO, then its data is written to FIFO bank 1610. If a FIFO mapping does not exist or if the channel is flagged for deallocation, then the data is dropped.

Channel state RAM bank 1614 may be an on-chip block-RAM, with one write port and four read ports, that stores state information about each channel. The data's CHANNEL field serves as the address input. The channel state information consists of a valid flag ('1' if mapped to a FIFO, '0' otherwise), the mapped FIFO number, the FORMAT, and the SAMP_SIZE. Channel state RAM bank 1614 may also provide EDAC SEC-DED protection in case of single event upsets.

In one aspect, channel state RAM bank 1614 includes four groups of memory 1614-0, 1614-1, 1614-2, and 1614-3, connected to read port 0, 1, 2, and 3, respectively. All four groups are connected to the write port. In one aspect, the four groups are identical. For example, if there are 64 channels, then each of the four groups 1614-0, 1614-1, 1614-2, and 1614-3 includes 64 memory locations, each location is assigned to a corresponding one of the 64 channels. For instance, the first location is assigned to channel 1, the second location is assigned to channel 2, and the third location is assigned to channel 3. Each location includes the channel state information for its corresponding channel (e.g., valid flag, mapped FIFO number, FORMAT, and SAMP_SIZE of the channel).

In accordance with one aspect of the disclosure, frame builder 1616 may build and output the 1206-byte frames that make up the 256-frame superframe. Frame builder 1616 may receive the channel information from channel state RAM bank 1614 (e.g., mapped FIFO number, FORMAT and SAMP_SIZE for each channel) and the corresponding data from FIFO bank 1610. For example, for each channel specified in channel state RAM bank 1614, frame builder 1610 receives the mapped FIFO number, and frame builder 1610 can thus read the corresponding data from the mapped FIFO number of FIFO bank 1610. Frame builder 1616 can build a superframe such as superframe 1510 of FIG. 15A by obtaining the FORMAT and SAMP_SIZE for each channel from channel state RAM bank 1614 and writing these and the channel identifiers into the frame formats (e.g., frame format 1520) to form, e.g., the 13-bit channel descriptors (shown in FIG. 15A). Frame builder 1616 can obtain data corresponding to the channels from FIFO bank 1610 and write them into frame data portion of the frames (e.g., D0-D1199 shown in FIG. 15A).

At each superframe boundary, frame builder 1616 may examine the contents of channel state RAM bank 1614 to build a list of which FMR data channels will be present in the next superframe. Once this list is formed and the start of a superframe (SOSF) pulse is seen, frame builder 1616 may iterate through the list 256 times, reading the appropriate number from the mapped FIFOs in FIFO bank 1610. Frame builder 1614 may also form the frame headers and manage the insertion of service channel or auxiliary channel data.

SC input interface 1624 may receive framer service input 1602*b*, which may, for example, be the framer service stream in the RT service channel interface 500 from data interleaver module 108. The framer service input 1602*b* may be 5-bit rounded and truncated service channel data. Asynchronous FIFO 1606*b* may be used to synchronize this data from one clock domain to a second clock domain. For example, asynchronous FIFO 1606*b* may receive framer service input 1602*b* from SC input interface 1624 and synchronize the data from the 100 MHz data interleaver module 108 clock domain to the 100.5 MHz downlink clock domain. Frame builder 1616 may receive this service channel data from asynchronous FIFO 1606*b* for building the frames.

Auxiliary input interface 1626 may receive auxiliary input 1602*c*, which may, for example, be the auxiliary stream in the auxiliary channel interface 600. The auxiliary input 1602*c* may be 8-bits of auxiliary channel data. Asynchronous FIFO 1606*c* may be used to synchronize this data from one clock domain to a second clock domain. For example, asynchronous FIFO 1606*c* may receive auxiliary input 1602*c* from auxiliary input interface 1626 and synchronize the data from the 100 MHz data interleaver module 108 clock domain to the 100.5 MHz downlink clock domain. Frame builder 1616 may receive this auxiliary channel data from asynchronous FIFO 1606*c* for building the frames.

In accordance with one aspect of the disclosure, downlink interface 1618 may receive the 100.5 MHz clock from a downlink serializer chip and output frame data as one byte (8 bits) per clock cycle. In one aspect, downlink interface 1618 includes a transmitter for transmitting the frame data.

Figure 17B:
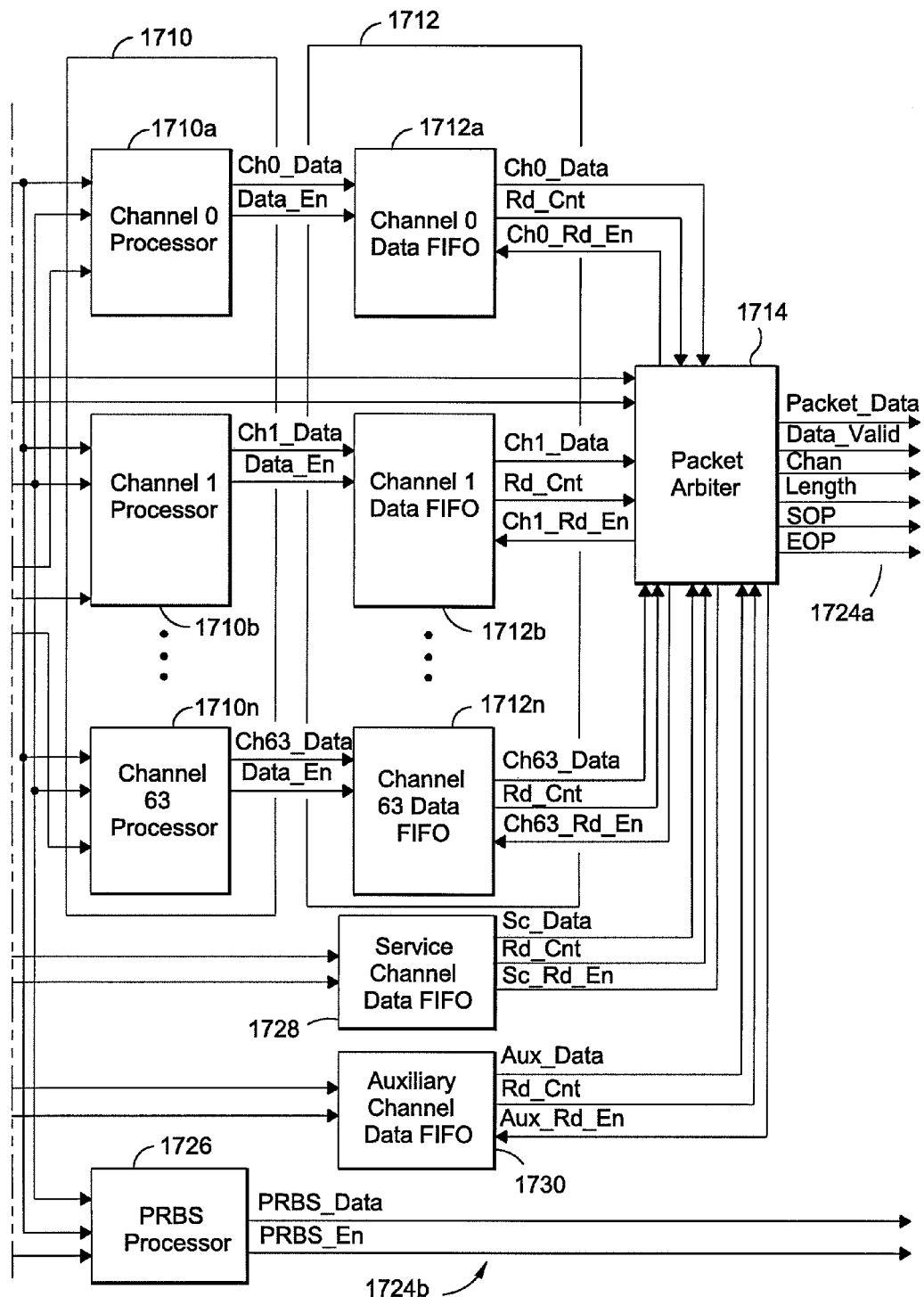
FIG. 17 illustrates an example of a deframer, in accordance with one aspect of the disclosure.

FIG. 17 illustrates an example of a deframer, in accordance with one aspect of the disclosure.

In one aspect, deframer 1700 shown in FIG. 17 may be deframer 112 of FIG. 1 or deframer 1408 of FIG. 14. Deframer 1700 may receive the superframes generated by a framer (e.g., framer 1600 of FIG. 16, framer 110 of FIG. 1, or framer 1404 of FIG. 14) and extract the original data streams. Each data stream can be demultiplexed according to the channel number and sent to the packetizer. The logic components of deframer 1700 may be configured to run on the same clock recovered from the framer.

Input module 1704 (e.g., a sync parser) may receive input 1702 (e.g., payload data) from a framer via a downlink and determine the start of a superframe. According to one aspect of the disclosure, input module 1704 determines the start of the superframe by first searching for the sync word, such as sync pattern 1521 designated as xB3E275, that starts each frame. Input module 1704 may look for the sync word in each of three consecutive frames, where the first frame has a frame number of 0. Frame 0 may be the first frame of a superframe. Once the sync word has been found in these three frames, input module 1704 may continue to check for the sync word. Input module 1704 may track sync word error bits and any loss of sync. When input module 1704 is synchronized to the sync word in each frame, it may pass frame payload data to a downstream frame data module 1732, which may comprise dual-port RAM 1706 and data reader 1708. At the same time, input module 1704 may pass frame header data to parser module 1734, service channel parser 1720, and auxiliary channel parser 1722. Parser module 1734 comprises frame format parser 1716 and translator iterator 1718.

Dual-port RAM 1706 may serve as a data storage for the payload data in one superframe received from input module 1704. In one aspect, the number of entries is 256 frames per superframe multiplied by 1200 bytes per frame payload, which equals 307,200 entries.

Frame format parser 1716 may receive input 1702 from input module 1704 and use that to determine the number of channels in the superframe and each channel's configuration by collecting the frame format bits from the headers of the 256 frames in a superframe. Frame format parser 1716 may first perform a cyclic redundancy check (CRC) on the frame format bits to verify that errors are not present. Frame format parser 1716 may next use those bits to determine the channel number, bandwidth, sample size, and start byte for each of the channels (up to, for example, 64) present in the frame. Frame format parser 1716 may also track format errors, for example an invalid bandwidth/sample size combination.

According to one aspect of the disclosure, frame format parser 1716 begins determining the number of channels in the superframe and each channel's configuration by collecting the frame format bits of frame format 1520 from the headers of the 256 frames in a superframe (see FIG. 15A). These concatenated frame format bits contain a format change flag, service/aux channel select, sixty-four 13-bit channel descriptors, and a 32-bit CRC (1540). Frame format parser 1716 may check the frame format bits for errors. In one aspect, frame format 1716 independently calculates the CRC across a subset of the frame format bits and compares the result to the 32-bit CRC field (1540) to see if there has been an error in transmission. Frame format parser 1716 may also check for a number of additional error conditions, such as two channel descriptors with the same channel number, or an invalid combination of format and sample size (indicated by a "N/A" in FIG. 15C).

Frame format parser 1716 may determine the number of channels present by counting the number of consecutive non-zero channel descriptors, starting with the first descriptor. In one aspect, each channel descriptor indicates the channel number, sample size, and format. In one aspect, if the first channel descriptor is all zeros, then there are no channels present.

Frame format parser 1716 may also determine the bandwidth and start byte for each present channel. In one aspect, frame format parser 1716 indexes the bandwidth table (as shown in FIG. 15C) with the format and the sample size to determine the number of bytes reserved for that channel per frame. Using those values, frame format parser 1716 may also determine on which byte of the frame payload (0-1199) the channel starts, also known as the channel's start byte.

According to one aspect of the disclosure, frame format parser 1716 outputs signals to register file 1736 and to translator iterator 1718. The signals to the register file 1736 include error indicators. The signals to translator iterator 1718 include the number of channels present, each channel's channel number, each channel's format, each channel's sample size, each channel's start byte per frame, and each channel's number of bytes per frame.

Consider the following example of an operation of frame format parser 1716, with reference to both FIG. 15A and FIG. 17:
(Values Given in Binary)
Format change flag: 000 (=same format at previous superframe)
Service/auxiliary channel select: 0 (=service channel is present, not auxiliary)
First channel descriptor: 000100 01 00010 (=channel 4, 4-bit samples (code 1), format 2)
Second channel descriptor: 000011 01 00101 (=channel 3, 4-bit samples (code 1), format 5)
Third channel descriptor: 000010 11 00110 (=channel 2, 8-bit samples (code 3), format 6)
Fourth channel descriptor: 000001 10 00110(=channel 1, 6-bit samples (code 2), format 6)
Fifth channel descriptor: 000000 00 00000 (first descriptor with all 0, END OF CHANNELS)
Fifth channel descriptor: 000000 00 00000
...
Sixty-fourth channel descriptor: 000000 00 00000
Not used: all 0
CRC bits: [correct CRC]

In this example, the superframe has four channels. Frame format parser 1716 may check the bits for errors and find no errors. Frame format parser 1716 may determine the number of channels, which in this example is four. Furthermore, frame format parser 1716 may look up the number of bytes reserved for each channel using the bandwidth table (as shown in FIG. 15C), which would result in the following:
First channel; format 2, 4-bit; has 600 bytes dedicated to it.
Second channel; format 5, 4-bit; has 150 bytes dedicated to it.
Third channel; format 6, 8-bit; has 225 bytes dedicated to it.
Fourth channel; format 6, 6-bit; has 169 bytes dedicated to it.

Frame format parser 1716 may then determine the start byte within the frame for each channel. In one aspect, the channels are packed consecutively within the frame:
First channel starts at byte 0
Second channel starts at byte 600
Third channel starts at byte 750
Fourth channel starts at, byte 975

In this example, frame format parser 1716 does not send any error indicators to register file 1736. Frame format parser 1716 may send the following channel format information to translator iterator 1718:

| Number of active channels: 4 | | | | |
|---|---|---|---|---|
| Channel numbers: | 4 | 3 | 2 | 1 |
| Channel formats: | 2 | 5 | 6 | 6 |
| Chan. sample sizes: | 4-bit | 4-bit | 8-bit | 6-bit |
| Chan. start byte: | 0 | 600 | 750 | 975 |
| Chan. num. bytes: | 600 | 150 | 225 | 169 |

Translator iterator 1718 may receive input 1702 via frame format parser 1716. For example, translator iterator 1718 may receive the channel formats from frame format parser 1716 and prepare the configuration data needed by channel processor module 1710 to extract channel data from the frame payloads. Channel processor module 1710 may comprise multiple channel processors (e.g., channel processors 1710a through 1710n). In one aspect, translator iterator 1718 may cycle through the channels, for example the 64 channels, to determine if a channel is present and gathers each channel's start byte offset within the frame payload, data rate, sample size, and location of fill bytes, if present. Translator iterator 1718 may determine whether each channel has changed or dropped since the previous frame set. Translator iterator 1718 may also check whether a pseudo random binary sequence (PRBS) channel is present and may pass PRBS channel information to PRBS processor 1726.

According to one aspect of the disclosure, translator iterator 1718 accepts the channel formats from frame format parser 1716 and prepares the data needed by channel processor module 1710 to extract channel data from the frame payloads. Inputs from frame format parser 1716 contain information for channels that could be in any order. Channel processors 1710a through 1710n, on the other hand, each handle a specific channel, according to one aspect of the disclosure. Each channel processor 1710a through 1710n may need information on whether that channel is present, and if so exactly which payload bytes belong to the channel.

In one aspect, translator iterator 1718 may check whether each channel, 0-63, is present and gathers each channel's start byte, bytes per frame, sample size, and channel fill per superframe. Translator iterator 1718 may begin by searching for channel number 0 in the list of active channels, which could be in any order. For example, if channel 0 is present, translator iterator 1718 gathers the start byte, bytes per frame, and sample size from the inputs from frame format parser 1716. Translator iterator 1718 may index the bandwidth table (as shown in FIG. 15C) with the format and the sample size to determine the channel fill per superframe. If channel 0 is not present, translator iterator 1718 may need to indicate to a corresponding channel processor of channel processor module 1710 that the channel is not valid for this superframe. According to one aspect of the disclosure, this process may repeat for channels 1 through 63. In another aspect, translator iterator 1718 comprises frame format translator 1738, which searches for a single channel number from the inputs from frame format parser 1716. In one aspect, translator iterator 1718 may call frame format translator 1738 with all 64 possible channels.

Translator iterator 1718 may output signals to channel processor module 1710 and to packet arbiter 1714. In one aspect, translator iterator 1718 may indicate to channel processor module 1710 whether each channel is present, and if so, what the start byte, bytes per frame, sample size, and channel fill per superframe are. Translator iterator 1718 may determine whether each channel has changed or dropped since the previous superframe, and sends this information to packet arbiter 1714. Packet arbiter 1714 may use this information to determine when to empty or reset each channel data FIFO of channel data FIFO module 1712.

In another aspect of the disclosure, translator iterator 1718 outputs signals to PRBS processor 1726. If one of the channels present is marked as PRBS, which has sample size code of 0, translator iterator 1718 may send that channel's start byte, bytes per frame, and channel fill per superframe to the PRBS processor. Note that in this case, the sample size is already known.

Continuing from the previous example, translator iterator 1718 receives the following channel format information:

| Number of active channels: 4 | | | | |
|---|---|---|---|---|
| Channel numbers: | 4 | 3 | 2 | 1 |
| Channel formats: | 2 | 5 | 6 | 6 |
| Chan. sample sizes: | 4-bit | 4-bit | 8-bit | 6-bit |
| Chan. start byte: | 0 | 600 | 750 | 975 |
| Chan. num. bytes: | 600 | 150 | 225 | 169 |

Translator iterator 1718 may begin by instructing frame format translator 1738 to search for channel 0. In this example, channel 0 is not present, so translator iterator 1718 may send this information to channel processor 0 (e.g., channel processor 1710a). Next, translator iterator 1718 may instruct frame format translator 1738 to search for channel 1. In this example, channel 1 is found. Translator iterator 1718 may look up the channel fill for this channel using the bandwidth table (as shown in FIG. 15C), resulting in:
Channel 1: 64 frames have a fill byte instead of data in the last byte of the frame dedicated to this channel (byte 1143). (Frames 0-63 of the superframe have the channel fill byte, and frames 64-255 do not.)

Likewise, translator iterator 1718 may look up the channel fill for the other channels using the bandwidth table, resulting in:
Channel 2: 0 frames have a fill byte instead of data in the last byte of the frame dedicated to this channel (byte 974).
Channel 3: 0 frames have a fill byte instead of data in the last byte of the frame dedicated to this channel (byte 749).
Channel 4: 0 frames have a fill byte instead of data in the last byte of the frame dedicated to this channel (byte 599).

Suppose in this example that this set of channels is the same as the set of channels from the previous superframe. In one aspect, no indicators are sent to packet arbiter 1714 since no channel has changed its format/sample size and no channel has been dropped. Translator iterator 1718 may indicate to PRBS processor 1726 that there are no PRBS channels since the sample sizes present are 4-bit, 6-bit, and 8-bit, not PRBS. Translator iterator 1718 may instruct channel processor module 1710 which of the payload bytes are for the respective channels, as follows:
Channel 0: not present
Channel 1: start byte 975, 225 bytes per frame, sample size 6-bit, 64 channel fill per superframe
Channel 2: start byte 750, 225 bytes per frame, sample size 8-bit, 0 channel fill per superframe
Channel 3: start byte 600, 150 bytes per frame, sample size 4-bit, 0 channel fill per superframe
Channel 4: start byte 0, 600 bytes per frame, sample size 4-bit, 0 channel fill per superframe
Channel 5: not present
. . .
Channel 63: not present Turning to the payload data, data reader 1708 may receive the superframe payload data from dual-port RAM 1706 and transmit the data to channel processors 1710a through 1710n. According to one aspect, data reader 1708 starts reading from address 0 based on the time that input module 1704 finishes writing a full superframe to dual-port RAM 1706. However, data reader 1708 will not read the data if the frame format is not valid.

In one aspect, channel processor module 1710 may comprise 64 channel processors that correspond with the 64 data channels so that each channel processor is associated with a corresponding data channel. Each of channel processors 1710a through 1710n may extract the data for the corresponding channel number (unless it is a PRBS channel) out of the payload data. For example, channel processor 1710a may look at the full superframe payload being input by data reader 1708 and grab the data samples that correspond to channel 0 (if channel 0 is not PRBS). Each of channel processors 1710a through 1710n may convert 4-, 6-, and 8-bit samples to 8-bit samples and output this data to a corresponding one of channel data FIFO of channel data FIFO module 1712, in accordance with another aspect of the disclosure. PRBS processor 1726, similar to channel processor module 1710, may extract a channel from the payload and output it as output 1724b. However, PRBS processor 1726 only extracts the PRBS channel if there is one in the superframe. In one aspect, a superframe can have either 0 or 1 PRBS channel.

Channel data FIFO module 1712 may comprise multiple channel data FIFOs (e.g., channel data FIFO modules 1712a through 1712n). In one aspect, channel data FIFO module 1712 may comprise 64 channel data FIFO modules that correspond with the 64 data channels so that each channel data FIFO is associated with a corresponding data channel. Each channel data FIFO of channel data FIFO module 1712 may store samples from the corresponding channel. For example, channel data FIFO 1712a holds channel 0 data. In one aspect, each of channel data FIFO modules 1712a through 1712n may hold at least 4096 bytes, and may convert the width to 32-bit. Each of channel data FIFO modules 1712a through 1712n may output its data and a count of the number of samples in its channel data FIFO to packet arbiter 1714. Packet arbiter 1714 may then read out the data.

Service channel parser 1720 may extract service channel data, if present, from the frame and may also collect service channel bits from the header bytes of each frame. According to one aspect, service channel parser 1720 may align the data to a service-channel specific sync pattern to determine the alignment of the 5-bit samples in the 12-bit header data. Service channel parser 1720 may track any errors such as sync bit errors. Service channel data FIFO 1728 may store service channel samples and output the number of samples to packet arbiter 1714.

Auxiliary channel parser 1722 may extract auxiliary channel data, if present, from the frame and may also collect auxiliary channel bits from the header bytes of each frame. According to one aspect, auxiliary channel parser 1722 may align the data to the start of a superframe to determine the alignment of the 8-bit samples in the 12-bit header data. Auxiliary channel data FIFO 1730 may store auxiliary channel samples and output the number of samples to packet arbiter 1714.

Packet arbiter 1714 may receive the data from channel data FIFO modules 1712a through 1712n, service channel data FIFO 1728, and auxiliary channel data FIFO 1730, create data packets, and transmit the packets to the next processing element, for example the packetizer. Packet arbiter 1714 may look at all of the FIFO data counts and select when each channel FIFO should be serviced. When a FIFO is chosen to be serviced, packet arbiter 1714 activates a read enable (Rd_En) signal on that FIFO and then may package the data with valid, length, channel, start of packet (SOP), end of packet (EOP) signals into output 1724a for downstream processing.

Figure 18:
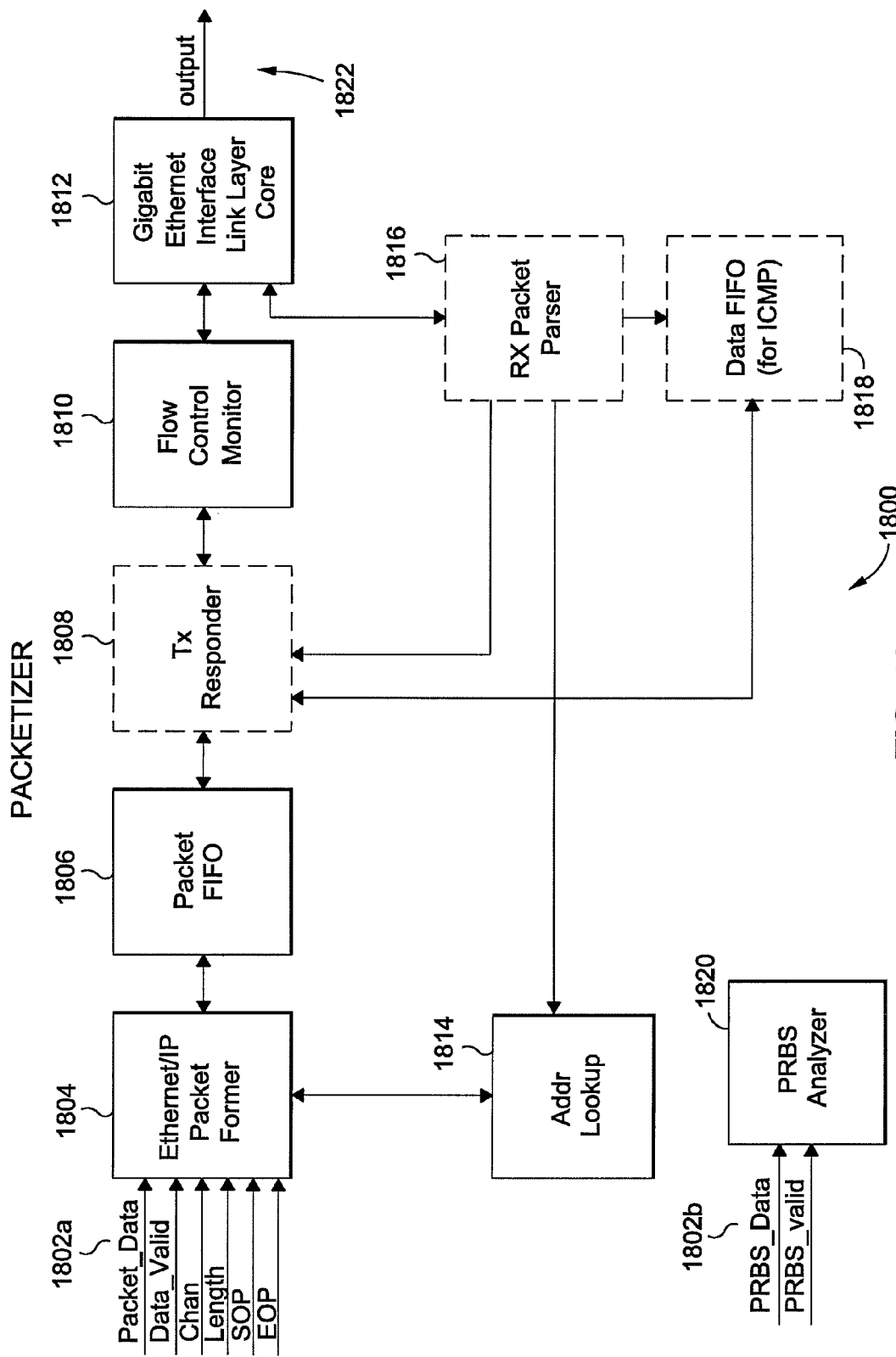
FIG. 18 illustrates an example of a packetizer, in accordance with one aspect of the disclosure.

FIG. 18 illustrates an example of a packetizer, in accordance with one aspect of the disclosure.

In one aspect, packetizer 1800 shown in FIG. 18 may be packetizer 114 of FIG. 1. Packetizer 1800 encapsulates channel data, service channel data, and auxiliary channel data in UDP/IP packets. Packetizer 1800 may transmit those packets to workstations for further processing or a NAS array for retrieval at a later time. Ethernet/IP packet former 1804 may receive input 1802a from the deframer. Ethernet/IP packet former 1804 may generate an Ethernet/IP packet from each block of data. This data may become the IP payload. The destination IP address for the packet depends on the data's channel number. In one aspect, the source MAC and IP addresses may be determined externally by a user. The source MAC address may also be set through addresses set by an optional Rx packet parser 1816. In case packet FIFO 1806 does not have room for the full packet, the full packet should be dropped. Ethernet/IP packet former 1804 may also add MAC and IP headers. The packet may be dropped in Ethernet/IP packet former 1804 if there is no space in packet FIFO 1806.

Address lookup 1814 may determine the IP destination address based on the channel number provided by Ethernet/IP packet former 1804. Address lookup 1814 may then provide the address information to Ethernet/IP packet former 1804. If the Rx packet parser 1816 is implemented, it may also look up the destination MAC address to provide to Ethernet/IP packet former 1804.

Packet FIFO 1806 may hold at least 2 Ethernet/IP packets. For example, the packets may be 1513 bytes. Packet FIFO 1806 may hold packets when backpressure is being received from Gigabit Ethernet interface link layer core 1812.

An optional tx responder 1808 may receive the data packets from packet FIFO 1806. Tx responder 1808 may also allow internet control message protocol (ICMP)/address resolution protocol (ARP) packets to be interjected between the nominal data packets. Tx responder 1808 will not interject a packet until the full previous packet has been transmitted. If ICMP/ARP packets are not implemented, then the data packets may pass through tx responder 1808. An optional data FIFO 1818 may be implemented for ICMP packets. In one aspect, data FIFO 1818 may hold at least 1480 bytes for ICMP packets. An rx packet parser 1816 may parse input packets and perform any necessary processing.

Flow control monitor 1810 may control data flow to Gigabit Ethernet interface link layer core 1812. Flow control monitor may allow data to flow unless backpressure is being applied. Gigabit Ethernet interface link layer core 1812 may convert the data and valid signals to a standard Gigabit Ethernet interface, such as the standard system packet interface level 3 (SPI-3) format, and transmit the signals as output 1822. Gigabit Ethernet interface link layer core 1812 may also pass flow control signals back to flow control monitor 1810 to halt data flow. Gigabit Ethernet interface link layer core 1812 may contain additional storage for packet data, which may include, for example, a 4096-deep egress FIFO and a 4096-deep ingress FIFO.

PRBS analyzer 1820 may receiver input 1802b from deframer corresponding to PRBS channel data. PRBS analyzer 1820 attempts to synchronize to the PRBS data input and measure PRBS statistics. These statistics include the number of times sync is lost and the number of bit errors.

Figure 19:
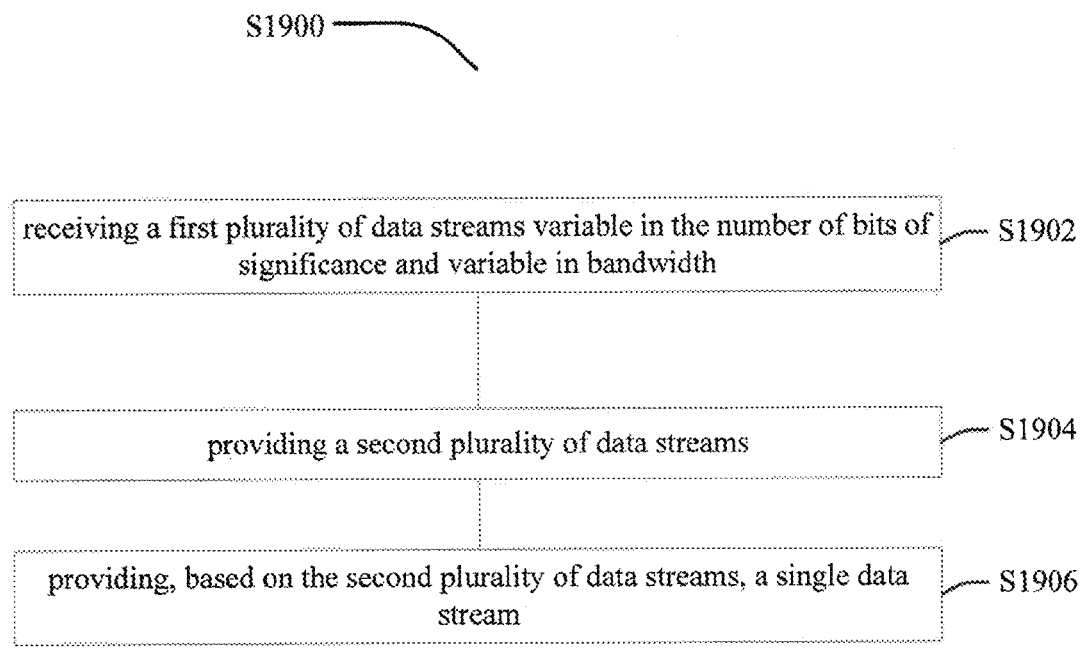
FIG. 19 illustrates a flowchart of a data interleaving method for a variable bandwidth communication system, in accordance with one aspect of the disclosure.

FIG. 19 illustrates a flowchart of a data interleaving method for a variable bandwidth communication system, in accordance with one aspect of the disclosure.

A data interleaving method S1900 is illustrated in FIG. 19. In accordance with one aspect of the disclosure, data interleaving method S1900 comprises receiving a first plurality of data streams variable in the number of bits of significance and variable in bandwidth (S1902). The method further comprises providing a second plurality of data streams (S1904). Each of the second plurality of data streams comprises first data units, channel identifiers, and format indicators. Each of the first data units is associated with one of the channel identifiers and one of the format indicators. The format indicators are generated based on variable bandwidths of data streams.

The method further comprises providing, based on the second plurality of data streams, a single data stream (S1906). A single data stream may comprise second data units, channel identifiers and format indicators. Each of the second data units is associated with one of the channel identifiers of the single data stream and one of the format indicators of the single data stream.

Figure 20:
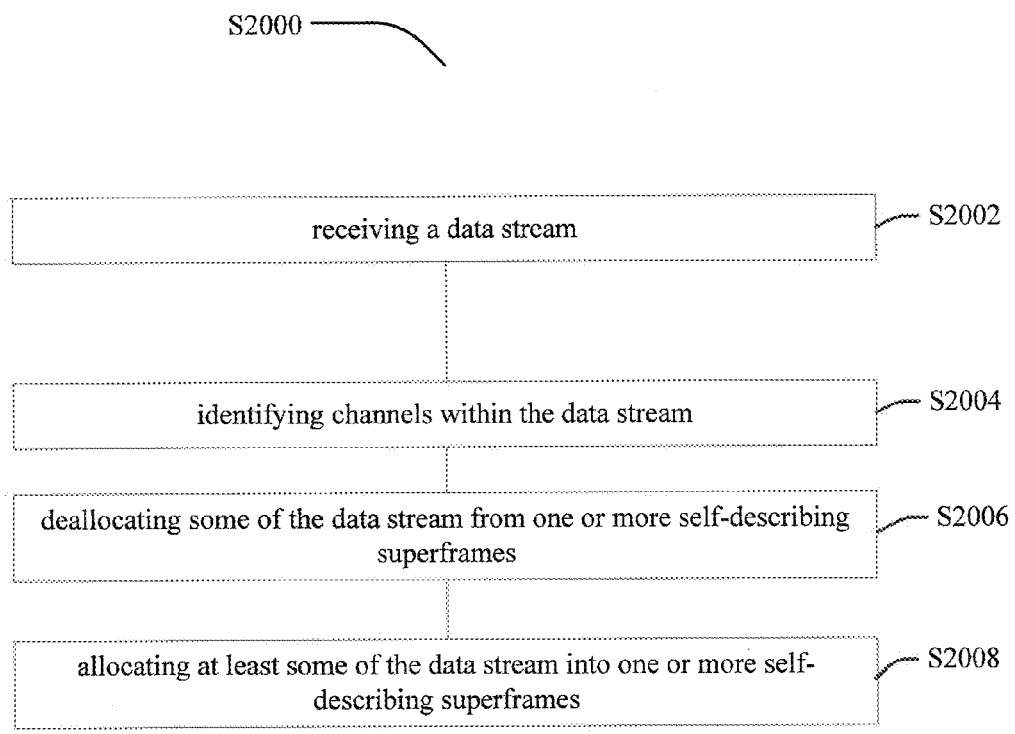
FIG. 20 illustrates a flowchart of a method of building a self-describing superframe for a communication system, in accordance with one aspect of the disclosure.

FIG. 20 illustrates a flowchart of a method of building a self-describing superframe for a communication system, in accordance with one aspect of the disclosure.

In accordance with one aspect of the disclosure, a method S2000 comprises receiving a data stream (S2002). The data stream may comprise data units, channel identifiers, and format indicators. Each of the data units is associated with one of the channel identifiers and one of the format indicators. The format indicators are generated based on variable bandwidths of a data stream. The method further comprises identifying channels within the data stream (S2004), deallocating some of the data stream from one or more self-describing superframes (S2006), and allocating at least some of the data stream into one or more self-describing superframes (S2008).

Figure 21:
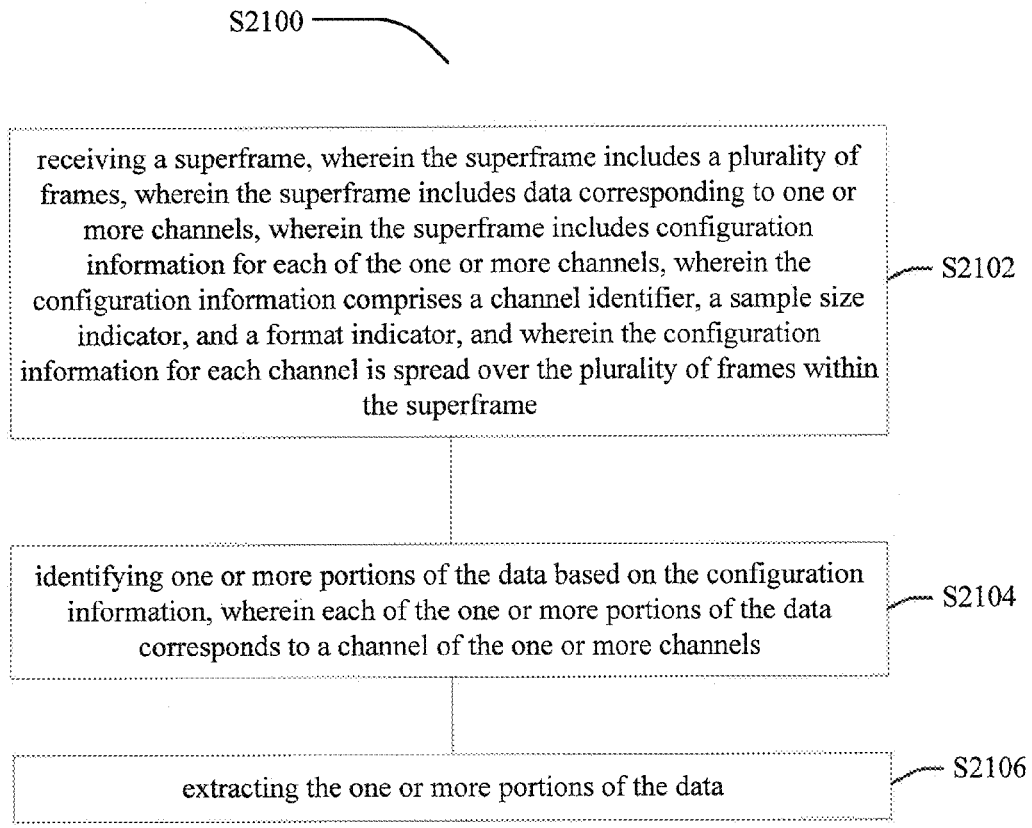
FIG. 21 illustrates a flowchart of a method of extracting data from a superframe for a communication system, in accordance with one aspect of the disclosure.

FIG. 21 illustrates a flowchart of a method of extracting data from a superframe for a communication system, in accordance with one aspect of the disclosure.

In accordance with one aspect of the disclosure, a method S2100 comprises receiving a superframe (S2102). The superframe includes a plurality of frames. In some embodiments, the superframe includes data corresponding to one or more channels. The superframe includes configuration information for each of the one or more channels. The configuration information comprises a channel identifier, a sample size indicator, and a format indicator. The configuration information for each channel is spread over the plurality of frames within the superframe. The method also comprises identifying one or more portions of the data based on the configuration information (S2104). Each of the one or more portions of the data corresponds to a channel of the one or more channels. The method also comprises extracting the one or more portions of the data (S2106).

In some aspects, the superframe may include zero channels and/or zero channel identifiers. This may occur, for example, when the framer receives no primary data input (e.g., no input at framer primary input 1602*a* in FIG. 16), but still outputs frames in the superframe format. The superframe may therefore have zero channels present (e.g., the superframe has no primary data), but may have headers of the superframe that are output periodically. With zero channels, there may be zero channel identifiers (i.e., no channel identifiers). In some aspects, other types of data may still be transmitted in a superframe with zero channels and/or zero channel identifiers. For example, service channel data or auxiliary channel data, which appear in the headers of the superframe, may be sent within the superframe with zero channels.

In another example, a superframe may include primary data with no channel identifiers. This superframe may also include configuration information, and the configuration information comprises a sample size indicator and a format indicator. A processor module may extract one or more portions of the data based on the configuration information.

Referring back to FIGS. 1 and 2, in accordance with one aspect of the disclosure, a communication system (e.g., 100) may comprise a data conversion module (e.g., 106) configured to receive a first plurality of data streams (e.g., multiple data streams received in parallel from ADCs 104; in this example, there are 8 data streams received in parallel) and to provide a second plurality of data streams (e.g., 8 data streams provided in parallel by ABRs). Each (e.g., 200) of the second plurality of data streams may comprise first data units (e.g., 0x10 and 0x12 on 204; 0x11 and 0x13 on 206), channel identifiers (e.g., 208), and format indicators (e.g., 210). Each of the first data units is associated with one of the channel identifiers and one of the format indicators. The format indicators are generated based on variable bandwidths of each channel in data streams.

Referring to FIGS. 1 and 4, in accordance with one aspect of the disclosure, a communication system (e.g., 100) may further comprise a data interleaver module (e.g., 108) configured to receive the second plurality of data streams and to provide a single data stream (e.g., 124; 400) comprising second data units (e.g., 0xABCDEF and 0x112233 on 404), channel identifiers (e.g., 408) and format indicators (e.g., 410). Each of the second data units is associated with one of the channel identifiers of the single data stream and one of the format indicators of the single data stream.

Referring to FIGS. 1 and 15A, in accordance with one aspect of the disclosure, a communication system (e.g., 100) may further comprise a framer (e.g., 110) configured to receive the single data stream (e.g., a stream comprising 1304*c*, 1308*c*, 1310*c*, 1312*c*, 1314*c* and 1316*c*), to identify channel information of the single data stream, and to allocate the single data stream into one or more self-describing superframes (e.g., 1510). In one aspect, one or more self-describing superframes include sequential self-describing superframes.

Referring to FIGS. 13 and 16, in one aspect, a framer (e.g., FIFO selector 1608) may identify the channel information (e.g., 1308*c*, 1310*c*, 1312*c*, and 1316*c*) for allocation or deallocation of the channel.

Referring to FIG. 1, processing unit 109 may include one or more of data conversion module 106, data interleaver module 108, and framer 110. In another configuration, a processing unit may include a portion of any one of data conversion module 106, data interleaver module 108, and framer 110. In one aspect, command and control module 134 may control processing unit 109 and/or provide a user interface to control processing unit 109.

While a superframe may have 256 frames and a frame may have 1206 bytes, as described in various examples above, the subject technology is not limited to these numbers. The subject technology may apply to superframes and frames having other sizes.

A variable bandwidth communication system described herein may be implemented by various means. For example, this system may be implemented in hardware, software, or a combination thereof. For a hardware implementation, the variable bandwidth communication system may be implemented within one or more application specific integrated circuits (ASICs), digital signal processors (DSPs), digital signal processing devices (DSPDs), programmable logic devices (PLDs), field programmable gate arrays (FPGAs), processing units, controllers, micro-controllers, microprocessors, other electronic units designed to perform the functions described herein, or a combination thereof. A processing unit may include a processor and/or a machine-readable medium. A processor may include one or more processors, and a machine-readable medium may include one or more machine-readable media.

For a software implementation, the variable bandwidth communication system may be implemented with modules (e.g., procedures, functions, and so on) that perform the functions described herein. The software codes may be stored in a memory unit and executed by a processor. The memory unit may be implemented within the processor or external to the processor, in which case it can be communicatively coupled to the processor via various means as is known in the art.

In one aspect, a phrase "channel" may refer to a data channel, channel data, data stream(s) of a channel, stream(s), or vice versa. In another aspect, a phrase "channel" may refer to its associated data (e.g., data streams) and/or format(s) (e.g., channel state information, a channel identifier, a format indicator, a sample size indicator, a valid signal indicator, and/or a channel reset indicator).

In one aspect, a format indicator may refer to a format (e.g., 210 in FIG. 2, 410 in FIG. 4, 1010*a* in FIG. 10; 1010*b* in FIG. 10; 1310*a* in FIG. 13; 1310*b* in FIG. 13; 1310*c* in FIG. 13; "Format" in FIG. 14; the first column labeled "Format" in FIG. 15*c*; FORMAT of the channel state information).

In one aspect, a sample size indicator may refer to a sample size of a data sample or data unit (e.g., 212 in FIG. 2, 412 in FIG. 4, 1012*a* in FIG. 10; 1012*b* in FIG. 10; 1312*a* in FIG. 13; 1312*b* in FIG. 13; 1312*c* in FIG. 13; "Sample Size" in FIG. 14; SAMP_SIZE of the channel state information).

In one aspect, a valid signal indicator may refer to a valid data indicator or a notation "valid" (e.g., 214 in FIG. 2, 414 in FIG. 4, 1014a in FIG. 10; 1014b in FIG. 10; 1314a in FIG. 13; 1314b in FIG. 13; 1314c in FIG. 13; "Valid" in FIG. 14). In one aspect, an allocated indicator may refer to a valid flag (e.g., a valid flag of the channel state information).

In one aspect, a channel reset indicator may refer to an indicator for channel reset (e.g., 216 in FIG. 2, 416 in FIG. 4, 1016a in FIG. 10; 1016b in FIG. 10; 1316a in FIG. 13; 1316b in FIG. 13; 1316c in FIG. 13; "Reset" in FIG. 14).

In another aspect, a phrase "channel" may refer to a channel identifier (e.g., 208 in FIG. 2; 408 in FIG. 4, 1008a in FIG. 10; 1008b in FIG. 10; 1308a in FIG. 13; 1308b in FIG. 13; 1308c in FIG. 13; "Channel" in FIG. 14). A variable bandwidth communication system may have any number of channels (e.g., any integer number such as 0, 1, 2, 3, 4, . . . 12, etc.). For example, if there are 32 channels, there may be 32 unique channel identifiers, each of which has a value between 0 and 63, inclusive. In one aspect, the number of channels is 0 or greater.

According to one aspect of the disclosure, parameters such as the number of channels (or channel identifiers), sample sizes, and/or the bandwidth (format) of a channel may be varied in real-time, for example, by a ground controller. In one aspect, arbitrary bandwidth resamplers (ABRs) of data conversion module 106 of FIG. 1 may receive the parameters from a ground controller and assign the parameters (e.g., a channel identifier, a sample size indicator, and a format indicator) to the corresponding data units or data samples. For example, FIG. 2 shows a data stream including data units or data samples (e.g., 204 and 206) with the assigned channel identifier (e.g., 208), the assigned format indicator (e.g., 210), and the assigned sample size indicator (e.g., 212). Each data unit or data sample is associated with a corresponding channel identifier, format indicator, and sample size indicator.

In another aspect, arbitrary bandwidth resamplers (ABRs) of data conversion module 106 of FIG. 1 may operate with a default set of parameters.

In one aspect of the disclosure, the format indicators or formats are generated based on the variable bandwidths of the data streams. FIG. 15C illustrates one example of a bandwidth table, and in this example, there are 32 formats (0 through 31). In one aspect, a bandwidth table is stored by components of a variable bandwidth communication system (e.g., 106, 110, and 112 in FIG. 1). A format may be selectable from a bandwidth table. A bandwidth table is not limited to the one shown in FIG. 15C, and other bandwidth tables may be generated and utilized by the subject technology.

In one aspect, a phrase "data stream" may refer to data (e.g., 204 and 206 in FIG. 2; 404 in FIG. 4; 1004a and 1006a in FIG. 10; 1004b and 1006b in FIG. 10; 1304a and 1306a in FIG. 13; 1304b and 1306b in FIG. 13; 1304c in FIG. 13; data in FIG. 14). In another aspect, a phrase "data stream" may refer to data and/or its format(s) (e.g., a data stream including 204, 206, 208, 210, 212, 214 and 216 in FIG. 2; a data stream including 404, 408, 410, 412, 414 and 416 in FIG. 4; a data stream including 1004a, 1006a, 1008a, 1010a, 1012a, 1014a and 1016a in FIG. 10; a data stream including 1004b, 1006b, 1008b, 1010b, 1012b, 1014b and 1016b in FIG. 10; a data stream including 1304a, 1306a, 1308a, 1310a, 1312a, 1314a and 1316a in FIG. 13; a data stream including 1304b, 1306b, 1308b, 1310b, 1312b, 1314b and 1316b in FIG. 13; a data stream including 1304c, 1308c, 1310c, 1312c, 1314c and 1316c in FIG. 13; a data stream including data, channel, format, sample size, valid and reset in FIG. 14). A data stream is sometimes referred to as stream.

In one aspect, a phrase "data unit" may refer to a unit of data (e.g., 8 bits of 204 and/or 8 bits of 206 in FIG. 2; 24 bits in 404 in FIG. 4; 8 bits of 1004a and/or 8 bits of 1006a in FIG. 10; 8 bits of 1004b and/or 8 bits of 1006b in FIG. 10; 8 bits of 1304a and/or 8 bits of 1306a in FIG. 13; 8 bits of 1304b and/or 8 bits of 1306b in FIG. 13; 24 bits of 1304c in FIG. 13; 24 bits of data in FIG. 14). In one aspect, a phrase "data units" may refer to data samples or vice versa. In one aspect, a phrase "bandwidth" may refer to data rate or vice versa.

The description of the subject technology is provided to enable any person skilled in the art to practice the various configurations described herein. While the subject technology has been particularly described with reference to the various figures and configurations, it should be understood that these are for illustration purposes only and should not be taken as limiting the scope of the invention.

There may be many other ways to implement the invention. Various functions and elements described herein may be partitioned differently from those shown without departing from the sprit and scope of the invention. Various modifications to these configurations will be readily apparent to those skilled in the art, and generic principles defined herein may be applied to other configurations. Thus, many changes and modifications may be made to the invention, by one having ordinary skill in the art, without departing from the spirit and scope of the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such, embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A communication system, comprising:
a data conversion module configured to receive a first plurality of data streams and to provide a second plurality of data streams, each of the second plurality of data streams comprising first data units, channel identifiers, sample size indicators, valid signal indicators, and format indicators, each of the first data units associated with one of the channel identifiers, one of the sample size indicators, and one of the format indicators, the format indicators based on variable bandwidths of data streams;

a framer configured to receive the second plurality of data streams in a form of a single data stream, to identify channel information of the second plurality of data streams in the form of the single data stream, and to allocate the second plurality of data streams in the form of the single data stream into one or more self-describing superframes, wherein the single data stream comprises second data units, channel identifiers, sample size indicators, and valid signal indicators, each of the second data units associated with one of the channel identifiers of the single data stream and one of the sample size indicators of the single data stream.

2. The communication system of claim 1, further comprising:

a data interleaver module configured to receive the second plurality of data streams and to provide the single data stream to the framer, the single data stream further comprising format indicators, each of the second data units associated with one of the format indicators of the single data stream.

3. The communication system of claim 2, wherein the data interleaver module is further configured to perform rounding and truncating on the second plurality of data streams.

4. The communication system of claim 2, wherein the data interleaver module is further configured to perform bit-width conversion on the second plurality of data streams.

5. The communication system of claim 2, wherein the data interleaver module comprises one or more multiplexers.

6. The communication system of claim 1, wherein each of the first data units comprises one or more samples, and the sample size indicators of the first data units indicate resolution of the one or more samples.

7. The communication system of claim 1, wherein in a single data stream, each channel identifier is associated with one format indicator and one sample size indicator, and wherein channel identifiers, format indicators, and sample size indicators are variable at a boundary of a predetermined time period.

8. The communication system of claim 1, wherein each of the first data units has a first width, each of the second data units has a second width, and the second width is different from the first width.

9. The communication system of claim 1, wherein the framer is configured to allocate the second plurality of data streams into sequential self-describing superframes according to a data rate and a sample size of each of the channels, and to dynamically allocate or deallocate channels.

10. The communication system of claim 1, wherein a self-describing superframe includes a plurality of frames, wherein the self-describing superframe includes data for channels, wherein the self-describing superframe includes configuration information for each channel in the self-describing superframe, wherein the configuration information comprises a channel identifier, a sample size indicator, and a format indicator, wherein the configuration information for each channel is spread over a plurality of frames within the self-describing superframe, and wherein the self-describing superframe includes all information needed to extract and restore the second plurality of data streams from the self-describing superframe.

11. The communication system of claim 1, wherein the data conversion module is configured to receive channel identifiers that are selectable, format indicators that are selectable, and sample size indicators that are selectable.

12. A data interleaving apparatus for a communication system, comprising:

a first module comprising:

a multiplexing module configured to receive a plurality of data streams, to combine the plurality of data streams, and to provide a single data stream, the single data stream comprising second data units, channel identifiers, and sample size indicators, each of the second data units associated with one of the channel identifiers of the single data stream and one of the sample size indicators of the single data stream; and a transformation module configured to receive the single data stream and to dynamically perform one or more of the following actions on the single data stream based only on contents of the single data stream: rounding, truncating, bit-width conversion, and bandwidth limiting.

13. The data interleaving apparatus of claim 12, further comprising a plurality of first modules, each of the plurality of first modules having a multiplexing module and a transformation module, wherein the plurality of first modules and the first module are in a cascaded configuration.

14. The data interleaving apparatus of claim 12, wherein the transformation module comprises:

a first rounding and truncating module communicatively coupled to the multiplexing module, the first rounding and truncating module configured to round and truncate the single data stream;

a data packer module configured to pack data units of the single data stream to provide bit-width conversion; and a rate limiter configured to limit the bandwidth of the single data stream.

15. The data interleaving apparatus of claim 12, wherein the transformation module comprises a data packer module configured to pack data units of the single data stream to produce bit-width conversion.

16. The data interleaving apparatus of claim 12, wherein the transformation module comprises a first rounding and truncating module communicatively coupled to the multiplexing module, the first rounding and truncating module configured to round and truncate the single data stream.

17. The data interleaving apparatus of claim 12, wherein the transformation module comprises a rate limiter configured to limit the bandwidth of the single data stream.

18. The data interleaving apparatus of claim 12, further comprising:

a service channel service logic module configured to receive a plurality of service streams, to combine the plurality of service streams, and to provide a single service stream; and a second rounding and truncating module communicatively coupled to the service channel service logic module, the second rounding and truncating module configured to round and truncate the single service stream.

19. The data interleaving apparatus of claim 12, wherein each of the plurality of data streams comprises first data units, channel identifiers, format indicators, sample size indicators, valid signal indicators, and channel reset indicators, each of the first data units associated with one of the channel identifiers, one of the format indicators, and one of the sample size indicators, the format indicators based on variable bandwidths of data streams, and wherein the single data stream further comprises format indicators, valid signal indicators, and channel reset indicators, each of the second data units associated with one of the format indicators of the single data stream.

20. The data interleaving apparatus of claim 12, wherein the transformation module is configured to round and truncate one or more of the second data units by adding or subtracting one or more bits to or from the one or more of the second data units and by reducing the number of bits of the one or more of the second data units based on corresponding one or more sample size indicators.

21. The data interleaving apparatus of claim 12, wherein the transformation module is configured to perform bit-width conversion by producing a second single data stream based on the single data stream, the second single data stream comprising third data units, channel identifiers, format indicators, sample size indicators, and valid signal indicators, wherein the transformation module is configured to produce the second single data stream by packing two or more second data units associated with one of the channel identifiers into one of the third data units, wherein the significant bit width of the one of the third data units is greater than the significant bit width of each of the two or more second data units.

22. The data interleaving apparatus of claim 12, wherein the transformation module is configured to perform bandwidth limiting by limiting the number of bits of the single data stream outputted by the transformation module for each predetermined time period, wherein the number of bits is not greater than a selected threshold number of bits, and wherein after outputting the selected threshold number of bits, the transformation module is configured to output no more data during each predetermined time period.

23. The data interleaving apparatus of claim 12, each of the first data units comprises two samples of data, and each of the second data units comprises two or more samples of data.

24. The data interleaving apparatus of claim 12, wherein the single data stream has a variable bandwidth, and each of the second data units has a variable number of bits of significance.

25. A data interleaving method for a communication system, comprising:
    receiving a first plurality of data streams variable in the number of bits of significance and variable in bandwidth;
    providing a second plurality of data streams, each of the second plurality of data streams comprising first data units, channel identifiers, sample size indicators, valid signal indicators, and format indicators, each of the first data units associated with one of the channel identifiers, one of the sample size indicators, and one of the format indicators, the format indicators based on variable bandwidths of data streams; and
    providing, based on the second plurality of data streams, a single data stream comprising second data units, channel identifiers, sample size indicators, valid signal indicators, and format indicators, each of the second data units associated with one of the channel identifiers of the single data stream, one of the sample size indicators of the single stream data, and one of the format indicators of the single data stream.

26. The data interleaving method of claim 25, further comprising:
    rounding and truncating the single data stream;
    packing data units of the single data stream to provide bit-width conversion; and
    limiting the bandwidth of the single data stream.

* * * * *